(12) United States Patent
Hsieh et al.

(10) Patent No.: US 11,513,318 B2
(45) Date of Patent: Nov. 29, 2022

(54) OPTICAL PHOTOGRAPHING LENS ASSEMBLY, IMAGE CAPTURING DEVICE AND ELECTRONIC DEVICE

(71) Applicant: LARGAN PRECISION CO., LTD., Taichung (TW)

(72) Inventors: Dung-Yi Hsieh, Taichung (TW); Chun-Yen Chen, Taichung (TW); Chun-Che Hsueh, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 344 days.

(21) Appl. No.: 16/781,375

(22) Filed: Feb. 4, 2020

(65) Prior Publication Data
US 2020/0174230 A1   Jun. 4, 2020

Related U.S. Application Data

(63) Continuation of application No. 15/827,233, filed on Nov. 30, 2017, now Pat. No. 10,591,701, which is a (Continued)

(30) Foreign Application Priority Data

Jul. 24, 2015  (TW) .................................. 104124080

(51) Int. Cl.
*G02B 9/60* (2006.01)
*G02B 13/00* (2006.01)

(52) U.S. Cl.
CPC ........... *G02B 9/60* (2013.01); *G02B 13/0045* (2013.01)

(58) Field of Classification Search
None
See application file for complete search history.

(56) References Cited

U.S. PATENT DOCUMENTS

| 1,697,670 A | 1/1929 | Wandersleb et al. |
| 2,100,291 A | 11/1937 | Lee |
| (Continued) | | |

FOREIGN PATENT DOCUMENTS

| CN | 201611405 U | 10/2010 |
| CN | 102890331 A | 1/2013 |
| (Continued) | | |

*Primary Examiner* — Darryl J Collins
(74) *Attorney, Agent, or Firm* — McClure, Qualey & Rodack, LLP

(57) ABSTRACT

An optical photographing lens assembly includes, in order from an object side to an image side, a first lens element, a second lens element, a third lens element, a fourth lens element and a fifth lens element. The first lens element with positive refractive power has an object-side surface being convex in a paraxial region thereof and an image-side surface being concave in a paraxial region thereof. The second lens element with negative refractive power has an image-side surface being concave in a paraxial region thereof. The third lens element has two surfaces being both aspheric. The fourth lens element with negative refractive power has an image-side surface being concave in a paraxial region thereof, wherein two surfaces thereof are aspheric. The fifth lens element has an image-side surface being convex in a paraxial region thereof, wherein two surfaces thereof are aspheric.

26 Claims, 27 Drawing Sheets

Related U.S. Application Data continuation of application No. 14/834,629, filed on Aug. 25, 2015, now Pat. No. 9,864,171.

(56) References Cited

U.S. PATENT DOCUMENTS

| | | | |
|---|---|---|---|
| 2,819,651 | A | 1/1958 | Baur et al. |
| 3,065,671 | A | 11/1962 | Johnson et al. |
| 3,502,394 | A | 3/1970 | Kobayashi |
| 3,774,991 | A | 11/1973 | Shimizu |
| 3,994,576 | A | 11/1976 | Glatzel et al. |
| 4,451,125 | A | 5/1984 | Sato |
| 4,465,345 | A | 8/1984 | Yazawa |
| 4,790,638 | A | 12/1988 | Iwasaki et al. |
| 5,398,136 | A | 3/1995 | Ohzawa et al. |
| 5,841,587 | A | 11/1998 | Moskovich |
| 7,050,245 | B2 | 5/2006 | Tesar et al. |
| 7,253,972 | B2 | 8/2007 | Fujisaki et al. |
| 8,223,245 | B2 | 7/2012 | Kitahara |
| 8,508,649 | B2 | 8/2013 | Reshidko et al. |
| 9,348,117 | B1 | 5/2016 | Chang et al. |
| 9,557,530 | B2 | 1/2017 | Chen |
| 10,281,682 | B2 | 5/2019 | Lee et al. |
| 10,330,888 | B2 | 6/2019 | Baba |
| 2012/0194726 | A1* | 8/2012 | Huang ............... G02B 13/0045 359/713 |
| 2012/0287515 | A1* | 11/2012 | Hsu .................... G02B 13/0045 359/708 |
| 2013/0021678 | A1 | 1/2013 | Tsai et al. |
| 2013/0033762 | A1* | 2/2013 | Tsai .................... G02B 13/0045 359/713 |
| 2013/0070346 | A1 | 3/2013 | Hsu et al. |
| 2013/0120858 | A1* | 5/2013 | Sano ....................... G02B 9/62 359/713 |
| 2013/0182335 | A1 | 7/2013 | Tsai |
| 2013/0208178 | A1 | 8/2013 | Park |
| 2014/0015997 | A1 | 1/2014 | Baba |
| 2014/0204480 | A1 | 7/2014 | Jo et al. |
| 2015/0002728 | A1* | 1/2015 | Tsai ........................ G02B 9/60 359/713 |
| 2015/0077864 | A1 | 3/2015 | Noda et al. |
| 2015/0116569 | A1 | 4/2015 | Mercado |
| 2015/0277083 | A1* | 10/2015 | Chae ........................ G02B 9/64 359/708 |
| 2016/0025953 | A1* | 1/2016 | Jung .................. G02B 13/0045 359/755 |
| 2016/0085059 | A1 | 3/2016 | Mercado |
| 2016/0187621 | A1* | 6/2016 | Chen ........................ G02B 9/62 359/713 |
| 2016/0282588 | A1* | 9/2016 | Sekine ............... G02B 13/0045 |

FOREIGN PATENT DOCUMENTS

| | | |
|---|---|---|
| CN | 206946077 U | 1/2018 |
| JP | 466144 | 2/1971 |
| JP | S57-108817 A | 7/1982 |
| JP | S58-166316 A | 10/1983 |
| JP | 1987-039811 A | 2/1987 |
| JP | 62-183419 A | 8/1987 |
| JP | H01-044907 A | 2/1989 |
| JP | H01-044908 A | 2/1989 |
| JP | H01-319725 A | 12/1989 |
| JP | 05-173062 A | 7/1993 |
| JP | 1993-264899 A | 10/1993 |
| JP | 1994-235858 A | 8/1994 |
| JP | 07-318798 A | 12/1995 |
| JP | 2001-166207 A | 6/2001 |
| JP | 2006-064829 A | 3/2006 |
| JP | 2009-294527 A | 12/2009 |
| JP | 2009-294528 A | 12/2009 |
| JP | 2013-025202 A | 12/2009 |
| JP | 2010-276645 A | 12/2010 |
| JP | 2012-237966 A | 12/2012 |
| TW | 201432299 A | 8/2014 |
| TW | M503575 U | 6/2015 |
| WO | 2012020554 A1 | 2/2012 |
| WO | 2012147841 A1 | 11/2012 |

\* cited by examiner

OPTICAL PHOTOGRAPHING LENS ASSEMBLY, IMAGE CAPTURING DEVICE AND ELECTRONIC DEVICE

RELATED APPLICATIONS

This application is a continuation of U.S. application Ser. No. 15/827,233, filed on Nov. 30, 2017, U.S. Pat. No. 10,591,701 issued Mar. 17, 2020, which is a continuation of U.S. application Ser. No. 14/834,629, filed Aug. 25, 2015, U.S. Pat. No. 9,864,171 issued on Jan. 9, 2018, which claims priority to Taiwan Application Serial Number 104124080, filed Jul. 24, 2015, all of which are herein incorporated by reference.

BACKGROUND

Technical Field

The present disclosure relates to an optical photographing lens assembly and an image capturing device. More particularly, the present disclosure relates to a compact optical photographing lens assembly and image capturing device applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly provides the photographing characteristic with close object distance and wide field of view, but the conventional optical systems cannot satisfy the requirements of the fine image capturing of telephoto. The conventional telephoto of the optical system mainly adopts multi-lens structure with spherical surfaces. However, the optical system would have excessive volume which is more difficult to carry. Moreover, the conventional optical system with telephoto characteristic is too expensive. Therefore, the conventional optical system cannot satisfy the convenience and multi-functionality pursued by consumers.

SUMMARY

According to one aspect of the present disclosure, an optical photographing lens assembly includes, in order from an object side to an image side, a first lens element, a second lens element, a third lens element, a fourth lens element and a fifth lens element. The first lens element with positive refractive power has an object-side surface being convex in a paraxial region thereof and an image-side surface being concave in a paraxial region thereof. The second lens element with negative refractive power has an image-side surface being concave in a paraxial region thereof. The third lens element having an object-side surface and an image-side surface being both aspheric. The fourth lens element with negative refractive power has an image-side surface being concave in a paraxial region thereof, wherein an object-side surface and the image-side surface of the fourth lens element are aspheric. The fifth lens element having an image-side surface being convex in a paraxial region thereof, wherein an object-side surface and the image-side surface of the fifth lens element are aspheric. The optical photographing lens assembly has a total of five lens elements, there is an air space between every two lens elements of the first lens element, the second lens element, the third lens element, the fourth lens element and the fifth lens element that are adjacent to each other. When a focal length of the first lens element is f1, a focal length of the third lens element is f3, an axial distance between the image-side surface of the fifth lens element and an image surface is BL, an axial distance between the object-side surface of the first lens element and the image-side surface of the fifth lens element is TD, a curvature radius of the object-side surface of the first lens element is R1, a curvature radius of the image-side surface of the first lens element is R2, an axial distance between the second lens element and the third lens element is T23, and an axial distance between the third lens element and the fourth lens element is T34, the following conditions are satisfied:

f1/f3<0.65;
BL/TD<0.80;
R1<R2; and
T23/T34<1.80.

According to another aspect of the present disclosure, an image capturing device includes the optical photographing lens assembly according to the aforementioned aspect and an image sensor, wherein the image sensor is disposed on the image surface of the optical photographing lens assembly.

According to yet another aspect of the present disclosure, an electronic device includes the image capturing device according to the aforementioned aspect.

According to further another aspect of the present disclosure, an optical photographing lens assembly includes, in order from an object side to an image side, a first lens element, a second lens element, a third lens element, a fourth lens element and a fifth lens element. The first lens element with positive refractive power has an object-side surface being convex in a paraxial region thereof and an image-side surface being concave in a paraxial region thereof. The second lens element with negative refractive power has an image-side surface being concave in a paraxial region thereof. The third lens element has an object-side surface and an image-side surface being both aspheric. The fourth lens element with negative refractive power has an object-side surface being concave in a paraxial region thereof and an image-side surface being concave in a paraxial region thereof, wherein the object-side surface and the image-side surface of the fourth lens element are aspheric. The fifth lens element with positive refractive power has an object-side surface being convex in a paraxial region thereof and an image-side surface being convex in a paraxial region thereof, wherein the object-side surface and the image-side surface of the fifth lens element are aspheric. The optical photographing lens assembly has a total of five lens elements, there is an air space between every two lens elements of the first lens element, the second lens element, the third lens element, the fourth lens element and the fifth lens element that are adjacent to each other. When a focal length of the first lens element is f1, a focal length of the third lens element is f3, an axial distance between the image-side surface of the fifth lens element and an image surface is BL, an axial distance between the object-side surface of the first lens element and the image-side surface of the fifth lens element is TD, a curvature radius of the object-side surface of the first lens element is R1, a curvature radius of the image-side surface of the first lens element is R2, a curvature radius of the object-side surface of the fourth lens element is R7, a curvature radius of the image-side surface of the fourth lens element is R8, a curvature radius of the object-side surface of the fifth lens element is R9, and a curvature radius of the image-side surface of the fifth lens element is R10, the following conditions are satisfied:

f1/f3<0.65;
BL/TD<0.80;
R1<R2;
R7<R8; and
R10<R9.

DETAILED DESCRIPTION

Figure 1:
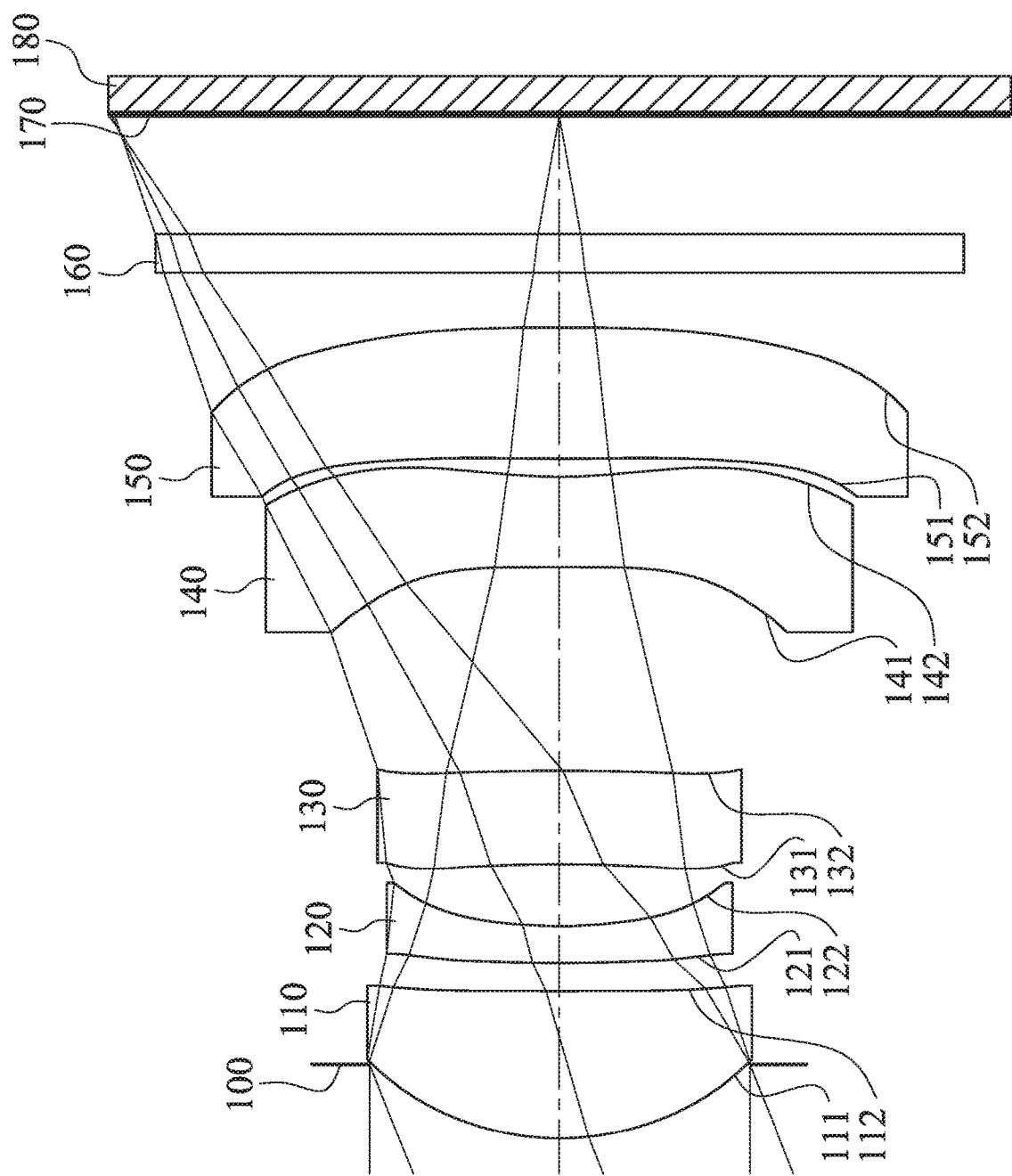
FIG. 1 is a schematic view of an image capturing device according to the 1 st embodiment of the present disclosure.

An optical photographing lens assembly includes, in order from an object side to an image side, a first lens element, a second lens element, a third lens element, a fourth lens element and a fifth lens element, wherein the optical photographing lens assembly has a total of five lens elements.

According to the optical photographing lens assembly of the present disclosure, there is an air space between every two lens elements of the first lens element, the second lens element, the third lens element, the fourth lens element and the fifth lens element that are adjacent to each other. That is, each of the first through fifth lens elements is a single and non-cemented lens element, and every two lens elements adjacent to each other are not cemented, and there is a space between the two lens elements. Moreover, the manufacturing process of the cemented lenses is more complex than the non-cemented lenses. In other words, of the first lens element, the second lens element, the third lens element, the fourth lens element and the fifth lens element of the optical photographing lens assembly, there is a space in a paraxial region between every pair of lens elements that are adjacent to each other. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the optical photographing lens assembly. Therefore, according to the optical photographing lens assembly of the present disclosure, an air space in a paraxial region between every two of the first lens element, the second lens element, the third lens element, the fourth lens element and the fifth lens element that are adjacent to each other of the present disclosure improves the problem generated by the cemented lens elements.

The first lens element with positive refractive power has an object-side surface being convex in a paraxial region thereof and an image-side surface being concave in a paraxial region thereof. Therefore, the total track length of the optical photographing lens assembly can be reduced and the astigmatism of the optical photographing lens assembly can be corrected.

The second lens element with negative refractive power has an image-side surface being concave in a paraxial region thereof. Therefore, the aberration generated from the first lens element can be reduced, and the spherical aberration and the chromatic aberration can be controlled effectively.

The third lens element can have an object-side surface being convex in a paraxial region thereof and an image-side surface being concave in a paraxial region thereof. Therefore, it is favorable for enhancing the image quality by correcting the aberration of the optical photographing lens assembly.

The fourth lens element with negative refractive power has an object-side surface being concave in a paraxial region thereof, and has an image-side surface being concave in a paraxial region thereof, wherein the image-side surface can include at least one convex shape in an off-axial region thereof. Therefore, the arrangement of the optical photographing lens assembly can be balanced, so that the photographing range can be controlled effectively, and the off-axial aberration can be corrected.

The fifth lens element can have positive refractive power and an object-side surface being convex in a paraxial region thereof, and has an image-side surface being convex in a paraxial region thereof, wherein the object-side surface of the fifth lens element can include at least one concave shape in an off-axial region thereof. Therefore, it is favorable for satisfying the demand of telephoto imaging by reducing the telephoto ratio.

When a focal length of the first lens element is f1, and a focal length of the third lens element is f3, the following condition is satisfied: f1/f3<0.65. Therefore, the telephoto functionality of the optical photographing lens assembly can be provided for a wider range of applications thereof. Preferably, the following condition can be satisfied: −0.70<f1/f3<0.50.

When an axial distance between the image-side surface of the fifth lens element and an image surface is BL, and an axial distance between the object-side surface of the first lens element and the image-side surface of the fifth lens element is TD, the following condition is satisfied: BL/TD<0.80. Therefore, the back focal length of the optical photographing lens assembly can be controlled so as to reduce the volume thereof and obtain the compact size thereof. Preferably, the following condition can be satisfied: BL/TD<0.50.

When a curvature radius of the object-side surface of the first lens element is R1, and a curvature radius of the image-side surface of the first lens element is R2, the following condition is satisfied: R1<R2. Therefore, the light converging ability of the optical photographing lens assembly in the tangential direction and the sagittal direction can be balanced effectively, so that the imaging light spot can be focused with high precision.

When an axial distance between the second lens element and the third lens element is T23, and an axial distance between the third lens element and the fourth lens element is T34, the following condition is satisfied: T23/T34<1.80. Therefore, it is favorable for obtaining higher assembling yield rates while balancing the spacing arrangements between each lens element. Preferably, the following condition can be satisfied: T23/T34<1.0.

When a curvature radius of the object-side surface of the fourth lens element is R7, and a curvature radius of the image-side surface of the fourth lens element is R8, the following condition is satisfied: R7<R8. Therefore, the photographing range of the optical photographing lens assembly can be controlled effectively.

When a curvature radius of the object-side surface of the fifth lens element is R9, and a curvature radius of the image-side surface of the fifth lens element is R10, the following condition is satisfied: R10<R9. Therefore, it is favorable for satisfying the demand of telephoto imaging by reducing the telephoto ratio.

When the curvature radius of the object-side surface of the first lens element is R1, and the curvature radius of the image-side surface of the first lens element is R2, the following condition is satisfied: (R1+R2)/(R1−R2)<−1.0. Therefore, the astigmatism of the optical photographing lens assembly can be corrected.

Moreover, the optical photographing lens assembly can further include a stop, such as an aperture stop, wherein there is no lens element located between the stop and the first lens element. When an axial distance between the stop and the image-side surface of the fifth lens element is SD, and the axial distance between the object-side surface of the first lens element and the image-side surface of the fifth lens element is TD, the following condition is satisfied: 0.60<SD/TD<1.2. Therefore, it is favorable for obtaining a balance between telecentricity and the functionality of wide viewing angle.

When a focal length of the optical photographing lens assembly is f, and the focal length of the first lens element is f1, the following condition is satisfied: 1.0<f/f1<2.20. Therefore, it is favorable for maintaining the compact size of the optical photographing lens assembly by reducing the total track length of the optical photographing lens assembly.

When an axial distance between the first lens element and the second lens element is T12, the axial distance between the second lens element and the third lens element is T23, the axial distance between the third lens element and the fourth lens element is T34, and an axial distance between the fourth lens element and the fifth lens element is T45, the following conditions are satisfied: T12<T23<T34, and T45<T23<T34. Therefore, it is favorable for obtaining higher assembling yield rates while balancing the spacing arrangements between each lens element.

When the axial distance between the first lens element and the second lens element is T12, and the axial distance between the fourth lens element and the fifth lens element is T45, the following conditions are satisfied: T45<T12. Therefore, it is favorable for obtaining higher assembling yield rates while balancing the spacing arrangements between each lens element.

When the focal length of the optical photographing lens assembly is f, and a central thickness of the fourth lens element is CT4, the following condition is satisfied: f/CT4<25. Therefore, the proportional relationship between the focal length of the optical photographing lens assembly and the fourth lens element can be balanced so as to maintain the sufficient thickness of the lens element and achieve the proper moldability. Preferably, the following condition can be satisfied: f/CT4<18.

When an axial distance between the object-side surface of the first lens element and the image surface is TL, the following condition is satisfied: TL<10.0 mm. Therefore, the total focal length of the optical photographing lens assembly can be controlled effectively so as to maintain the compact size thereof.

When half of a maximal field of view of the optical photographing lens assembly is HFOV, the following condition is satisfied: 0.20<tan(2×HFOV)<1.20. Therefore, the photographing range of the optical photographing lens assembly can be balanced so as to obtain the better telephoto image quality.

When the focal length of the optical photographing lens assembly is f, and the axial distance between the object-side surface of the first lens element and the image surface is TL, the following condition is satisfied: $0.95<f/TL<1.35$. Therefore, the partial image in high resolution and the controlled total track length can be both obtained so as to achieve the desirable compact size.

When an Abbe number of the first lens element is V1, an Abbe number of the second lens element is V2, an Abbe number of the third lens element is V3, an Abbe number of the fourth lens element is V4, and an Abbe number of the fifth lens element is V5, the following condition is satisfied: $0.40<(V2+V3+V5)/(V1+V4)<0.80$. Therefore, the light dispersion of the optical photographing lens assembly can be controlled effectively so as to obtain multiple photographing ranges.

When the curvature radius of the object-side surface of the fourth lens element is R7, and the curvature radius of the image-side surface of the fourth lens element is R8, the following condition is satisfied: $-1.0<(R7+R8)/(R7-R8)<1.0$. Therefore, the photographing range of the optical photographing lens assembly can be controlled effectively, and the aberration thereof can be reduced effectively. Preferably, the following condition can be satisfied: $0<(R7+R8)/(R7-R8)<1.0$. More preferably, the following condition can be satisfied: $0.50<(R7+R8)/(R7-R8)<1.0$.

When the curvature radius of the object-side surface of the fifth lens element is R9, and the curvature radius of the image-side surface of the fifth lens element is R10, the following condition is satisfied: $-1.0<(R9+R10)/(R9-R10)<1.0$. Therefore, it is favorable for achieving the telephoto photography by reducing the telephoto ratio, and the spherical aberration and the astigmatism can also be corrected. Preferably, the following condition can be satisfied: $0<(R9+R10)/(R9-R10)<1.0$, or $-1.0<(R9+R10)/(R9-R10)<0$.

When a curvature radius of the object-side surface of the second lens element is R3, and a curvature radius of the image-side surface of the second lens element is R4, the following condition is satisfied: $1.5<(R3+R4)/(R3-R4)$. Therefore, the astigmatism can be reduced, and the spherical aberration and the chromatic aberration can also be controlled effectively.

When a central thickness of the fourth lens element is CT4, and a central thickness of the fifth lens element is CT5, the following condition is satisfied: $0.45<CT4/CT5<2.0$. Therefore, it is favorable for manufacturing and forming of the lens elements.

When a central thickness of the second lens element is CT2, and a central thickness of the third lens element is CT3, the following condition is satisfied: $1.1<CT3/CT2$. Therefore, it Is favorable for manufacturing and forming of the lens elements.

According to the optical photographing lens assembly of the present disclosure, the lens elements thereof can be made of glass or plastic material. When the lens elements are made of glass material, the distribution of the refractive powers of the optical photographing lens assembly may be more flexible to design. When the lens elements are made of plastic material, manufacturing costs can be effectively reduced. Furthermore, surfaces of each lens element can be arranged to be aspheric, since the aspheric surface of the lens element is easy to form a shape other than spherical surface so as to have more controllable variables for eliminating aberrations thereof, and to further decrease the required amount of lens elements in the optical photographing lens assembly. Therefore, the total track length of the optical photographing lens assembly can also be reduced.

According to the optical photographing lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof.

According to the optical photographing lens assembly of the present disclosure, the positive refractive power or the negative refractive power of a lens element or the focal length of the lens element, that is, may refer to the refractive power or the focal length in a paraxial region of the lens element.

According to the optical photographing lens assembly of the present disclosure, the optical photographing lens assembly can include at least one stop, such as an aperture stop, a glare stop or a field stop. Said glare stop or said field stop is for eliminating the stray light and thereby improving the image resolution thereof.

According to the optical photographing lens assembly of the present disclosure, an image surface of the optical photographing lens assembly, based on the corresponding image sensor, can be flat or curved. In particular, the image surface can be a curved surface being concave facing towards the object side.

According to the optical photographing lens assembly of the present disclosure, an aperture stop can be configured as a front stop or a middle stop. A front stop disposed between an object and the first lens element can provide a longer distance between an exit pupil of the optical photographing lens assembly and the image surface and thereby improves the image-sensing efficiency of an image sensor. A middle stop disposed between the first lens element and the image surface is favorable for enlarging the field of view of the optical photographing lens assembly and thereby provides a wider field of view for the same.

According to the optical photographing lens assembly of the present disclosure, the optical photographing lens assembly can be applied to 3D (three-dimensional) image capturing applications, in products such as digital cameras, mobile devices, digital tablets, smart TVs, surveillance systems, motion sensing input device, vehicle devices (such as driving recording systems, vehicle backup cameras), rear view camera systems, and wearable devices.

According to the present disclosure, an image capturing device is provided. The image capturing device includes the aforementioned optical photographing lens assembly and an image sensor, wherein the image sensor is disposed on the image side of the aforementioned optical photographing lens assembly, that is, the image sensor can be disposed on or near an image surface of the aforementioned optical photographing lens assembly. In the image capturing device with the arrangement of the surface shape of the lens elements of the aforementioned optical photographing lens assembly, the aberration and the astigmatism can be corrected, the spherical aberration and the chromatic aberration can be controlled, and the telephoto ratio can be reduced for achieving the telephoto photography. Preferably, the image capturing device can further include a barrel member, a holding member or a combination thereof.

According to the present disclosure, an electronic device is provided. The electronic device includes the aforementioned image capturing device. Therefore, the image quality of the electronic device can be improved. Preferably, the electronic device can further include but not limited to a control unit, a display, a storage unit, a random access memory unit (RAM), a read only memory unit (ROM) or a combination thereof.

According to the above description of the present disclosure, the following 1st-15th specific embodiments are provided for further explanation.

1st Embodiment

Figure 2:
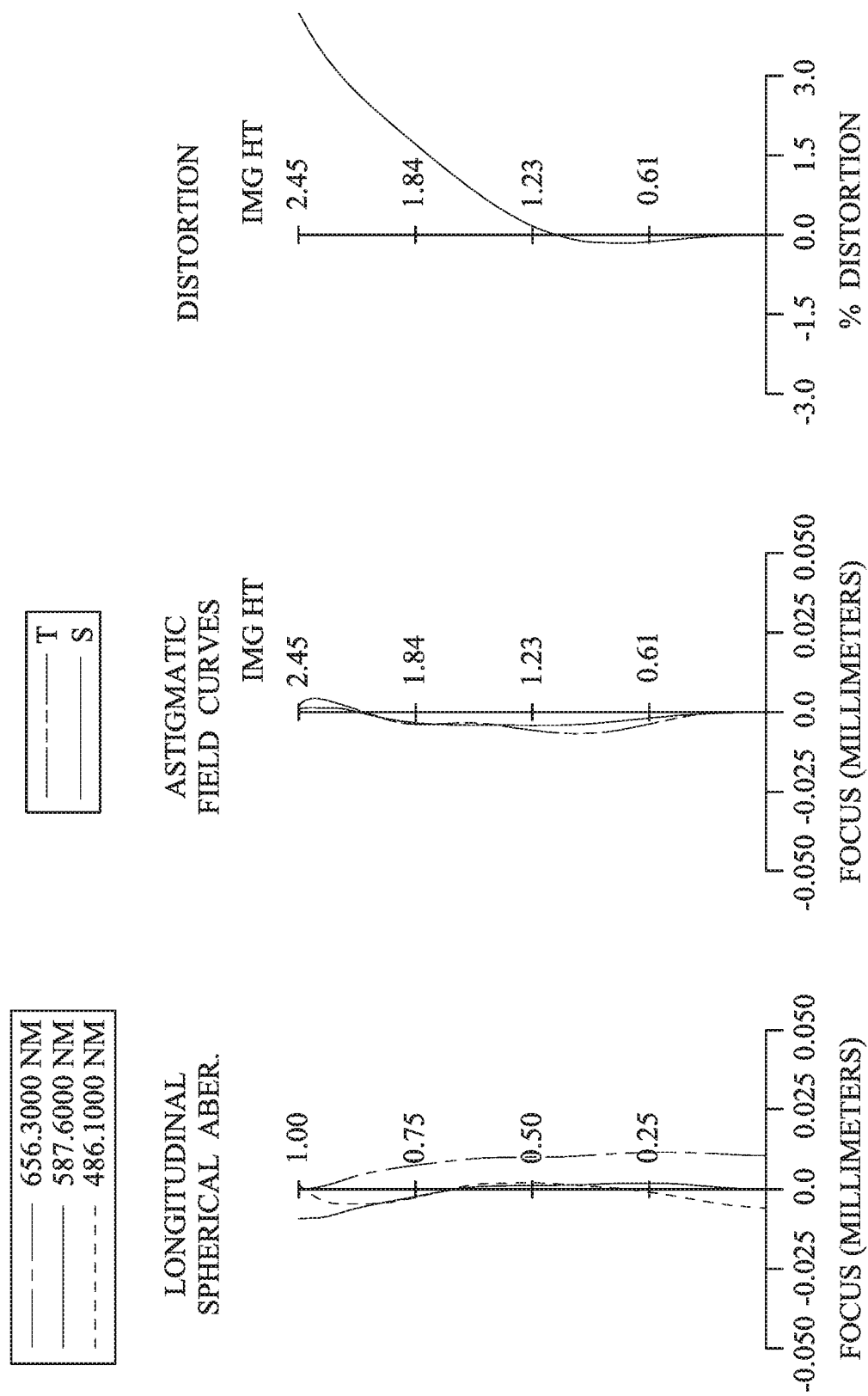
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes an optical photographing lens assembly (its reference numeral is omitted) and an image sensor 180. The optical photographing lens assembly includes, in order from an object side to an image side, an aperture stop 100, a first lens element 110, a second lens element 120, a third lens element 130, a fourth lens element 140, a fifth lens element 150, an IR-cut filter 160 and an image surface 170, wherein the image sensor 180 is disposed on the image surface 170 of the optical photographing lens assembly. The optical photographing lens assembly has a total of five lens elements (110-150). There is an air space in a paraxial region between every two of the first lens element 110, the second lens element 120, the third lens element 130, the fourth lens element 140 and the fifth lens element 150 that are adjacent to each other.

The first lens element 110 with positive refractive power has an object-side surface 111 being convex in a paraxial region thereof and an image-side surface 112 being concave in a paraxial region thereof. The first lens element 110 is made of plastic material, and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material, and has the object-side surface 121 and the image-side surface 122 being both aspheric.

The third lens element 130 with negative refractive power has an object-side surface 131 being concave in a paraxial region thereof and an image-side surface 132 being convex in a paraxial region thereof. The third lens element 130 is made of plastic material, and has the object-side surface 131 and the image-side surface 132 being both aspheric.

The fourth lens element 140 with negative refractive power has an object-side surface 141 being concave in a paraxial region thereof and an image-side surface 142 being concave in a paraxial region thereof. The fourth lens element 140 is made of plastic material, and has the object-side surface 141 and the image-side surface 142 being both aspheric. Furthermore, the image-side surface 142 of the fourth lens element 140 includes at least one convex shape in an off-axial region thereof.

The fifth lens element 150 with positive refractive power has an object-side surface 151 being convex in a paraxial region thereof and an image-side surface 152 being convex in a paraxial region thereof. The fifth lens element 150 is made of plastic material, and has the object-side surface 151 and the image-side surface 152 being both aspheric. Furthermore, the object-side surface 151 of the fifth lens element 150 includes at least one concave shape in an off-axial region thereof.

The IR-cut filter 160 is made of glass material and located between the fifth lens element 150 and the image surface 170, and will not affect the focal length of the optical photographing lens assembly.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_1 (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical photographing lens assembly according to the 1st embodiment, when a focal length of the optical photographing lens assembly is f, an f-number of the optical photographing lens assembly is Fno, and half of a maximal field of view of the optical photographing lens assembly is HFOV, these parameters have the following values: f=5.88 mm; Fno=2.83; and HFOV=21.8 degrees.

In the optical photographing lens assembly according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, and an Abbe number of the fifth lens element 150 is V5, the following condition is satisfied: (V2+V3+V5)/(V1+V4)=0.61.

In the optical photographing lens assembly according to the 1st embodiment, when a central thickness of the second lens element 120 is CT2, a central thickness of the third lens element 130 is CT3, a central thickness of the fourth lens element 140 is CT4, and a central thickness of the fifth lens element 150 is CT5, the following conditions are satisfied: CT3/CT2=2.56; and CT4/CT5=0.69.

In the optical photographing lens assembly according to the 1st embodiment, when the focal length of the optical photographing lens assembly is f, and the central thickness of the fourth lens element 140 is CT4, the following condition is satisfied: f/CT4=11.92.

In the optical photographing lens assembly according to the 1st embodiment, when an axial distance between the second lens element 120 and the third lens element 130 is T23, and an axial distance between the third lens element 130 and the fourth lens element 140 is, T34, the following condition is satisfied: T23/T34=0.31.

In the optical photographing lens assembly according to the 1st embodiment, when a curvature radius of the object-side surface 111 of the first lens element 110 is R1, and a curvature radius of the image-side surface 112 of the first lens element 110 is R2, the following condition is satisfied: (R1+R2)/(R1-R2)=−1.07.

In the optical photographing lens assembly according to the 1st embodiment, when a curvature radius of the object-side surface 121 of the second lens element 120 is R3, and a curvature radius of the image-side surface 122 of the second lens element 120 is R4, the following condition is satisfied: (R3+R4)/(R3−R4)=1.99.

In the optical photographing lens assembly according to the 1st embodiment, when a curvature radius of the object-side surface 141 of the fourth lens element 140 is R7, and a curvature radius of the image-side surface 142 of the fourth lens element 140 is R8, the following condition is satisfied: (R7+R8)/(R7−R8)=0.96.

In the optical photographing lens assembly according to the 1st embodiment, when a curvature radius of the object-side surface 151 of the fifth lens element 150 is R9, and a curvature radius of the image-side surface 152 of the fifth lens element 150 is R10, the following condition is satisfied: (R9+R10)/(R9−R10)=−0.61.

In the optical photographing lens assembly according to the 1st embodiment, when the focal length of the optical photographing lens assembly is f, and a focal length of the first lens element 110 is f1, the following condition is satisfied; f/f1=2.05.

In the optical photographing lens assembly according to the 1st embodiment, when the focal length of the first lens element 110 is f1, and a focal length of the third lens element 130 is f3, the following condition is satisfied: f1/f3=−0.07.

In the optical photographing lens assembly according to the 1st embodiment, when half of a maximal field of view of the optical photographing lens assembly is HFOV, the following condition is satisfied: tan(2×HFOV)=0.95.

In the optical photographing lens assembly according to the 1st embodiment, when an axial distance between the aperture stop 100 and the image-side surface 152 of the fifth lens element 150 is SD, and an axial distance between the object-side surface 111 of the first lens element 110 and the image-side surface 152 of the fifth lens element 150 is TD, the following condition is satisfied: SD/TD=0.91.

In the optical photographing lens assembly according to the 1st embodiment, when an axial distance between the image-side surface 152 of the fifth lens element 150 and the image surface 170 is BL, and the axial distance between the object-side surface 111 of the first lens element 110 and the image-side surface 152 of the fifth lens element 150 is TD, the following condition is satisfied: BL/TD=0.26.

In the optical photographing lens assembly according to the 1st embodiment, when the focal length of the optical photographing lens assembly is f, and an axial distance between the object-side surface 111 of the first lens element 110 and the image surface 170 is TL, the following conditions are satisfied: f/TL=1.05; and TL=5.60 mm.

In the optical photographing lens assembly according to the 1st embodiment, when an axial distance between the first lens element 110 and the second lens element 120 is T12, the axial distance between the second lens element 120 and the third lens element 130 is T23, the axial distance between the third lens element 130 and the fourth lens element 140 is T34, and an axial distance between the fourth lens element 140 and the fifth lens element 150 is T45, the following conditions are satisfied: T12<T23<T34; and T45<T23<T34. Furthermore, the following condition is also satisfied: T45<T12.

The detailed optical data of the 1st embodiment are shown in Table 1 and the aspheric surface data are shown in Table 2 below.

TABLE 1

1st Embodiment
f = 5.88 mm, Fno = 2.83, HFOV = 21.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.406 | | | | |
| 2 | Lens 1 | 1.515 | ASP | 0.805 | Plastic | 1.544 | 55.9 | 2.86 |
| 3 | | 43.975 | ASP | 0.153 | | | | |
| 4 | Lens 2 | 7.236 | ASP | 0.200 | Plastic | 1.650 | 21.4 | −5.62 |
| 5 | | 2.401 | ASP | 0.341 | | | | |
| 6 | Lens 3 | −10.676 | ASP | 0.511 | Plastic | 1.614 | 25.6 | −41.86 |
| 7 | | −18.590 | ASP | 1.114 | | | | |
| 8 | Lens 4 | −136.463 | ASP | 0.493 | Plastic | 1.544 | 55.9 | −5.28 |
| 9 | | 2.941 | ASP | 0.099 | | | | |
| 10 | Lens 5 | 13.819 | ASP | 0.717 | Plastic | 1.650 | 21.4 | 17.15 |
| 11 | | −56.425 | ASP | 0.300 | | | | |
| 12 | IR-cut filter | Plano | | 0.210 | Glass | 1.517 | 64.2 | — |
| 13 | | Plano | | 0.655 | | | | |
| 14 | Image | Plano | | — | | | | |

Reference wavelength is 587.6 nm (d-line).

TABLE 2

Aspheric Coefficients

| Surface # | 2 | 3 | 4 | 5 | 6 |
|---|---|---|---|---|---|
| k= | −2.3032E−01 | −9.0000E+01 | 3.4808E+01 | 4.7751E−01 | 9.0000E+01 |
| A4= | 8.3582E−03 | −6.9478E−02 | −2.7772E−01 | −2.4784E−01 | −1.0322E−01 |
| A6= | 4.9845E−03 | 2.5938E−01 | 9.5577E−01 | 9.4759E−01 | 1.5156E−01 |
| A8= | 9.3883E−03 | −2.6699E−01 | −1.3351E+00 | −1.2036E+00 | 2.8290E−01 |
| A10= | −5.0066E−03 | 9.6931E−02 | 9.5236E−01 | 1.0440E+00 | −5.9266E−01 |
| A12= | 4.0587E−03 | 2.3078E−02 | −3.8431E−01 | −4.6230E−01 | 6.3283E−01 |
| A14= | | −2.4759E−02 | 4.0832E−02 | | −2.8230E−01 |

TABLE 2-continued

Aspheric Coefficients

| Surface # | 7 | 8 | 9 | 10 | 11 |
|---|---|---|---|---|---|
| k= | −4.3762E+01 | −9.0000E+01 | −7.3060E+00 | 2.6985E+01 | −8.4000E+01 |
| A4= | −5.7733E−02 | −1.6636E−01 | −1.3061E−01 | −1.1325E−01 | −9.4634E−02 |
| A6= | 7.7139E−02 | −5.2862E−02 | 4.0331E−03 | 9.7554E−02 | 6.2161E−02 |
| A8= | 7.0804E−02 | 6.3041E−02 | 4.2533E−02 | −4.9033E−02 | −2.2548E−02 |
| A10= | −1.3323E−01 | −9.0266E−03 | −3.0464E−02 | 1.2453E−02 | 3.7579E−03 |
| A12= | 1.2530E−01 | −5.0982E−03 | 9.9840E−03 | −2.0728E−03 | −2.7354E−04 |
| A14= | −4.6966E−02 | 1.5696E−03 | −1.6077E−03 | 2.2281E−04 | −2.6102E−06 |
| A16= | | −6.2792E−06 | 9.9073E−05 | −1.4322E−05 | 9.7639E−07 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
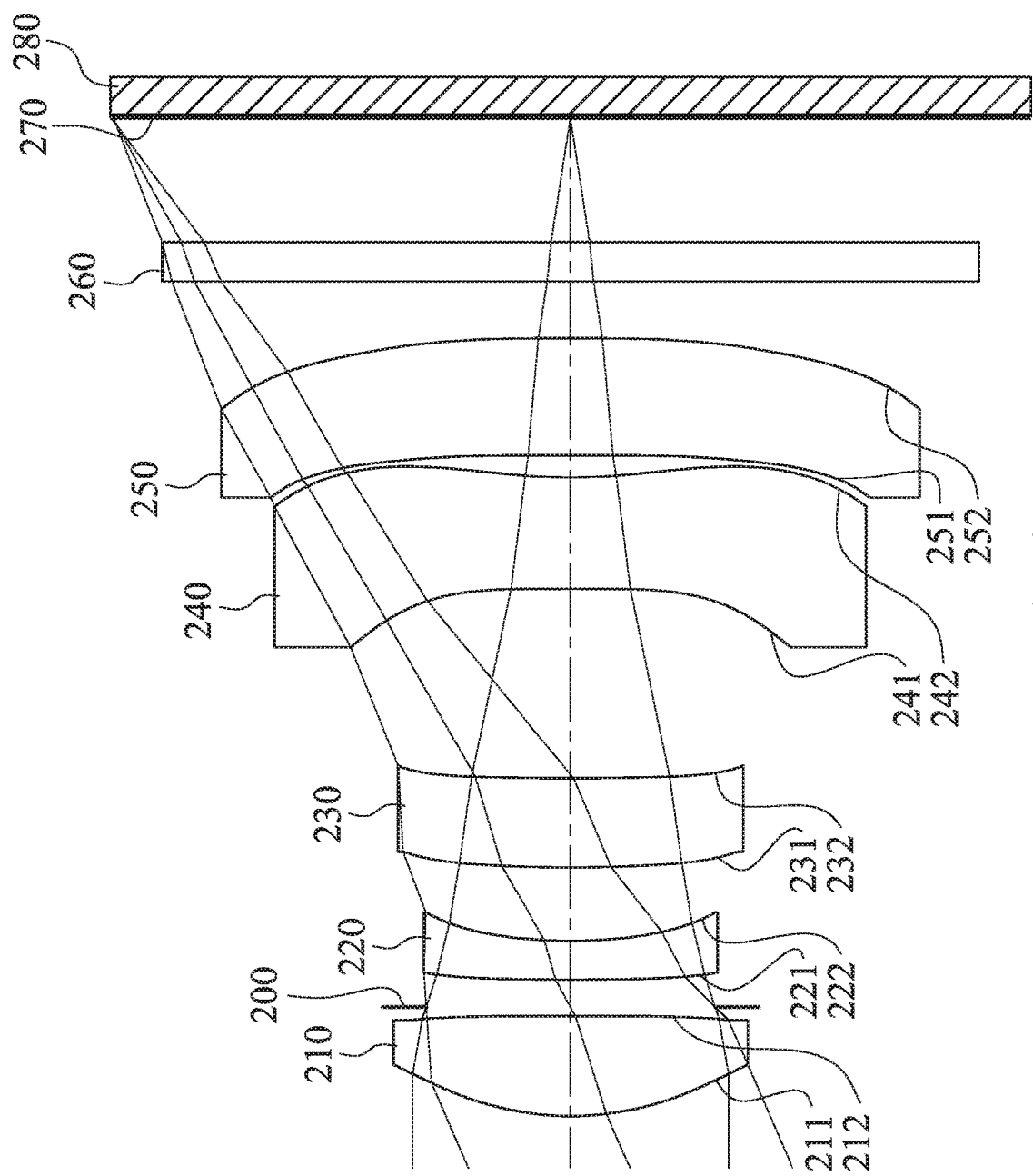
FIG. 3 is a schematic view of an image capturing device according to the 2nd embodiment of the present disclosure.
Figure 4:
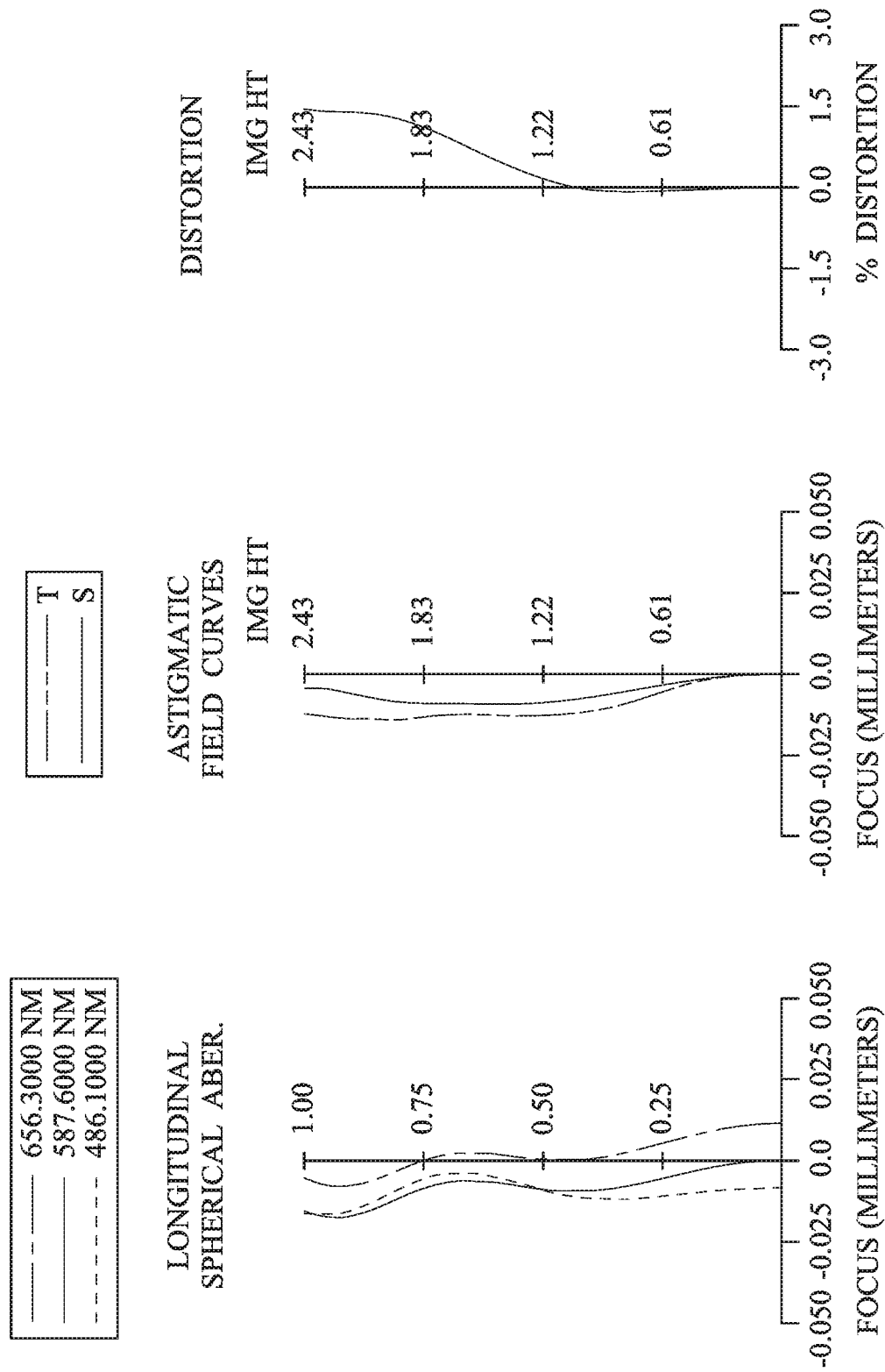
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes an optical photographing lens assembly (its reference numeral is omitted) and an image sensor 280. The optical photographing lens assembly includes, in order from an object side to an image side, a first lens element 210, an aperture stop 200, a second lens element 220, a third lens element 230, a fourth lens element 240, a fifth lens element 250, an IR-cut filter 260 and an image surface 270, wherein the image sensor 280 is disposed on the image surface 270 of the optical photographing lens assembly. The optical photographing lens assembly has a total of five lens elements (210-250). There is an air space in a paraxial region between every two of the first lens element 210, the second lens element 220, the third lens element 230, the fourth lens element 240 and the fifth lens element 250 that are adjacent to each other.

The first lens element 210 with positive refractive power has an object-side surface 211 being convex in a paraxial region thereof and an image-side surface 212 being concave in a paraxial region thereof. The first lens element 210 is made of plastic material, and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material, and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of plastic material, and has the object-side surface 231 and the image-side surface 232 being both aspheric.

The fourth lens element 240 with negative refractive power has an object-side surface 241 being concave in a paraxial region thereof and an image-side surface 242 being concave in a paraxial region thereof. The fourth lens element 240 is made of plastic material, and has the object-side surface 241 and the image-side surface 242 being both aspheric. Furthermore, the image-side surface 242 of the fourth lens element 240 includes at least one convex shape in an off-axial region thereof.

The fifth lens element 250 with positive refractive power has an object-side surface 251 being convex in a paraxial region thereof and an image-side surface 252 being convex in a paraxial region thereof. The fifth lens element 250 is made of plastic material, and has the object-side surface 251 and the image-side surface 252 being both aspheric. Furthermore, the object-side surface 251 of the fifth lens element 250 includes at least one concave shape in an off-axial region thereof.

The IR-cut filter 260 is made of glass material and located between the fifth lens element 250 and the image surface 270, and will not affect the focal length of the optical photographing lens assembly.

The detailed optical data of the 2nd embodiment are shown in Table 3 and the aspheric surface data are shown in Table 4 below.

TABLE 3

2nd Embodiment
f = 5.53 mm, Fno = 3.30, HFOV = 23.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.561 | ASP | 0.531 | Plastic | 1.544 | 55.9 | 2.93 |
| 2 | | 69.591 | ASP | 0.050 | | | | |
| 3 | Ape. Stop | Plano | | 0.146 | | | | |
| 4 | Lens 2 | 8.128 | ASP | 0.206 | Plastic | 1.650 | 21.4 | −5.08 |
| 5 | | 2.325 | ASP | 0.389 | | | | |

TABLE 3-continued

2nd Embodiment
f = 5.53 mm, Fno = 3.30, HFOV = 23.5 deg.

| Surface # | | Curvature Radius | | Thickness | Material | Index | Abbe # | Focal Length |
|---|---|---|---|---|---|---|---|---|
| 6 | Lens 3 | 6.618 | ASP | 0.474 | Plastic | 1.639 | 23.5 | 19.56 |
| 7 | | 13.674 | ASP | 1.008 | | | | |
| 8 | Lens 4 | −136.463 | ASP | 0.593 | Plastic | 1.544 | 55.9 | −5.20 |
| 9 | | 2.896 | ASP | 0.117 | | | | |
| 10 | Lens 5 | 57.587 | ASP | 0.622 | Plastic | 1.639 | 23.5 | 44.70 |
| 11 | | −56.425 | ASP | 0.300 | | | | |
| 12 | IR-cut filter | Plano | | 0.210 | Glass | 1.517 | 64.2 | — |
| 13 | | Plano | | 0.668 | | | | |
| 14 | Image | Plano | | — | | | | |

Reference wavelength is 587.6 nm (d-line).

TABLE 4

Aspheric Coefficients

| Surface # | 1 | 2 | 4 | 5 | 6 |
|---|---|---|---|---|---|
| k= | −4.9398E−01 | 9.0000E+01 | 6.6393E+01 | 9.5932E−01 | 2.5848E+00 |
| A4= | −2.6303E−0.3 | −1.0557E−01 | −2.7564E−01 | −2.4168E−01 | −8.3802E−02 |
| A6= | −1.7802E−02 | 1.9345E−01. | 9.2806E−01 | 9.7502E−01 | 1.2419E−01 |
| A8= | 9.7941E−03 | −2.2266E−01 | −1.3296E+00 | −1.3454E+00 | 2.9415E−01 |
| A10= | −1.8875E−02 | 8.1647E−02 | 1.0055E+00 | 1.1442E+00 | −6.6205E−01 |
| A12= | −1.2358E−02 | 4.5007E−03 | −3.6223E−01 | −4.6230E−01 | 6.1330E−01 |
| A14= | | −1.0679E−02 | 4.0832E−02 | | −2.3488E−01 |

| Surface # | 7 | 8 | 9 | 10 | 11 |
|---|---|---|---|---|---|
| k= | 6.0412E+01 | 6.6000E+01 | −5.6778E−01 | −5.1597E+01 | −8.4000E+01 |
| A4= | −5.5054E−02 | −1.7327E−01 | −1.3870E−01 | −1.0051E−01 | −9.7896E−02 |
| A6= | 9.3320E−02 | −5.5449E−02 | −3.6646E−03 | 9.4209E−02 | 6.5946E−02 |
| A8= | 7.4376E−02 | 6.8254E−02 | 4.3206E−02 | −4.9552E−02 | −2.2866E−02 |
| A10= | −1.1654E−01 | −6.7270E−03 | −3.0613E−02 | 1.2930E−02 | 3.5716E−03 |
| A12= | 1.3020E−01 | −3.2069E−03 | 1.0033E−02 | −2.1490E−03 | −2.5939E−04 |
| A14= | −6.1417E−02 | 1.4856E−03 | −1.6869E−03 | 1.8903E−04 | 6.6024E−06 |
| A16= | | −4.8446E−04 | 8.6121E−05 | −3.5721E−06 | 3.2667E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

2nd Embodiment

| | | | |
|---|---|---|---|
| f [mm] | 5.53 | (R7 + R8)/(R7 − R8) | 0.96 |
| Fno | 3.30 | (R9 + R10)/(R9 − R10) | 0.01 |
| HFOV [deg.] | 23.5 | f/f1 | 1.89 |
| (V2 + V3 + V5)/(V1 + V4) | 0.61 | f1/f3 | 0.15 |
| CT3/CT2 | 2.30 | tan(2 × HFOV) | 1.07 |
| CT4/C15 | 0.96 | SD/TD | 0.86 |
| f/CT4 | 9.33 | BL/TD | 0.28 |
| T23/T34 | 0.39 | f/TL | 1.04 |
| (R1 + R2)/(R1 − R2) | −1.05 | TL [mm] | 5.31 |
| (R3 + R4)/(R3 − R4) | 1.80 | | |

In the optical photographing lens assembly according to the 2nd embodiment, when the axial distance between the first lens element 210 and the second lens element 220 is T12, the axial distance between the second lens element 220 and the third lens element 230 is T23, the axial distance between the third lens element 230 and the fourth lens element 240 is T34, and the axial distance between the fourth lens element 240 and the fifth lens element 250 is T45, the following conditions are satisfied: T12<T23<T34; and T45<T23<T34. Furthermore, the following condition is also satisfied: T45<T12.

<3rd Embodiment

Figure 5:
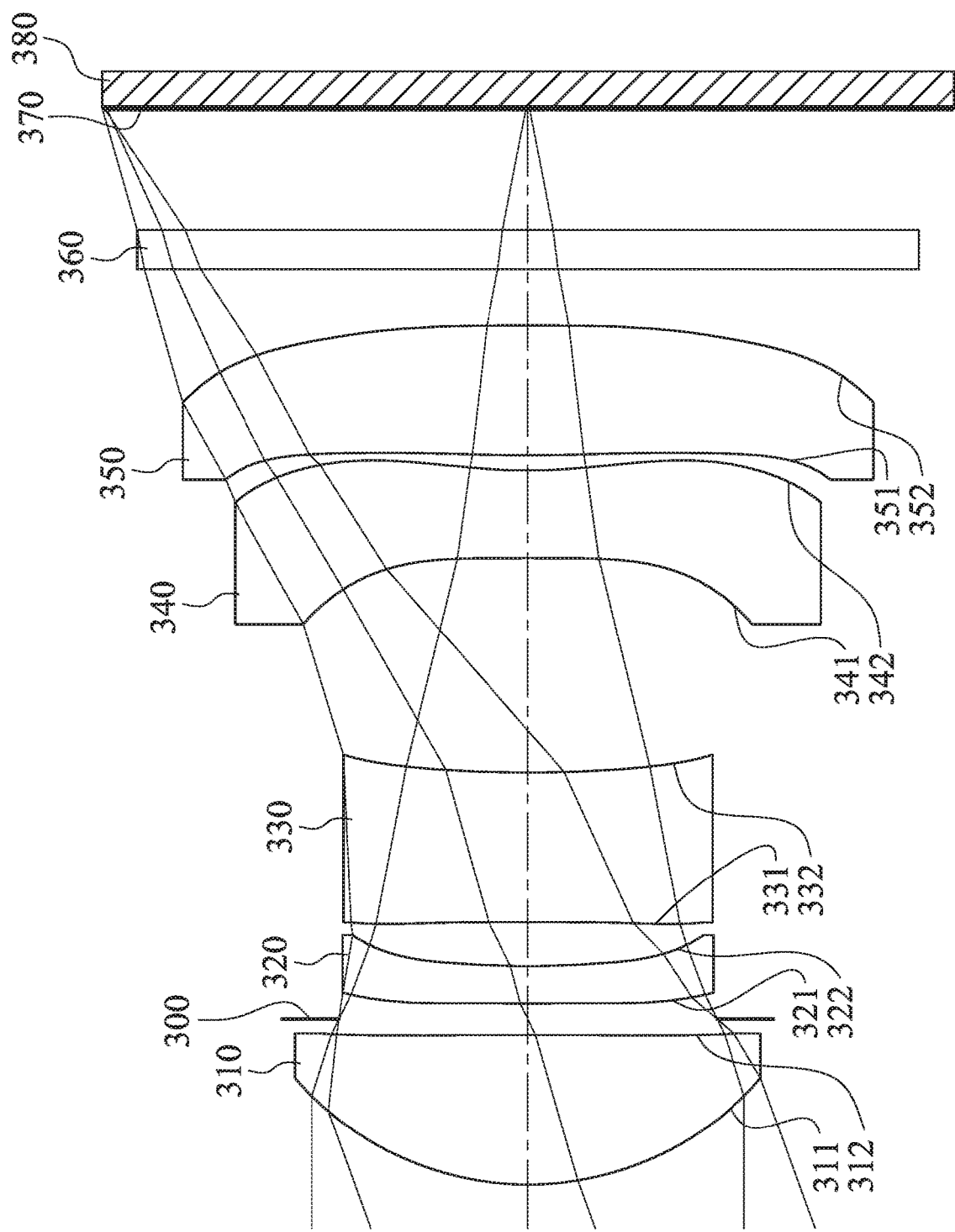
FIG. 5 is a schematic view of an image capturing device according to the 3rd embodiment of the present disclosure.
Figure 6:
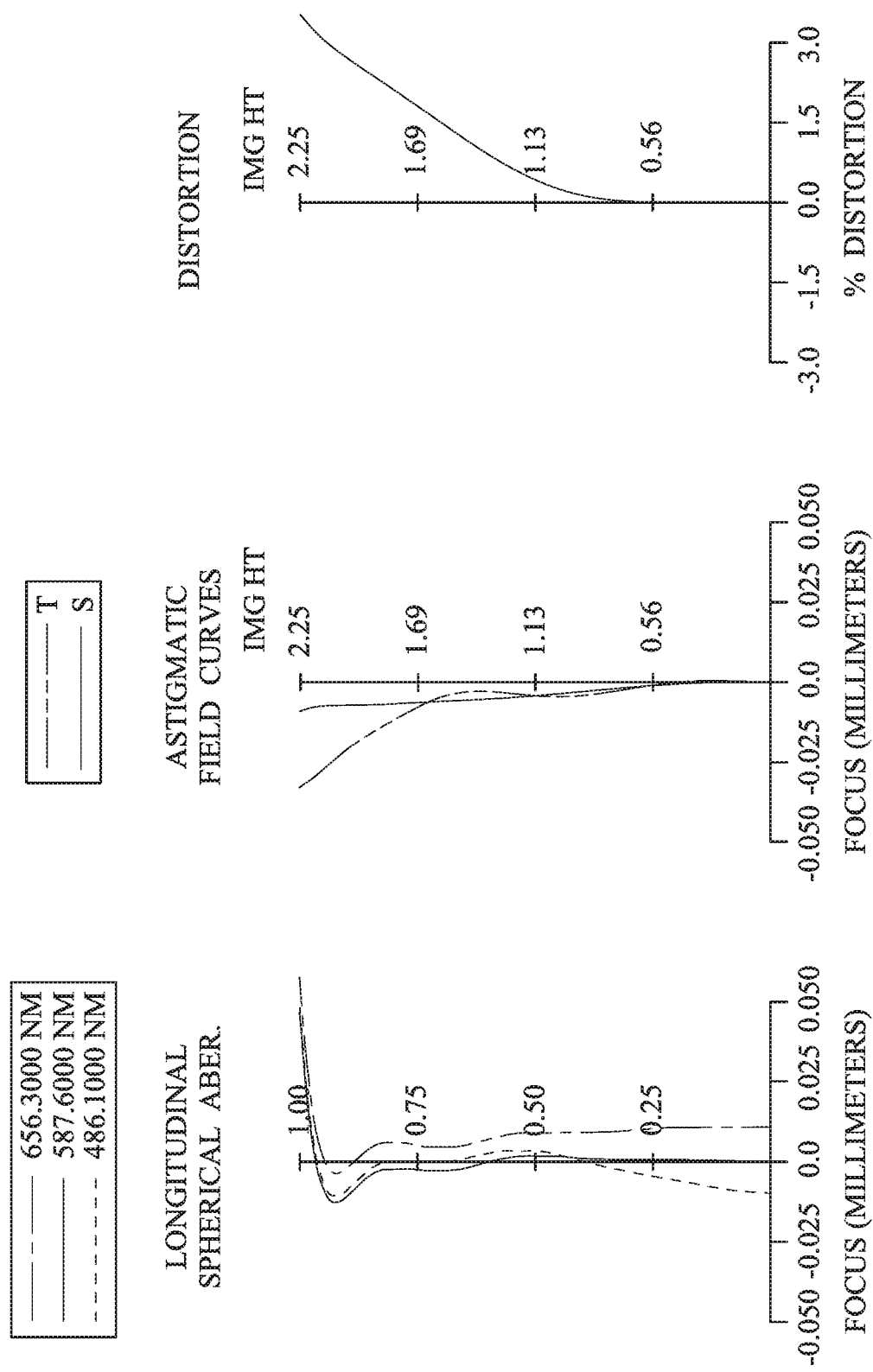
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes an optical photographing lens assembly (its reference numeral is omitted) and an image sensor 380. The optical photographing lens assembly includes, in order from an object side to an image side, a first lens element 310, an aperture stop 300, a second lens element 320, a third lens element 330, a fourth lens element 340, a fifth lens element 350, an IR-cut filter 360 and an image surface 370, wherein the image sensor 380 is disposed on the image surface 370 of the optical photographing lens assembly. The optical photographing lens assembly has a total of five lens elements (310-350). There is an air space in a paraxial region between every two of the first lens element 310, the second lens element 320, the third lens element 330, the fourth lens element 340 and the fifth lens element 350 that are adjacent to each other.

The first lens element 310 with positive refractive power has an object-side surface 311 being convex in a paraxial region thereof and an image-side surface 312 being concave in a paraxial region thereof. The first lens element 310 is made of plastic material, and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material, and has the object-side surface 321 and the image-side surface 322 being both aspheric.

The third lens element 330 with negative refractive power has an object-side surface 331 being concave in a paraxial region thereof and an image-side surface 332 being concave in a paraxial region thereof. The third lens element 330 is made of plastic material, and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of plastic material, and has the object-side surface 341 and the image-side surface 342 being both aspheric. Furthermore, the image-side surface 342 of the fourth lens element 340 includes at least one convex shape in an off-axial region thereof.

The fifth lens element 350 with positive refractive power has an object-side surface 351 being convex in a paraxial region thereof and an image-side surface 352 being convex in a paraxial region thereof. The fifth lens element 350 is made of plastic material, and has the object-side surface 351 and the image-side surface 352 being both aspheric. Furthermore, the object-side surface 351 of the fifth lens element 350 includes at least one concave shape in an off-axial region thereof.

The IR-cut filter 360 is made of glass material and located between the fifth lens element 350 and the image surface 370, and will not affect the focal length of the optical photographing lens assembly.

The detailed optical data of the 3rd embodiment are shown in Table 5 and the aspheric surface data are shown in Table 6 below.

TABLE 5

3rd Embodiment
$f = 6.00$ mm, Fno = 2.60, HFOV = 19.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.624 | ASP | 0.800 | Plastic | 1.544 | 55.9 | 3.04 |
| 2 | | 77.658 | ASP | 0.086 | | | | |
| 3 | Ape. Stop | Plano | | 0.083 | | | | |
| 4 | Lens 2 | 14.237 | ASP | 0.200 | Plastic | 1.650 | 21.4 | −9.06 |
| 5 | | 4.143 | ASP | 0.235 | | | | |
| 6 | Lens 3 | −173.067 | ASP | 0.800 | Plastic | 1.639 | 23.5 | −10.11 |
| 7 | | 6.723 | ASP | 1.146 | | | | |
| 8 | Lens 4 | −85.231 | ASP | 0.468 | Plastic | 1.544 | 55.9 | −5.17 |
| 9 | | 2.912 | ASP | 0.081 | | | | |
| 10 | Lens 5 | 8.008 | ASP | 0.695 | Plastic | 1.639 | 23.5 | 11.15 |
| 11 | | −62.589 | ASP | 0.300 | | | | |
| 12 | IR-cut filter | Plano | | 0.210 | Glass | 1.517 | 64.2 | — |
| 13 | | Plano | | 0.653 | | | | |
| 14 | Image | Plano | | — | | | | |

Reference wavelength is 587.6 nm (d-line).

TABLE 6

Aspheric Coefficients

| Surface # | 1 | 2 | 4 | 5 | 6 |
|---|---|---|---|---|---|
| k= | −2.4960E−01 | 9.0000E+01 | −1.9220E+01 | 1.7130E−01 | 5.1000E+01 |
| A4= | 1.3674E−03 | −0.2159E−02 | −2.7626E−01 | −2.6680E−01 | −9.2617E−02 |
| A6= | 6.7335E−03 | 2.2742E−01 | 9.2892E−01 | 9.6716E−01 | 8.0719E−02 |
| A8= | −1.7916E−03 | −2.2772E−01 | −1.2663E+00 | −1.3365E+00 | 2.5772E−01 |
| A10= | −6.1486E−04 | 1.0353E−01 | 9.7071E−01 | 1.1905E+00 | −6.1637E−01 |
| A12= | 9.8719E−04 | −9.1616E−03 | −3.7271E−01 | −4.6229E−01 | 6.0925E−01 |
| A14= | | −5.1249E−03 | 4.0820E−02 | | −2.3486E−01 |

| Surface # | 7 | 8 | 9 | 10 | 11 |
|---|---|---|---|---|---|
| k= | 3.9268E+01 | −9.0000E+01 | −7.7373E−01 | −6.1431E+01 | 6.9783E+01 |
| A4= | −3.1413E−02 | −1.4823E−01 | −1.5192E−01 | −9.7820E−02 | −9.2366E−02 |
| A6= | 2.0919E02 | −6.3698E−02 | 3.4122E−01 | 9.4294E−02 | 6.2462E−02 |
| A8= | 5.0987E−02 | 5.3188E−02 | 4.2224E−02 | −4.8953E−02 | −2.2541E−02 |
| A10= | −1.1699E−01 | −1.0236E−02 | −3.0335E−02 | 1.2852E−02 | 3.6325E−03 |
| A12= | 1.1701E−01 | 1.3216E−04 | 1.0063E−02 | −2.1264E−03 | −2.7821E−04 |
| A14= | −5.2777E−02 | 2.7646E−04 | −1.6170E−03 | 2.0234E−04 | −1.5334E−06 |
| A16= | | −9.8233E−04 | 7.8130E−05 | −1.6131E−05 | 1.3966E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 6.00 | (R7 + R6)/(R7 − R8) | 0.93 |
| Fno | 2.60 | (R9 + R10)/(R9 − R10) | −0.77 |
| HFOV [deg.] | 19.9 | f/f1 | 1.98 |
| (V2 + V3 + V5)/(V1 + V4) | 0.61 | f1/f3 | −0.30 |
| CT3/CT2 | 4.00 | tan(2 × HFOV) | 0.83 |
| CT4/CT5 | 0.67 | SD/TD | 0.81 |
| f/CT4 | 12.82 | BL/TD | 0.25 |
| T23/T34 | 0.21 | f/fL | 1.04 |
| (R1 + R2)/(R1 − R2) | −1.04 | TL [mm] | 5.76 |
| (R3 + R4)/(R3 − R4) | 1.82 | | |

In the optical photographing lens assembly according to the 3rd embodiment, when the axial distance between the first lens element 310 and the second lens element 320 is T12, the axial distance between the second lens element 320 and the third lens element 330 is T23, the axial distance between the third lens element 330 and the fourth lens element 340 is T34, and the axial distance between the fourth lens element 340 and the fifth lens element 350 is T45, the following conditions are satisfied: T12<T23<T34; and T45<T23<T34. Furthermore, the following condition is also satisfied: T45<T12.

4th Embodiment

Figure 7:
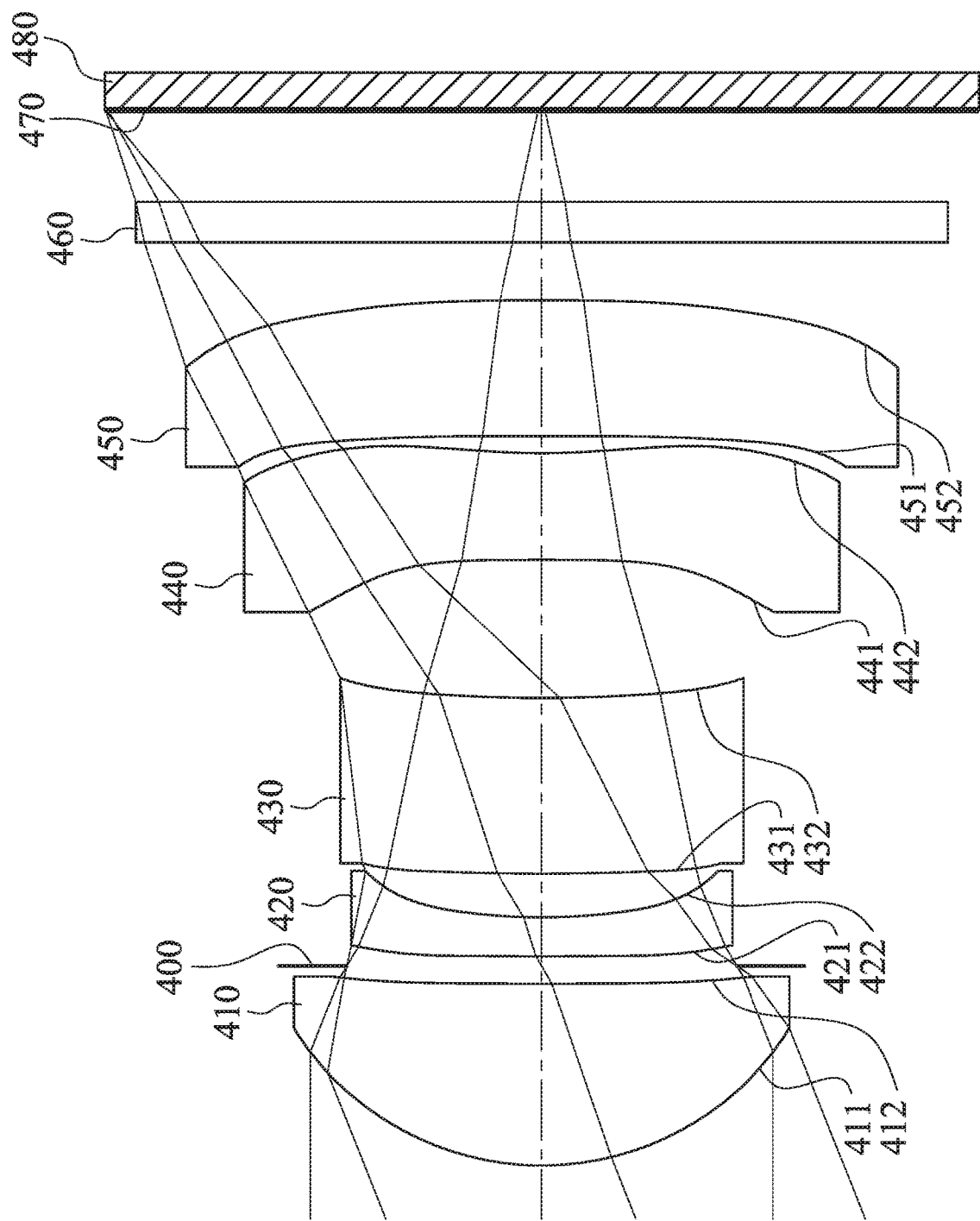
FIG. 7 is a schematic view of an image capturing device according to the 4th embodiment of the present disclosure.
Figure 8:
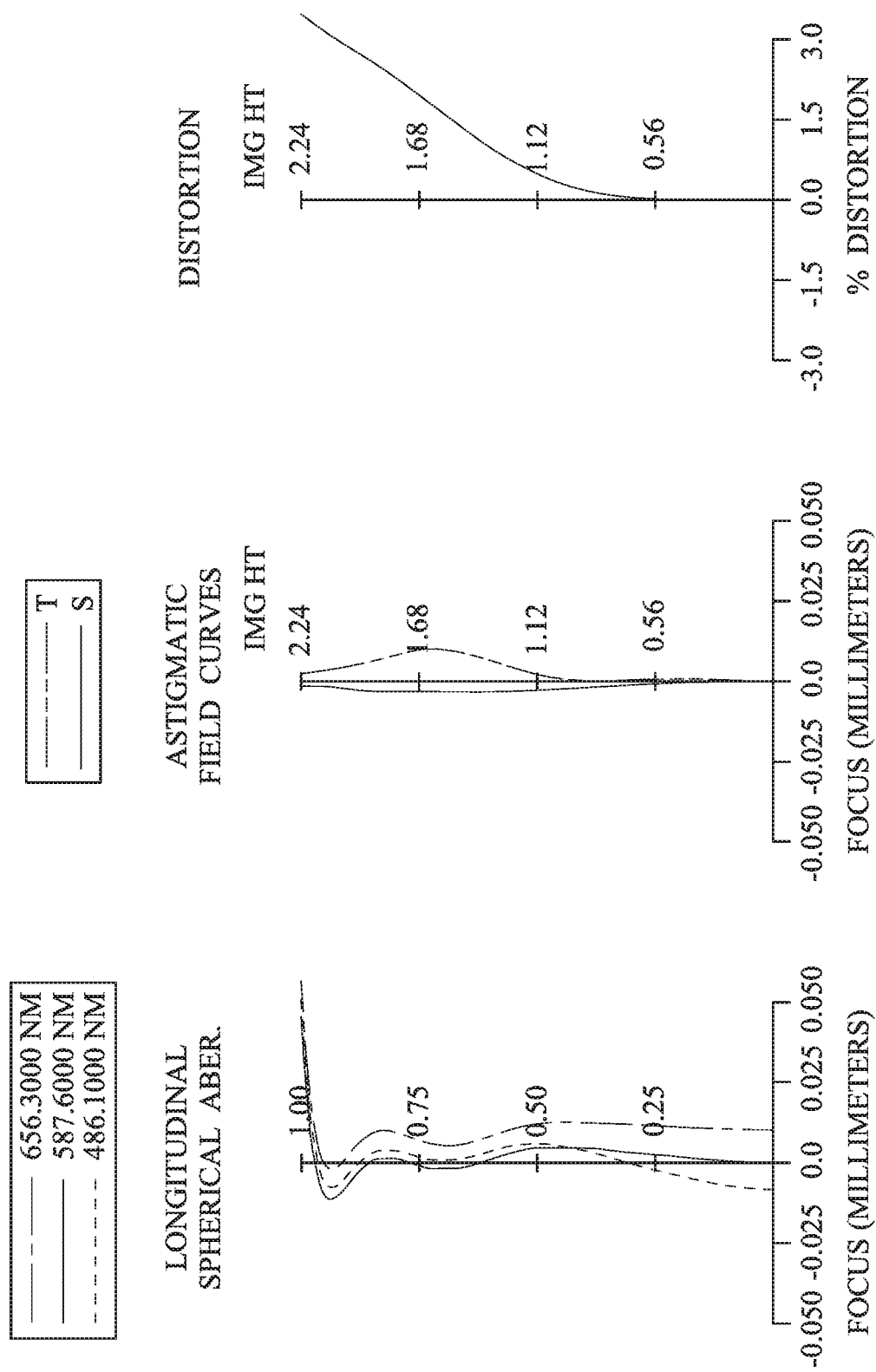
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes an optical photographing lens assembly (its reference numeral is omitted) and an image sensor 480. The optical photographing lens assembly includes, in order from an object side to an image side, a first lens element 410, an aperture stop 400, a second lens element 420, a third lens element 430, a fourth lens element 440, a fifth lens element 450, an IR-cut filter 460 and an image surface 470, wherein the image sensor 480 is disposed on the image surface 470 of the optical photographing lens assembly. The optical photographing lens assembly has a total of five lens elements (410-450). There is an air space in a paraxial region between every two of the first lens element 410, the second lens element 420, the third lens element 430, the fourth lens element 440 and the fifth lens element 450 that are adjacent to each other.

The first lens element 410 with positive refractive power has an object-side surface 411 being convex in a paraxial region thereof and an image-side surface 412 being concave in a paraxial region thereof. The first lens element 410 is made of plastic material, and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material, and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material, and has the object-side surface 431 and the image-side surface 432 being both aspheric.

The fourth lens element 440 with negative refractive power has an object-side surface 441 being concave in a paraxial region thereof and an image-side surface 442 being concave in a paraxial region thereof. The fourth lens element 440 is made of plastic material, and has the object-side surface 441 and the image-side surface 442 being both aspheric. Furthermore, the image-side surface 442 of the fourth lens element 440 includes at least one convex shape in an off-axial region thereof.

The fifth lens element 450 with positive refractive power has an object-side surface 451 being convex in a paraxial region thereof and an image-side surface 452 being convex in a paraxial region thereof. The fifth lens element 450 is made of plastic material, and has the object-side surface 451 and the image-side surface 452 being both aspheric. Furthermore, the object-side surface 451 of the fifth lens element 450 includes at least one concave shape in an off-axial region thereof.

The IR-cut filter 460 is made of glass material and located between the fifth lens element 450 and the image surface 470, and will not affect the focal length of the optical photographing lens assembly.

The detailed optical data of the 4th embodiment are shown in Table 7 and the aspheric surface data are shown in Table 8 below.

TABLE 7

4th Embodiment
f = 5.43 mm, Fno = 2.30, HFOV = 21.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.501 | ASP | 0.938 | Plastic | 1.544 | 55.9 | 2.93 |
| 2 | | 20.561 | ASP | 0.091 | | | | |
| 3 | Ape. Stop | Plano | | 0.050 | | | | |
| 4 | Lens 2 | 11.837 | ASP | 0.200 | Plastic | 1.650 | 21.4 | −5.42 |
| 5 | | 2.694 | ASP | 0.225 | | | | |
| 6 | Lens 3 | 9.103 | ASP | 0.908 | Plastic | 1.639 | 23.5 | −62.13 |
| 7 | | 7.117 | ASP | 0.711 | | | | |
| 8 | Lens 4 | −85.231 | ASP | 0.552 | Plastic | 1.544 | 55.9 | −6.62 |
| 9 | | 3.772 | ASP | 0.086 | | | | |

TABLE 7-continued

4th Embodiment
f = 5.43 mm, Fno = 2.30, HFOV = 21.7 deg.

| Surface # | | Curvature Radius | Thickness | Material | Index | Abbe # | Focal Length |
|---|---|---|---|---|---|---|---|
| 10 | Lens 5 | 33.310 ASP | 0.700 | Plastic | 1.639 | 23.5 | 31.64 |
| 11 | | −51.026 ASP | 0.300 | | | | |
| 12 | IR-cut filter | Plano | 0.210 | Glass | 1.517 | 64.2 | — |
| 13 | | Plano | 0.472 | | | | |
| 14 | Image | Plano | — | | | | |

Reference wavelength is 587.6 nm (d-line).

TABLE 8

Aspheric Coefficients

| Surface # | 1 | 2 | 4 | 6 | 6 |
|---|---|---|---|---|---|
| k= | −2.1294E−01 | 8.7422E+01 | 3.5541E+01 | 1.7656E+00 | 1.1446E+01 |
| A4= | 3.1247E−03 | −8.8861E−02 | −2.7309E−01 | −2.6648E−01 | −9.9085E−02 |
| A6= | 6.2359E−03 | 2.2962E−01 | 9.2683E−01 | 9.8791E−01 | 8.4677E−02 |
| A8= | −3.9445E−04 | −2.2481E−01 | −1.2703E+00 | −1.3477E+00 | 2.6062E−01 |
| A10= | −1.3298E−03 | 1.0254E−01 | 9.6339E−01 | 1.2262E+00 | −5.9796E−01 |
| A12= | 1.8566E−03 | −1.0820E−02 | −3.7282E−01 | −4.6229E−01 | 6.0925E−01 |
| A14= | | −5.0918E−03 | 4.0820E−02 | | −2.3486E−01 |

| Surface # | 7 | 8 | 9 | 10 | 11 |
|---|---|---|---|---|---|
| k= | 3.7524E+01 | −9.0000E+01 | 1.1361E+00 | 9.0000E+01 | −8.4000E+01 |
| A4= | −4.4817E−02 | −1.5622E−01 | −1.3659E−01 | −9.0793E−02 | −8.2599E−02 |
| A6= | 3.1081E−02 | −6.3347E−02 | 1.0838E−03 | 9.3259E−02 | 5.8618E−02 |
| A8= | 4.7388E−02 | 5.6470E−02 | 4.1971E−02 | −4.9791E−02 | −2.1863E−02 |
| A10= | −1.0297E−01 | −1.0670E−03 | −3.0126E−02 | 1.2831E−02 | 3.7209E−03 |
| A12= | 1.1701E−01 | 1.2946E−04 | 1.0061E−02 | −2.0463E−03 | −2.9155E−04 |
| A14= | −5.2777E−02 | 2.6083E−04 | −1.6228E−03 | 2.2459E−04 | −5.5992E−06 |
| A16= | | −9.8232E−04 | 7.6843E−05 | −2.8391E−05 | 2.3872E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 5.43 | (R7 + R8)/(R7 − R8) | 0.92 |
| Fno | 2.30 | (R9 + R10)/(R9 − R10) | −0.21 |
| HFOV [deg.] | 21.7 | f/f1 | 1.85 |
| (V2 + V3 + V5)/(V1 + V4) | 0.61 | f1/f3 | −0.05 |
| CT3/CT2 | 4.54 | tan(2 × HFOV) | 0.95 |
| CT4/CT5 | 0.79 | SD/TD | 0.77 |
| f/CT4 | 9.83 | BL/TD | 0.22 |
| T23/T34 | 0.32 | f/TL | 1.00 |
| (R1 + R2)/(R1 − R2) | −1.16 | TL [mm] | 5.44 |
| (R3 + R4)/(R3 − R4) | 1.59 | | |

In the optical photographing lens assembly according to the 4th embodiment, when the axial distance between the first lens element 410 and the second lens element 420 is T12, the axial distance between the second lens element 420 and the third lens element 430 is T23, the axial distance between the third lens element 430 and the fourth lens element 440 is T34, and the axial distance between the fourth lens element 440 and the fifth lens element 450 is T45, the following conditions are satisfied: T12<T23<T34; and T45<T23<T34. Furthermore, the following condition is also satisfied: T45<T12.

5th Embodiment

Figure 9:
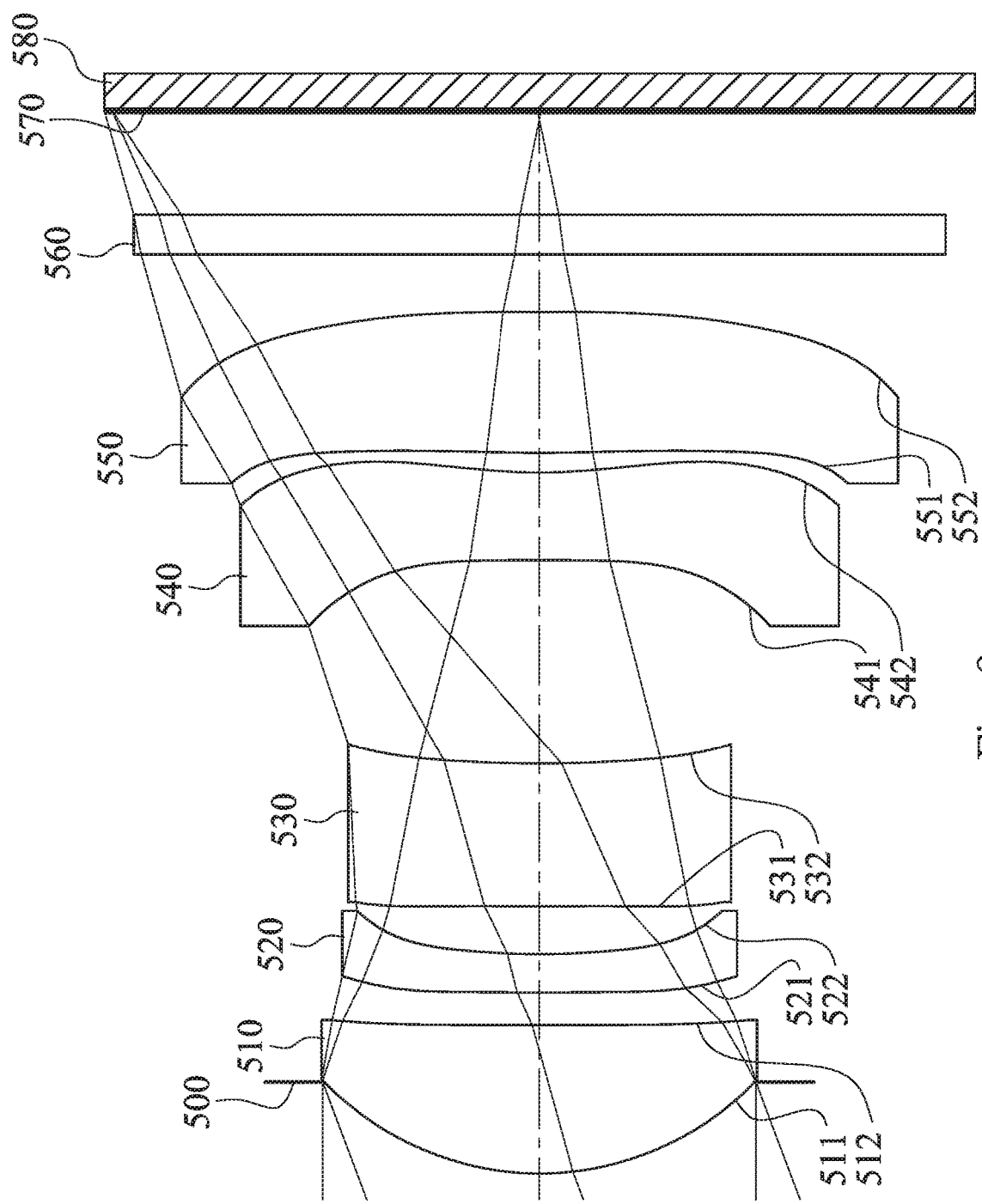
FIG. 9 is a schematic view of an image capturing device according to the 5th embodiment of the present disclosure.
Figure 10:
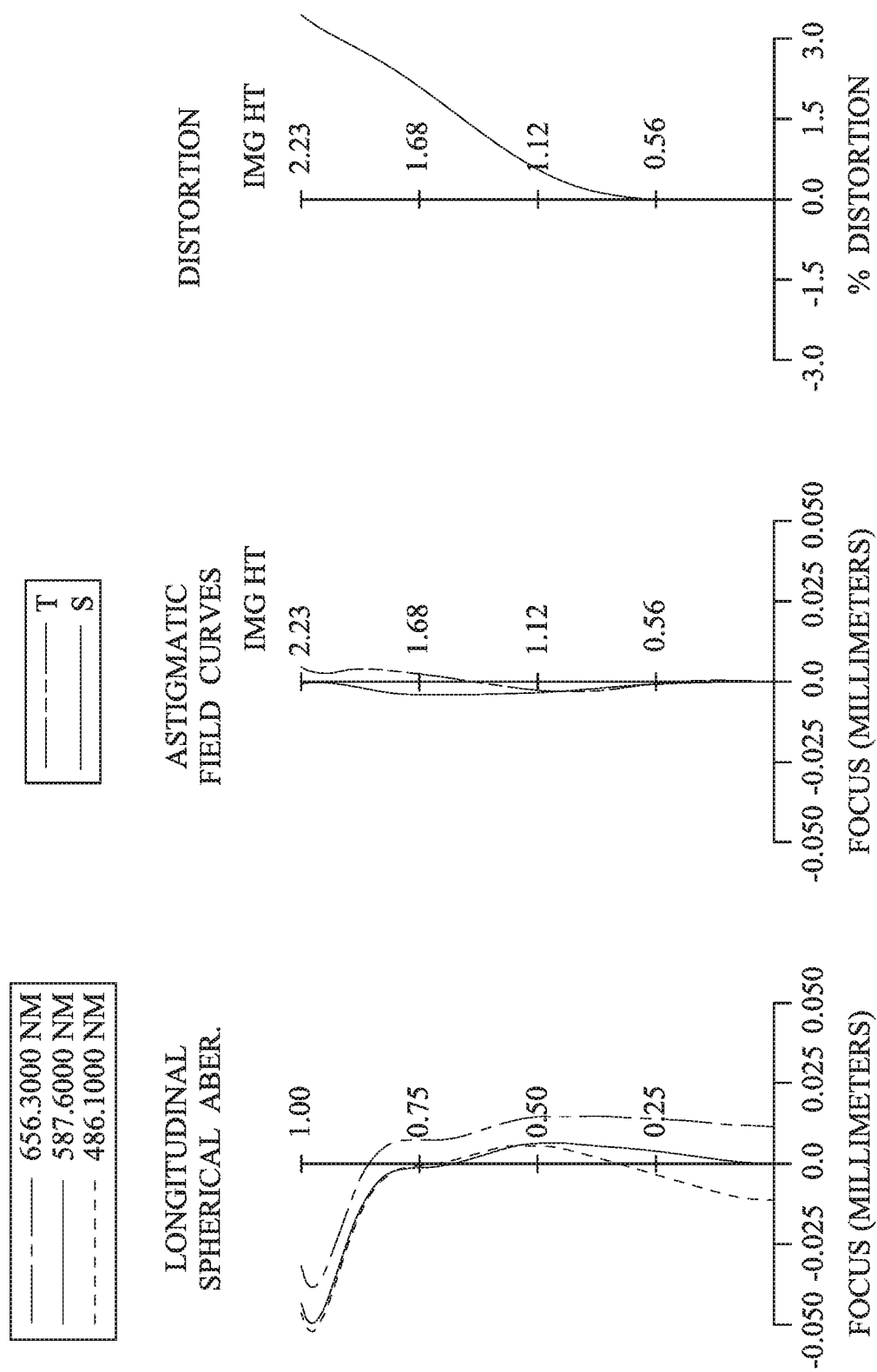
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes an optical photographing lens assembly (its reference numeral is omitted) and an image sensor 580. The optical photographing lens assembly includes, in order from an object side to an image side, an aperture stop 500, a first lens element 510, a second lens element 520, a third lens element 530, a fourth lens element 540, a fifth lens element 550, an IR-cut filter 560 and an image surface 570, wherein the image sensor 580 is disposed on the image surface 570 of the optical photographing lens assembly. The optical photographing lens assembly has a total of five lens elements (510-550). There is an air space in a paraxial region between every two of the first lens element 510, the second lens element 520, the third lens element 530, the fourth lens element 540 and the fifth lens element 550 that are adjacent to each other.

The first lens element 510 with positive refractive power has an object-side surface 511 being convex in a paraxial region thereof and an image-side surface 512 being concave in a paraxial region thereof. The first lens element 510 is made of plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material, and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material, and has the object-side surface 531 and the image-side surface 532 being both aspheric.

The fourth lens element 540 with negative refractive power has an object-side surface 541 being concave in a paraxial region thereof and an image-side surface 542 being concave in a paraxial region thereof. The fourth lens element 540 is made of plastic material, and has the object-side surface 541 and the image-side surface 542 being both aspheric. Furthermore, the image-side surface 542 of the fourth lens element 540 includes at least one convex shape in an off-axial region thereof.

The fifth lens element 550 with positive refractive power has an object-side surface 551 being convex in a paraxial region thereof and an image-side surface 552 being convex in a paraxial region thereof. The fifth lens element 550 is made of plastic material, and has the object-side surface 551 and the image-side surface 552 being both aspheric. Furthermore, the object-side surface 551 of the fifth lens element 550 includes at least one concave shape in an off-axial region thereof.

The IR-cut filter 560 is made of glass material and located between the fifth lens element 550 and the image surface 570, and will not affect the focal length of the optical photographing lens assembly.

The detailed optical data of the 5th embodiment are shown in Table 9 and the aspheric surface data are shown in Table 10 below.

TABLE 9

5th Embodiment
f = 5.77 mm, Fno = 2.55, HFOV = 20.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.477 | | | | |
| 2 | Lens 1 | 1.546 | ASP | 0.775 | Plastic | 1.544 | 55.9 | 2.99 |
| 3 | | 26.184 | ASP | 0.172 | | | | |
| 4 | Lens 2 | 11.517 | ASP | 0.200 | Plastic | 1.650 | 21.4 | −7.72 |
| 5 | | 3.470 | ASP | 0.250 | | | | |
| 6 | Lens 3 | 32.469 | ASP | 0.746 | Plastic | 1.639 | 23.5 | −13.79 |
| 7 | | 6.869 | ASP | 1.064 | | | | |
| 8 | Lens 4 | −89.654 | ASP | 0.461 | Plastic | 1.544 | 55.9 | −5.13 |
| 9 | | 2.888 | ASP | 0.104 | | | | |
| 10 | Lens 5 | 8.875 | ASP | 0.735 | Plastic | 1.639 | 23.5 | 12.63 |
| 11 | | −85.981 | ASP | 0.300 | | | | |
| 12 | IR-cut filter | Plano | | 0.210 | Glass | 1.517 | 64.2 | — |
| 13 | | Plano | | 0.542 | | | | |
| 14 | Image | Plano | | — | | | | |

Reference wavelength is 587.6 nm (d-line).

TABLE 10

Aspheric Coefficients

| Surface # | 2 | 3 | 4 | 5 | 6 |
|---|---|---|---|---|---|
| k= | −2.3830E−01 | −7.8184E+01 | 2.7294E+01 | 1.9279E+00 | −9.0000E+01 |
| A4= | 7.8605E−04 | −9.1337E−02 | −2.7447E−01 | −2.6335E−01 | −9.3068E−02 |
| A6= | 9.3296E−03 | 2.2939E−01 | 9.3004E−01 | 9.7082E−01 | 9.1462E−02 |
| A8= | −2.2174E−03 | −2.2666E−01 | −1.2585E+00 | −1.3344E+00 | 2.3971E−01 |
| A10= | −1.8722E−03 | 1.0213E−01 | 9.6610E−01 | 1.2060E+00 | −5.9908E−01 |
| A12= | 1.9789E−03 | −8.6224E−03 | −3.7248E−01 | −4.6245E−01 | 6.0951E−01 |
| A14= | | −5.1449E−03 | 4.0933E−02 | | −2.3452E−01 |

| Surface # | 7 | 8 | 9 | 10 | 11 |
|---|---|---|---|---|---|
| k= | 3.8340E+01 | 6.6000E+01 | −3.7296E−01 | −4.7132E+01 | −8.4000E+01 |
| A4= | −2.6406E−02 | −1.4579E−01 | −1.4870E−01 | −9.9836E−02 | −9.4121E−02 |
| A6= | 2.1737E−02 | −6.0600E−02 | 2.4822E−03 | 9.3684E−02 | 6.2208E−02 |
| A8= | 5.5912E−02 | 5.6341E−02 | 4.1844E−02 | −4.9017E−02 | −2.2390E−02 |
| A10= | −1.1480E−01 | −1.2079E−02 | −3.0381E−02 | 1.2874E−02 | 3.6874E−03 |
| A12= | 1.1704E−01 | 1.3682E−03 | 1.0014E−02 | −2.1059E−03 | −2.8247E−04 |
| A14= | −5.2694E−02 | 2.7946E−04 | −1.6247E−03 | 2.0096E−04 | −3.9217E−06 |
| A16= | | −9.8360E−04 | 7.9101E−05 | −2.3469E−06 | 1.3525E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 5.77 | (R7 + R8)/(R7 − R8) | 0.94 |
| Fno | 2.55 | (R9 + R10)/(R9 − R10) | −0.81 |
| HFOV [deg.] | 20.5 | f/f1 | 1.93 |
| (V2 + V3 + V5)/(V1 + V4) | 0.61 | f1/f3 | −0.22 |
| CT3/CT2 | 3.73 | tan(2 × HFOV) | 0.87 |
| CT4/CT5 | 0.63 | SD/TD | 0.89 |
| f/CT4 | 12.53 | BL/TD | 0.23 |
| T23/T34 | 0.23 | f/TL | 1.04 |
| (R1 + R2)/(R1 − R2) | −1.13 | TL [mm] | 5.56 |
| (R3 + R4)/(R3 − R4) | 1.86 | | |

In the optical photographing lens assembly according to the 5th embodiment, when the axial distance between the first lens element 510 and the second lens element 520 is T12, the axial distance between the second lens element 520 and the third lens element 530 is T23, the axial distance between the third lens element 530 and the fourth lens element 540 is T34, and the axial distance between the fourth lens element 540 and the fifth lens element 550 is T45, the following conditions are satisfied: T12<T23<T34; and T45<T23<T34. Furthermore, the following condition is also satisfied: T45<T12.

6th Embodiment

Figure 11:
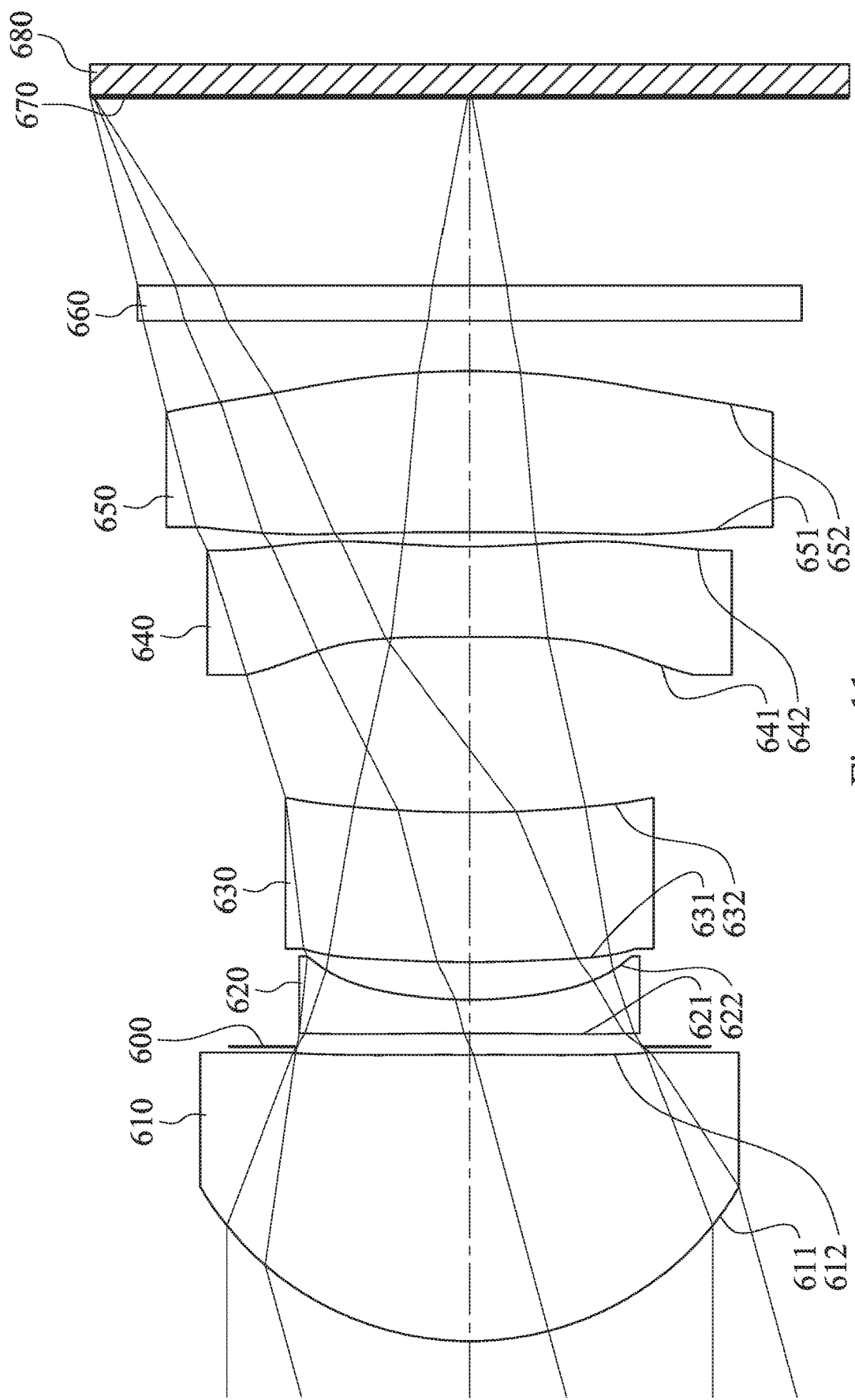
FIG. 11 is a schematic view of an image capturing device according to the 6th embodiment of the present disclosure.
Figure 12:
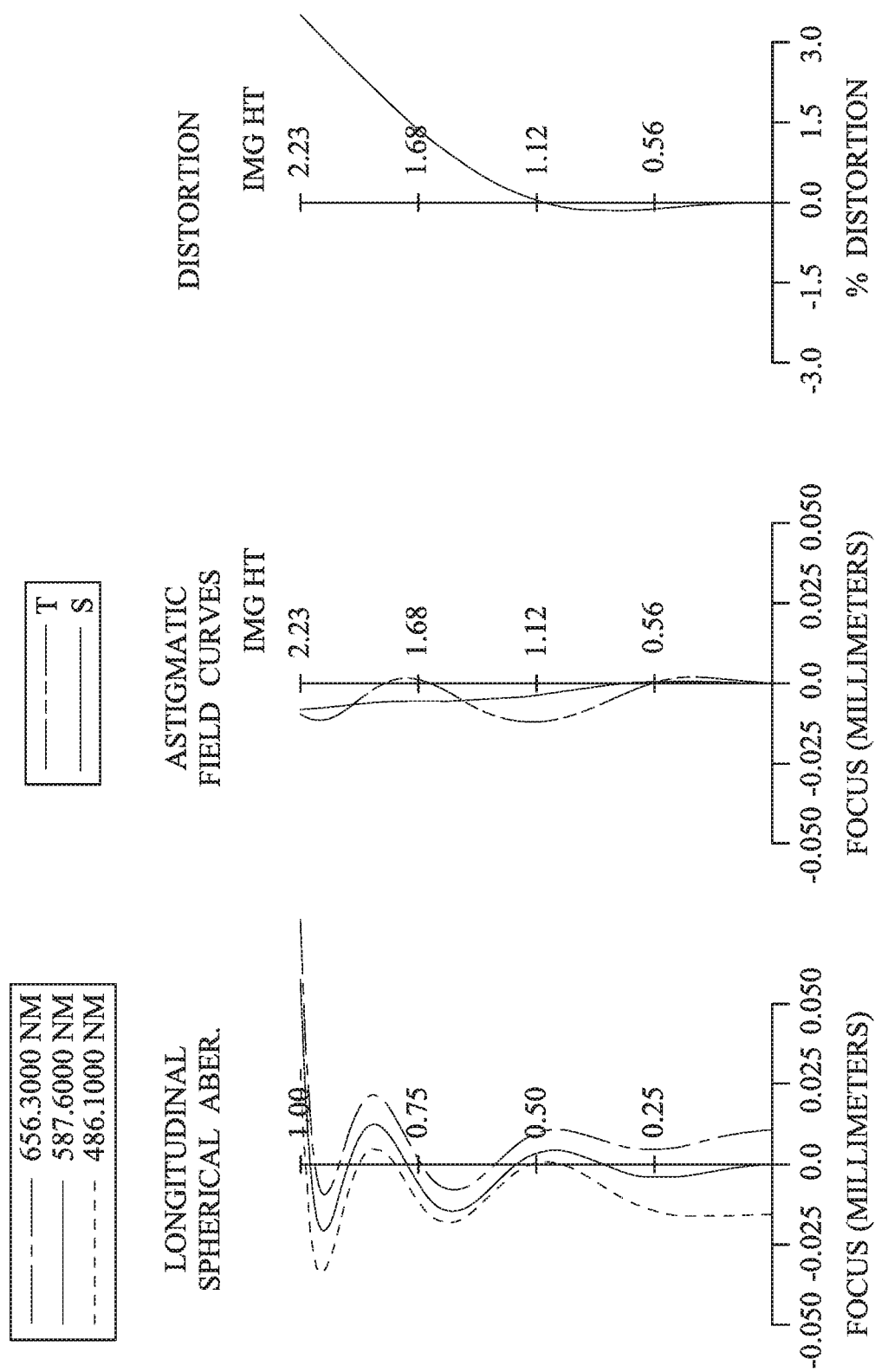
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing device according to the 6th embodiment. In FIG. 11, the image capturing device includes an optical photographing lens assembly (its reference numeral is omitted) and an image sensor 680, The optical photographing lens assembly includes, in order from an object side to an image side, a first lens element 610, an aperture stop 600, a second lens element 620, a third lens element 630, a fourth lens element 640, a fifth lens element 650, an IR-cut filter 660 and an image surface 670, wherein the image sensor 680 is disposed on the image surface 670 of the optical photographing lens assembly. The optical photographing lens assembly has a total of five lens elements (610-650). There is an air space in a paraxial region between every two of the first lens element 610, the second lens element 620, the third lens element 630, the fourth lens element 640 and the fifth lens element 650 that are adjacent to each other.

The first lens element 610 with positive refractive power has an object-side surface 611 being convex in a paraxial region thereof and an image-side surface 612 being concave in a paraxial region thereof. The first lens element 610 is made of plastic material, and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material, and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of plastic material, and has the object-side surface 631 and the image-side surface 632 being both aspheric.

The fourth lens element 640 with negative refractive power has an object-side surface 641 being concave in a paraxial region thereof and an image-side surface 642 being concave in a paraxial region thereof. The fourth lens element 640 is made of plastic material, and has the object-side surface 641 and the image-side surface 642 being both aspheric. Furthermore, the image-side surface 642 of the fourth lens element 640 includes at least one convex shape in an off-axial region thereof.

The fifth lens element 650 with positive refractive power has an object-side surface 651 being convex in a paraxial region thereof and an image-side surface 652 being convex in a paraxial region thereof. The fifth lens element 650 is made of plastic material, and has the object-side surface 651 and the image-side surface 652 being both aspheric. Furthermore, the object-side surface 651 of the fifth lens element 650 includes at least one concave shape in an off-axial region thereof.

The IR-cut filter 660 is made of glass material and located between the fifth lens element 650 and the image surface 670, and will not affect the focal length of the optical photographing lens assembly.

The detailed optical data of the 6th embodiment are shown in Table 11 and the aspheric surface data are shown in Table 12 below.

TABLE 11

6th Embodiment
f = 7.79 mm, Fno = 2.70, HFOV = 15.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.848 | ASP | 1.700 | Plastic | 1.544 | 55.9 | 3.49 |
| 2 | | 47.344 | ASP | 0.050 | | | | |
| 3 | Ape. Stop | Plano | | 0.077 | | | | |
| 4 | Lens 2 | 21.690 | ASP | 0.200 | Plastic | 1.640 | 23.3 | −3.93 |
| 5 | | 2.245 | ASP | 0.224 | | | | |
| 6 | Lens 3 | 6.290 | ASP | 0.888 | Plastic | 1.640 | 23.3 | 618.68 |
| 7 | | 6.039 | ASP | 1.042 | | | | |
| 8 | Lens 4 | −57.710 | ASP | 0.536 | Plastic | 1.535 | 55.7 | −6.97 |
| 9 | | 4.001 | ASP | 0.086 | | | | |

TABLE 11-continued

6th Embodiment
f = 7.79 mm, Fno = 2.70, HFOV = 15.5 deg.

| Surface # | | Curvature Radius | | Thickness | Material | Index | Abbe # | Focal Length |
|---|---|---|---|---|---|---|---|---|
| 10 | Lens 5 | 93.140 | ASP | 0.956 | Plastic | 1.640 | 23.3 | 8.18 |
| 11 | | −5.521 | ASP | 0.300 | | | | |
| 12 | IR-cut filter | Plano | | 0.210 | Glass | 1.517 | 64.2 | — |
| 13 | | Plano | | 1.119 | | | | |
| 14 | Image | Plano | | — | | | | |

Reference wavelength is 587.6 nm (d-line).

TABLE 12

Aspheric Coefficients

| Surface # | 1 | 2 | 4 | 5 | 6 |
|---|---|---|---|---|---|
| k= | −2.4146E−01 | −9.0000E+01 | −7.8000E+01 | −3.7390E−01 | 7.7944E+00 |
| A4= | 2.9937E−03 | −9.0799E−02 | −2.9830E−01 | −2.7909E−01 | −9.5551E−02 |
| A6= | 1.4992E−03 | 2.2405E−01 | 9.0730E−01 | 9.4671E−01 | 3.6129E−02 |
| A8= | 8.2004E−04 | −2.2500E−01 | −1.2837E+00 | −1.4000E+00 | 2.7223E−01 |
| A10= | −6.5435E−04 | 1.0826E−01 | 9.8686E−01 | 1.2547E+00 | −5.8578E−01 |
| A12= | 2.8093E−04 | −1.1133E−02 | −3.7286E−01 | −4.6116E−01 | 6.0909E−01 |
| A14= | | −6.6059E−03 | 4.0810E−02 | | −2.3486E−01 |

| Surface # | 7 | 8 | 9 | 10 | 11 |
|---|---|---|---|---|---|
| k= | 2.6069E+01 | −9.0000E+01 | 1.8289E+00 | 7.2707E+00 | −4.9609E+01 |
| A4= | −5.4255E−02 | −1.0887E−01 | −1.4298E−01 | −7.7586E−02 | −7.1698E−02 |
| A6= | 1.1154E−02 | −5.4726E−02 | 1.0078E−02 | 9.7319E−02 | 5.8372E−02 |
| A8= | 3.5788E−02 | 5.9165E−02 | 4.3012E−02 | −4.8458E−02 | −2.1181E−02 |
| A10= | −9.4800E−02 | −5.1957E−03 | −2.9793E−02 | 1.3016E−02 | 3.8590E−03 |
| A12= | 1.1686E−01 | −6.2636E−04 | 1.0213E−02 | −2.0309E−03 | −2.8851E−04 |
| A14= | −5.2786E−02 | 5.1144E−04 | −1.6152E−03 | 2.2674E−04 | −9.8483E−06 |
| A16= | | −6.9635E−04 | 5.0078E−05 | −2.6673E−05 | 1.3597E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 7.79 | (R7 + R8)/(R7 − R8) | 0.87 |
| Fno | 2.70 | (R9 + R10)/(R9 − R10) | 0.89 |
| HFOV [deg.] | 15.5 | f/f1 | 2.23 |
| (V2 + V3 + V5)/(V1 + V4) | 0.63 | f1/f3 | 0.01 |
| CT3/CT2 | 4.44 | tan(2 × HFOV) | 0.60 |
| CT4/CT5 | 0.56 | SD/TD | 0.70 |
| f/CT4 | 14.53 | BL/TD | 0.28 |
| T23/T34 | 0.21 | f/TL | 1.05 |
| (R1 + R2)/(R1 − R2) | −1.08 | TL [mm] | 7.39 |
| (R3 + R4)/(R3 − R4) | 1.23 | | |

In the optical photographing lens assembly according to the 6th embodiment, when the axial distance between the first lens element 610 and the second lens element 620 is T12, the axial distance between the second lens element 620 and the third lens element 630 is T23, the axial distance between the third lens element 630 and the fourth lens element 640 is T34, and the axial distance between the fourth lens element 640 and the fifth lens element 650 is T45, the following conditions are satisfied: T12<T23<T34; and T45<T23<T34. Furthermore, the following condition is also satisfied: T45<T12.

7th Embodiment

Figure 13:
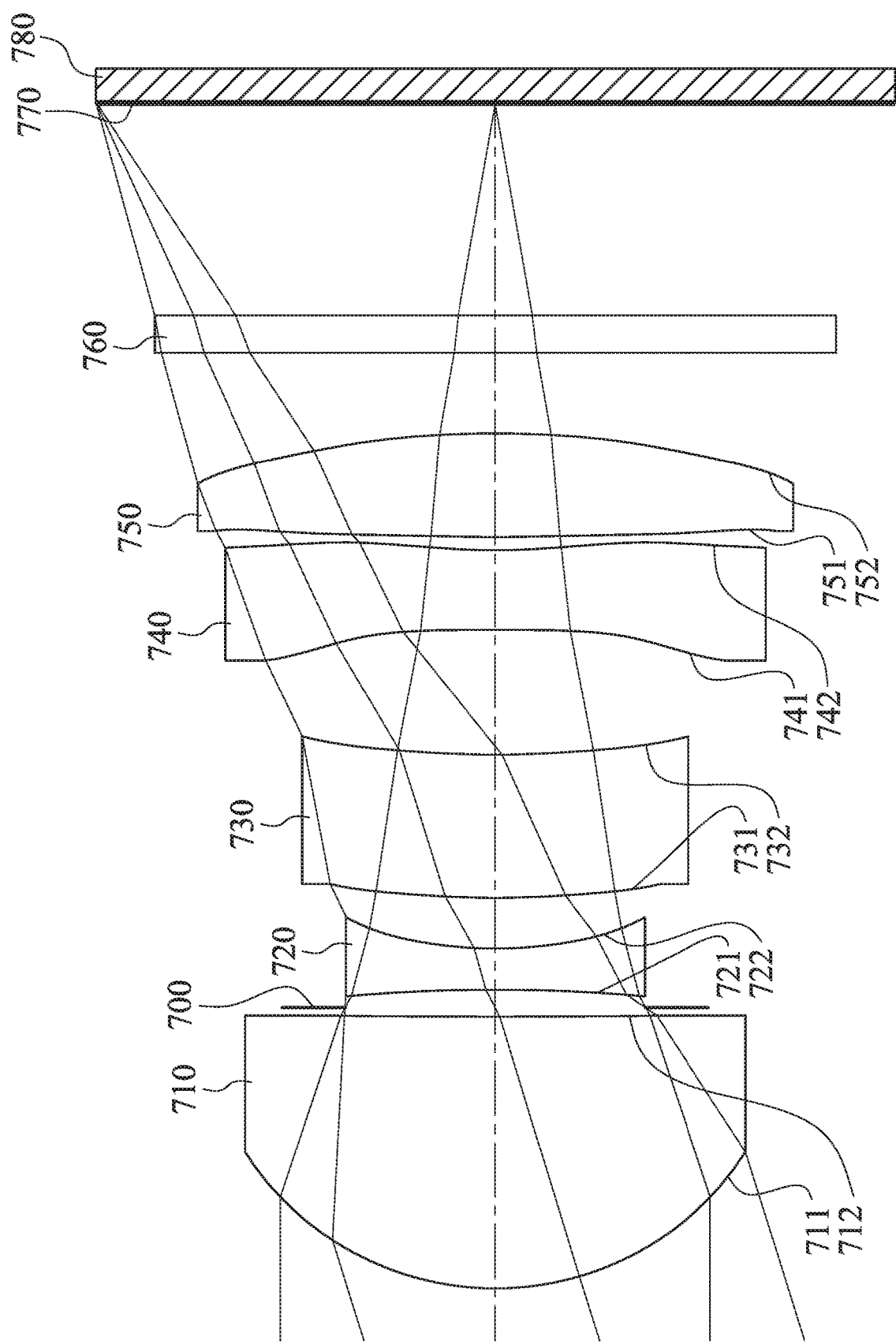
FIG. 13 is a schematic view of an image capturing device according to the 7th embodiment of the present disclosure.
Figure 14:
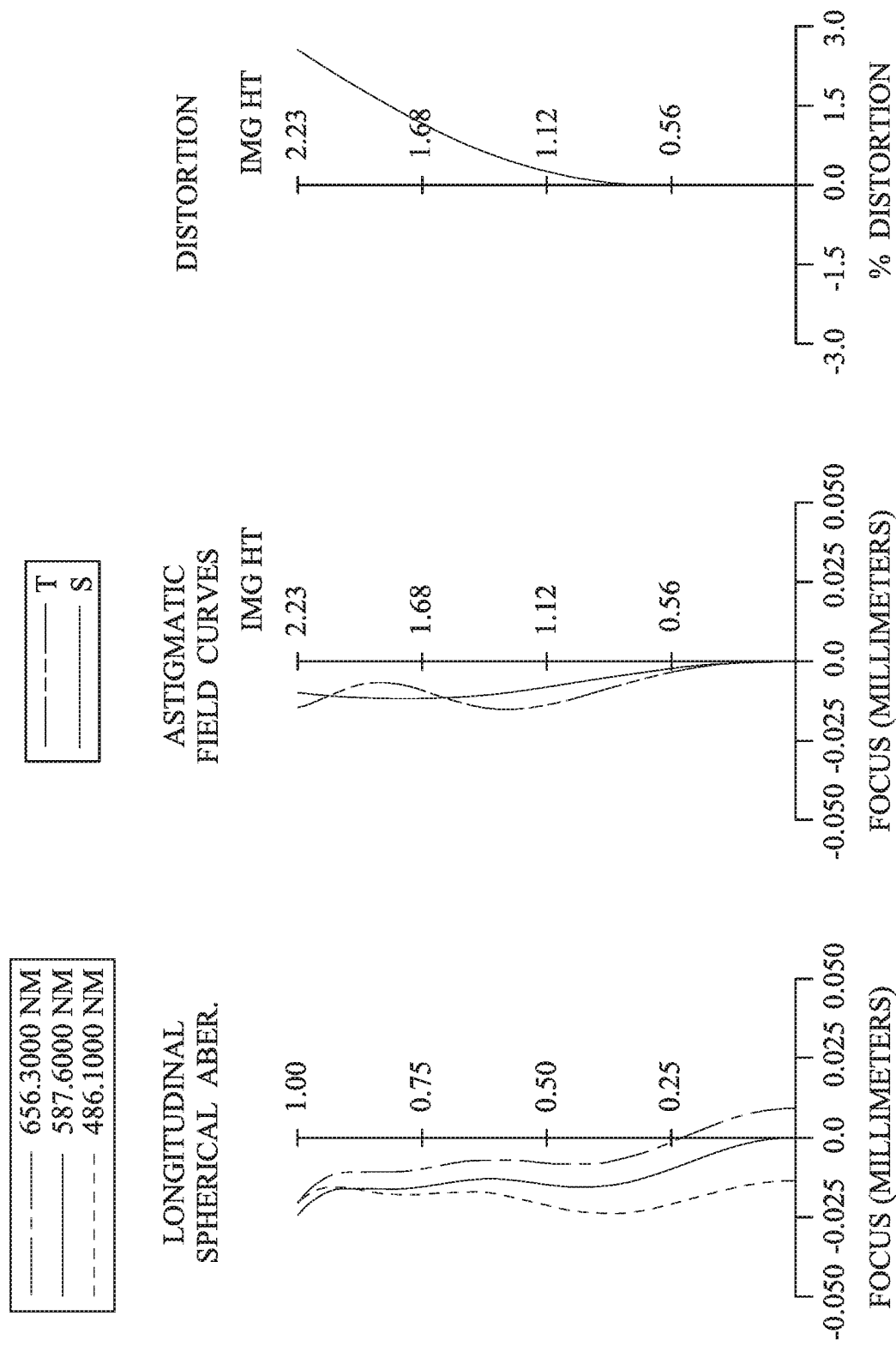
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure, FIG. 14 shows spherical aberration curves, astigmatic field curves and a distortion curve of the image capturing device according to the 7th embodiment. In FIG. 13, the image capturing device includes an optical photographing lens assembly (its reference numeral is omitted) and an image sensor 780. The optical photographing lens assembly includes, in order from an object side to an image side, a first lens element 710, an aperture stop 700, a second lens element 720, a third lens element 730, a fourth lens element 740, a fifth lens element 750, an IR-cut filter 660 and an image surface 770, wherein the image sensor 780 is disposed on the image surface 770 of the optical photographing lens assembly. The optical photographing lens assembly has a total of five lens elements (710-750). There is an air space in a paraxial region between every two of the first lens element 710, the second lens element 720, the third lens element 730, the fourth lens element 740 and the fifth lens element 750 that are adjacent to each other.

The first lens element 710 with positive refractive power has an object-side surface 711 being convex in a paraxial region thereof and an image-side surface 712 being concave in a paraxial region thereof. The first lens element 710 is made of plastic material, and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of plastic material, and has the object-side surface 721 and the image-side surface 722 being both aspheric.

The third lens element 730 with positive refractive power has an object-side surface 731 being convex in a paraxial region thereof and an image-side surface 732 being concave in a paraxial region thereof. The third lens element 730 is made of plastic material, and has the object-side surface 731 and the image-side surface 732 being both aspheric.

The fourth lens element 740 with negative refractive power has an object-side surface 741 being concave in a paraxial region thereof and an image-side surface 742 being concave in a paraxial region thereof. The fourth lens element 740 is made of plastic material, and has the object-side surface 741 and the image-side surface 742 being both aspheric. Furthermore, the image-side surface 742 of the fourth lens element 740 includes at least one convex shape in an off-axial region thereof.

The fifth lens element 750 with positive refractive power has an object-side surface 751 being convex in a paraxial region thereof and an image-side surface 752 being convex in a paraxial region thereof. The fifth lens element 750 is made of plastic material, and has the object-side surface 751 and the image-side surface 752 being both aspheric. Furthermore, the object-side surface 751 of the fifth lens element 750 includes at least one concave shape in an off-axial region thereof.

The IR-cut filter 760 is made of glass material and located between the fifth lens element 750 and the image surface 770, and will not affect the focal length of the optical photographing lens assembly.

The detailed optical data of the 7th embodiment are shown in Table 13 and the aspheric surface data are shown in Table 14 below.

TABLE 13

7th Embodiment
f = 6.97 mm, Fno = 2.90, HFOV = 17.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.670 | ASP | 1.521 | Plastic | 1.544 | 55.9 | 3.23 |
| 2 | | 23.142 | ASP | 0.050 | | | | |
| 3 | Ape. Stop | Plano | | 0.100 | | | | |
| 4 | Lens 2 | −97.929 | ASP | 0.231 | Plastic | 1.640 | 23.3 | −3.30 |
| 5 | | 2.161 | ASP | 0.286 | | | | |
| 6 | Lens 3 | 4.917 | ASP | 0.800 | Plastic | 1.535 | 55.7 | 54.89 |
| 7 | | 5.571 | ASP | 0.700 | | | | |
| 8 | Lens 4 | −57.710 | ASP | 0.446 | Plastic | 1.535 | 55.7 | −6.44 |
| 9 | | 3.672 | ASP | 0.073 | | | | |
| 10 | Lens 5 | 9.922 | ASP | 0.581 | Plastic | 1.640 | 23.3 | 6.39 |
| 11 | | −6.796 | ASP | 0.450 | | | | |
| 12 | IR-cut filter | Plano | | 0.210 | Glass | 1.517 | 64.2 | — |
| 13 | | Plano | | 1.190 | | | | |
| 14 | Image | Plano | | — | | | | |

Reference wavelength is 587.6 nm (d-line).

TABLE 14

Aspheric Coefficients

| Surface # | 1 | 2 | 4 | 5 | 6 |
|---|---|---|---|---|---|
| k= | −1.7728E−01 | 1.3746E+01 | 9.0000E+01 | 2.7404E−01 | 9.7444E+00 |
| A4= | 3.4550E−03 | −9.9364E−02 | −3.1845E−01 | −2.7003E−01 | −9.3589E−02 |
| A6= | 1.8041E−03 | 2.2320E−01 | 8.9935E−01 | 9.3668E−01 | 3.1670E−02 |
| A8= | 1.4222E−03 | −2.1889E−01 | −1.2877E+00 | −1.4117E+00 | 2.6870E−01 |
| A10= | −8.2817E−04 | 9.9845E−02 | 9.8683E−01 | 1.2618E+00 | −5.9912E−01 |
| A12= | 5.4115E−04 | −1.1133E−02 | −3.7286E−01 | −4.6116E−01 | 6.0909E−01 |
| A14= | | −6.6059E−03 | 4.0810E−02 | | −2.3486E−01 |

| Surface # | 7 | 8 | 9 | 10 | 11 |
|---|---|---|---|---|---|
| k= | 2.2116E+01 | 6.6000E+01 | 2.0571E+00 | −5.3610E+01 | −4.0373E+01 |
| A4= | −5.4735E−02 | −1.0660E−01 | −1.3321E−01 | −8.2571E−02 | −7.1023E−02 |
| A6= | 1.1496E−02 | −4.6752E−02 | 7.5452E−03 | 9.4780E−02 | 5.6295E−02 |
| A8= | 4.0202E−02 | 6.4191E−02 | 4.1849E−02 | −4.8627E−02 | −2.1425E−02 |
| A10= | −9.6527E−02 | −5.3902E−03 | −2.9766E−02 | 1.3062E−02 | 3.8654E−03 |
| A12= | 1.1686E−01 | −2.2566E−03 | 1.0275E−02 | −2.0061E−03 | −2.9654E−04 |
| A14= | −5.2786E−02 | 5.1144E−04 | −1.6226E−03 | 2.2758E−04 | −1.8472E−05 |
| A16= | | −6.9635E−04 | 4.1355E−05 | −3.8893E−05 | −2.4116E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 6.97 | (R7 + R8)/(R7 − R8) | 0.88 |
| Fno | 2.90 | (R9 + R10)/(R9 − R10) | 0.19 |
| HFOV [deg.] | 17.4 | f/f1 | 2.16 |
| (V2 + V3 + V5)/(V1 + V4) | 0.92 | f1/f3 | 0.06 |
| CT3/CT2 | 3.46 | tan(2 × HFOV) | 0.70 |
| CT4/CT5 | 0.77 | SD/TD | 0.67 |
| f/CT4 | 15.64 | BL/TD | 0.39 |
| T23/T34 | 0.41 | f/TL | 1.05 |
| (R1 + R2)/(R1 − R2) | −1.16 | TL [mm] | 6.64 |
| (R3 + R4)/(R3 − R4) | 0.96 | | |

In the optical photographing lens assembly according to the 7th embodiment, when the axial distance between the first lens element 710 and the second lens element 720 is T12, the axial distance between the second lens element 720 and the third lens element 730 is T23, the axial distance between the third lens element 730 and the fourth lens element 740 is T34, and the axial distance between the fourth lens element 740 and the fifth lens element 750 is T45, the following conditions are satisfied: T12<T23<T34; and T45<T23<T34. Furthermore, the following condition is also satisfied: T45<T12.

8th Embodiment

Figure 15:
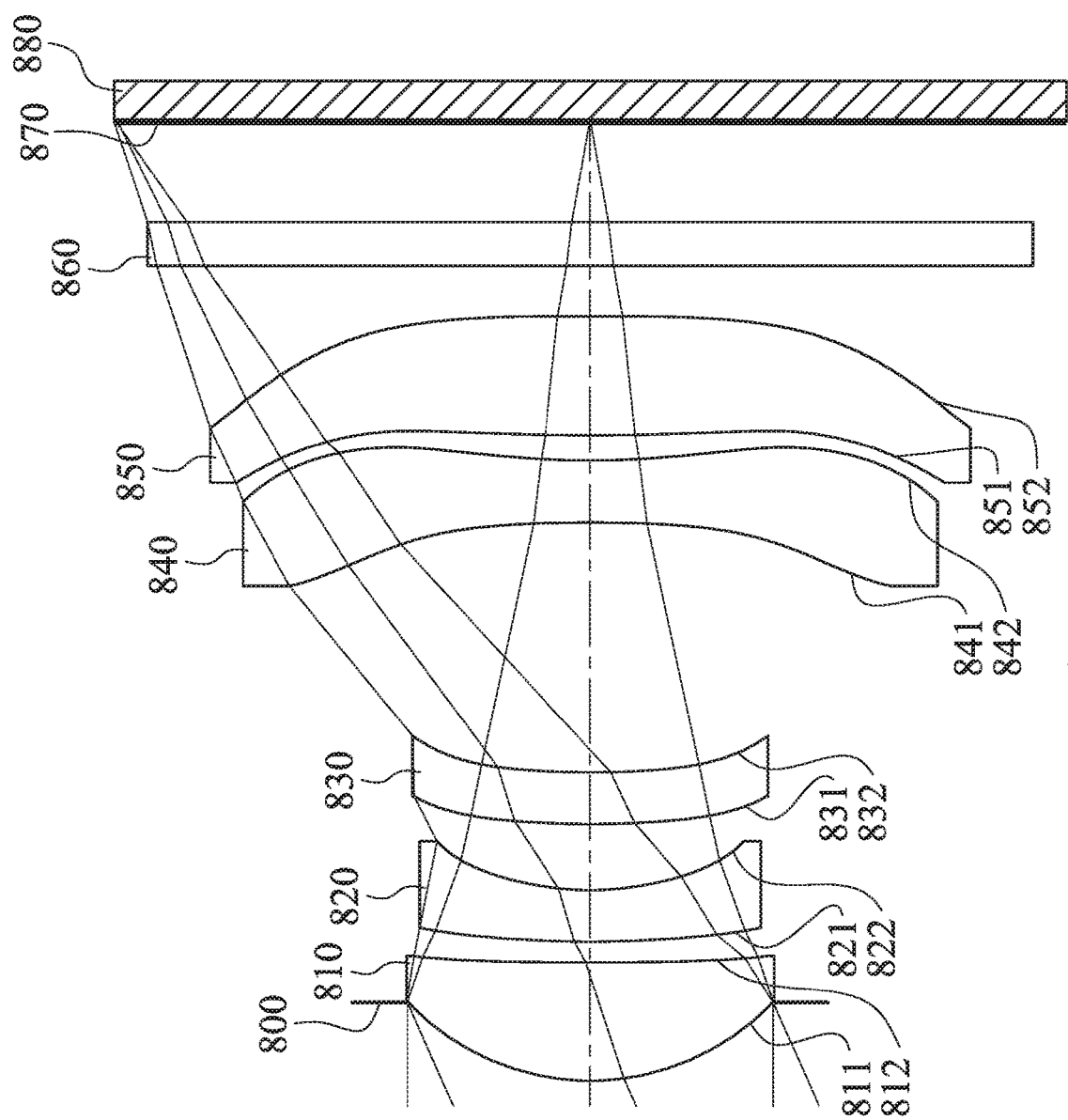
FIG. 15 is a schematic view of an image capturing device according to the 8th embodiment of the present disclosure.
Figure 16:
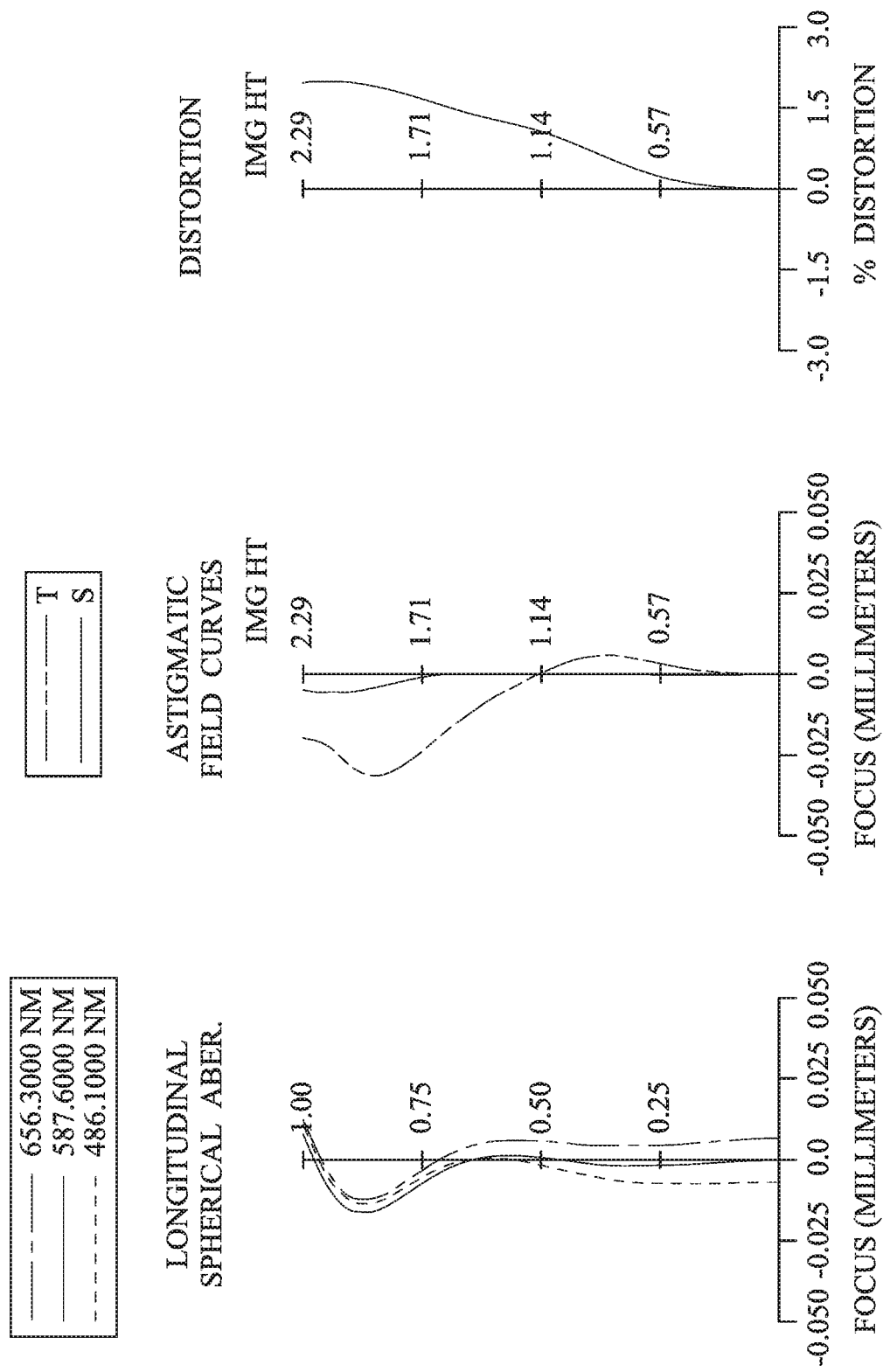
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows spherical aberration curves, astigmatic field curves and a distortion curve of the image capturing device according to the 8th embodiment. In FIG. 15, the image capturing device includes an optical photographing lens assembly (its reference numeral is omitted) and an image sensor 880. The optical photographing lens assembly includes, in order from an object side to an image side, an aperture stop 800, a first lens element 810, a second lens element 820, a third lens element 830, a fourth lens element 840, a fifth lens element 850, an IR-cut filter 860 and an image surface 870, wherein the image sensor 880 is disposed on the image surface 870 of the optical photographing lens assembly. The optical photographing lens assembly has a total of five lens elements (810-850). There is an air space in a paraxial region between every two of the first lens element 810, the second lens element 820, the third lens element 830, the fourth lens element 840 and the fifth lens element 850 that are adjacent to each other.

The first lens element 810 with positive refractive power has an object-side surface 811 being convex in a paraxial region thereof and an image-side surface 812 being concave in a paraxial region thereof. The first lens element 810 is made of plastic material, and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material, and has the object-side surface 821 and the image-side surface 822 being both aspheric.

The third lens element 830 with positive refractive power has an object-side surface 831 being convex in a paraxial region thereof and an image-side surface 832 being concave in a paraxial region thereof. The third lens element 830 is made of plastic material, and has the object-side surface 831 and the image-side surface 832 being both aspheric.

The fourth lens element 840 with negative refractive power has an object-side surface 841 being concave in a paraxial region thereof and an image-side surface 842 being concave in a paraxial region thereof. The fourth lens element 840 is made of plastic material, and has the object-side surface 841 and the image-side surface 842 being both aspheric. Furthermore, the image-side surface 842 of the fourth lens element 840 includes at least one convex shape in an off-axial region thereof.

The fifth lens element 850 with positive refractive power has an object-side surface 851 being convex in a paraxial region thereof and an image-side surface 852 being convex in a paraxial region thereof. The fifth lens element 850 is made of plastic material, and has the object-side surface 851 and the image-side surface 852 being both aspheric. Furthermore, the object-side surface 851 of the fifth lens element 850 includes at least one concave shape in an off-axial region thereof.

The IR-cut filter 860 is made of glass material and located between the fifth lens element 850 and the image surface 870, and will not affect the focal length of the optical photographing lens assembly.

The detailed optical data of the 8th embodiment are shown in Table 15 and the aspheric surface data are shown in Table 16 below.

TABLE 15

8th Embodiment
f = 5.04 mm, Fno = 2.85, HFOV = 24.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.377 | | | | |
| 2 | Lens 1 | 1.229 | ASP | 0.574 | Plastic | 1.544 | 55.9 | 2.33 |
| 3 | | 33.442 | ASP | 0.098 | | | | |
| 4 | Lens 2 | 4.061 | ASP | 0.250 | Plastic | 1.639 | 23.5 | −3.31 |
| 5 | | 1.356 | ASP | 0.319 | | | | |
| 6 | Lens 3 | 4.347 | ASP | 0.250 | Plastic | 1.639 | 23.5 | 63.02 |
| 7 | | 4.763 | ASP | 1.210 | | | | |
| 8 | Lens 4 | −8.648 | ASP | 0.300 | Plastic | 1.544 | 55.9 | −5.34 |
| 9 | | 4.435 | ASP | 0.123 | | | | |

TABLE 15-continued

8th Embodiment
f = 5.04 mm, Fno = 2.85, HFOV = 24.0 deg.

| Surface # | | Curvature Radius | | Thickness | Material | Index | Abbe # | Focal Length |
|---|---|---|---|---|---|---|---|---|
| 10 | Lens 5 | 11.338 | ASP | 0.575 | Plastic | 1.639 | 23.5 | 14.72 |
| 11 | | −54.039 | ASP | 0.244 | | | | |
| 12 | IR-cut filter | Plano | | 0.210 | Glass | 1.517 | 64.2 | — |
| 13 | | Plano | | 0.489 | | | | |
| 14 | Image | Plano | | — | | | | |

Reference wavelength is 587.6 nm (d-line).

TABLE 16

Aspheric Coefficients

| Surface # | 2 | 3 | 4 | 5 | 6 |
|---|---|---|---|---|---|
| k= | 4.3351E−02 | −1.0000E+00 | −1.0000E+00 | 1.1847E+00 | 9.0055E+00 |
| A4= | 9.3752E−03 | 2.8757E−02 | −1.9691E−01 | −3.4324E−01 | −5.8596E−02 |
| A6= | −1.1110E−02 | −1.2840E−02 | 3.4551E−01 | 5.8295E−01 | 1.4156E−01 |
| A8= | 1.2668E−02 | 8.4014E−02 | −8.1231E−01 | −3.2692E−01 | 2.2314E−01 |
| A10= | −4.8302E−03 | −7.1525E−02 | −1.0206E−01 | 3.8781E−01 | −2.1913E−01 |

| Surface # | 7 | 8 | 9 | 10 | 11 |
|---|---|---|---|---|---|
| k= | −1.0000E+00 | −1.0000E+00 | −1.0000E+00 | −2.6605E+01 | −7.2579E+01 |
| A4= | 9.0187E−02 | −5.3935E−02 | 8.2366E−03 | −3.2572E−02 | −9.3396E−02 |
| A6= | 2.5772E−02 | −1.3216E−01 | −9.9224E−02 | 1.0214E−01 | 9.1349E−02 |
| A8= | 4.5101E−01 | 1.9727E−01 | 5.2752E−02 | −1.9597E−01 | −9.5207E−02 |
| A10= | −5.2796E−01 | −1.3633E−01 | −1.8475E−02 | 1.4279E−01 | 5.3534E−02 |
| A12= | 1.3228E−01 | 5.7659E−02 | 8.2150E−03 | −5.1307E−02 | −1.6498E−02 |
| A14= | | −1.3499E−02 | −2.8456E−03 | 9.1047E−03 | 2.6502E−03 |
| A16= | | 1.3083E−03 | 3.7615E−04 | −6.3354E−04 | −1.7113E−04 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 5.04 | (R7 + R8)/(R7 − R8) | 0.32 |
| Fno | 2.85 | (R9 + R10)/(R9 − R10) | −0.65 |
| HFOV [deg.] | 24.0 | f/f1 | 2.16 |
| (V2 + V3 + V5)/(V1 + V4) | 0.63 | f1/f3 | 0.04 |
| CT3/CT2 | 1.00 | tan(2 × HFOV) | 1.11 |
| CT4/CT5 | 0.52 | SD/TD | 0.90 |
| f/CT4 | 16.80 | BL/TD | 0.25 |
| T23/T34 | 0.26 | f/TL | 1.09 |
| (R1 + R2)/(R1 − R2) | −1.08 | TL [mm] | 4.64 |
| (R3 + R4)/(R3 − R4) | 2.00 | | |

In the optical photographing lens assembly according to the 8th embodiment, when the axial distance between the first lens element 810 and the second lens element 820 is T12, the axial distance between the second lens element 820 and the third lens element 830 is T23, the axial distance between the third lens element 830 and the fourth lens element 840 is T34, and the axial distance between the fourth lens element 840 and the fifth lens element 850 is T45, the following conditions are satisfied: T12<T23<T34; and T45<T23<T34.

9th Embodiment

Figure 17:
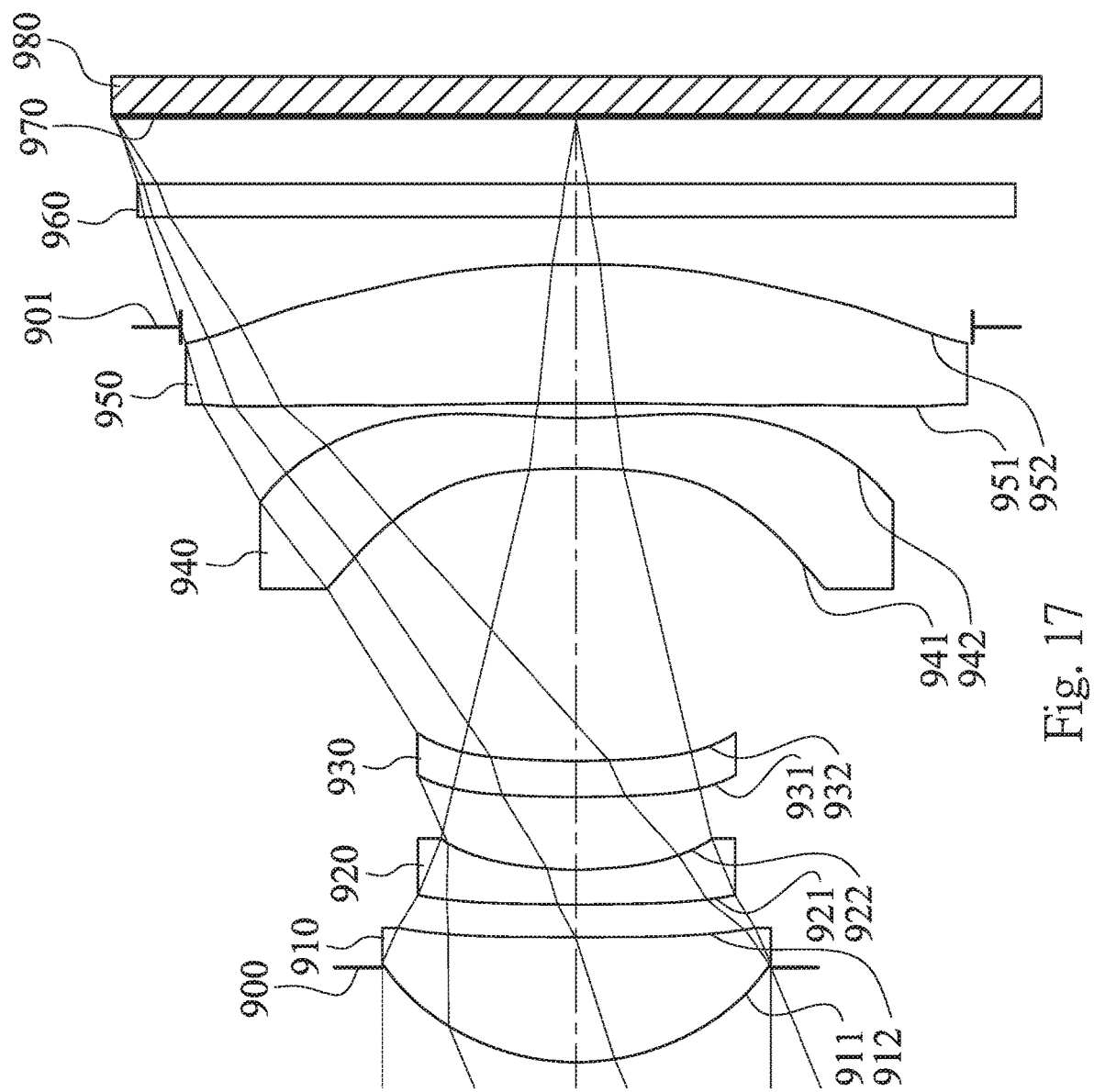
FIG. 17 is a schematic view of an image capturing device according to the 9th embodiment of the present disclosure.
Figure 18:
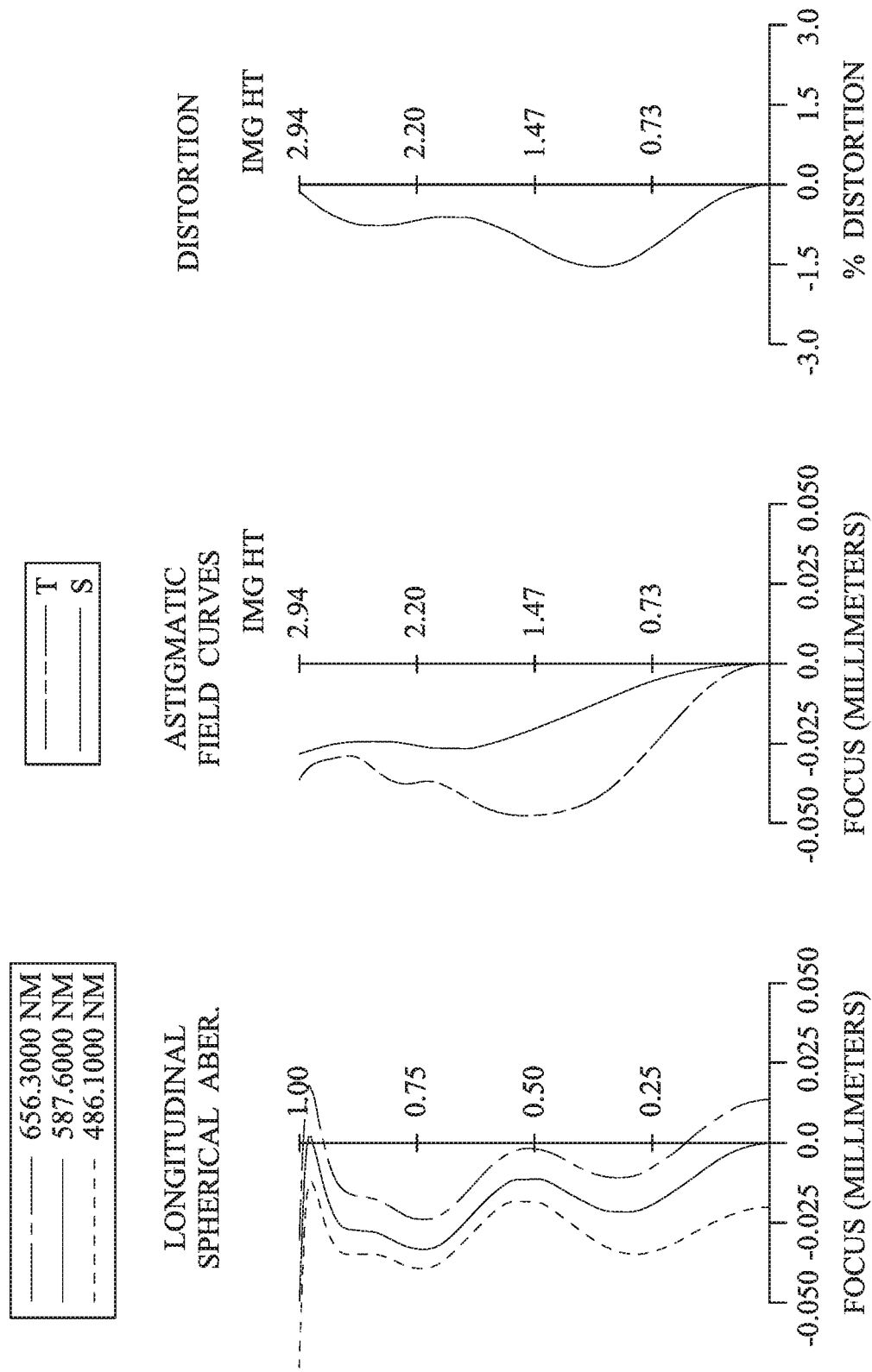
FIG. 18 shows spherical aberration curves, astigmatic field curves and a distortion curve of the image capturing device according to the 9th embodiment.

FIG. 17 is a schematic view of an image capturing device according to the 9th embodiment of the present disclosure. FIG. 18 shows spherical aberration curves, astigmatic field curves and a distortion curve of the image capturing device according to the 9th embodiment. In FIG. 17, the image capturing device includes an optical photographing lens assembly (its reference numeral is omitted) and an image sensor 980. The optical photographing lens assembly includes, in order from an object side to an image side, an aperture stop 900, a first lens element 910, a second lens element 920, a third lens element 930, a fourth lens element 940, a fifth lens element 950, a stop 901, an IR-cut filter 960 and an image surface 970, wherein the image sensor 980 is disposed on the image surface 970 of the optical photographing lens assembly. The optical photographing lens assembly has a total of five lens elements (910-950). There is an air space in a paraxial region between every two of the first lens element 910, the second lens element 920, the third lens element 930, the fourth lens element 940 and the fifth lens element 950 that are adjacent to each other.

The first lens element 910 with positive refractive power has an object-side surface 911 being convex in a paraxial region thereof and an image-side surface 912 being concave in a paraxial region thereof. The first lens element 910 is made of plastic material, and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of plastic material, and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of plastic material, and has the object-side surface 931 and the image-side surface 932 being both aspheric.

The fourth lens element 940 with negative refractive power has an object-side surface 941 being concave in a paraxial region thereof and an image-side surface 942 being concave in a paraxial region thereof. The fourth lens element 940 is made of plastic material, and has the object-side surface 941 and the image-side surface 942 being both aspheric. Furthermore, the image-side surface 942 of the fourth lens element 940 includes at least one convex shape in an off-axial region thereof.

The fifth lens element 950 with positive refractive power has an object-side surface 951 being convex in a paraxial region thereof and an image-side surface 952 being convex in a paraxial region thereof. The fifth lens element 950 is made of plastic material, and has the object-side surface 951 and the image-side surface 952 being both aspheric. Furthermore, the object-side surface 951 of the fifth lens element 950 includes at least one concave shape in an off-axial region thereof.

The IR-cut filter 960 is made of glass material and located between the fifth lens element 950 and the image surface 970, and will not affect the focal length of the optical photographing lens assembly.

The detailed optical data of the 9th embodiment are shown in Table 17 and the aspheric surface data are shown in Table 18 below.

TABLE 17

9th Embodiment
f = 7.01 mm, Fno = 2.85, HFOV = 22.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.600 | | | | |
| 2 | Lens 1 | 1.555 | ASP | 0.789 | Plastic | 1.544 | 55.9 | 3.09 |
| 3 | | 16.915 | ASP | 0.208 | | | | |
| 4 | Lens 2 | 7.313 | ASP | 0.220 | Plastic | 1.639 | 23.5 | −4.94 |
| 5 | | 2.179 | ASP | 0.464 | | | | |
| 6 | Lens 3 | 7.170 | ASP | 0.230 | Plastic | 1.639 | 23.5 | −158.01 |
| 7 | | 6.611 | ASP | 1.855 | | | | |
| 8 | Lens 4 | −5.487 | ASP | 0.320 | Plastic | 1.544 | 55.9 | −4.46 |
| 9 | | 4.448 | ASP | 0.091 | | | | |
| 10 | Lens 5 | 31.984 | ASP | 0.883 | Plastic | 1.639 | 23.5 | 14.19 |
| 11 | | −12.517 | ASP | −0.400 | | | | |
| 12 | Stop | Plano | | 0.700 | | | | |
| 13 | IR-cut filter | Plano | | 0.210 | Glass | 1.517 | 64.2 | — |
| 14 | | Plano | | 0.428 | | | | |
| 15 | Image | Plano | | — | | | | |

Reference wavelength is 587.6 nm (d-line).
Effective radius of surface 12 of the stop is 2.508 mm.

TABLE 18

Aspheric Coefficients

| Surface # | 2 | 3 | 4 | 5 | 6 |
|---|---|---|---|---|---|
| k= | −1.4505E−01 | −1.5591E+00 | −8.9991E+01 | −3.4393E+00 | 2.9914E+01 |
| A4= | 1.0057E−03 | −7.5259E−02 | −2.6728E−01 | −2.3540E−01 | −6.4862E−02 |
| A6= | 1.3293E−03 | 2.1763E−01 | 8.9889E−01 | 9.8049E−01 | 8.3463E−02 |
| A8= | 1.9414E−02 | −2.2630E−01 | −1.3002E+00 | −1.4542E+00 | 3.3420E−01 |
| A10= | −2.0869E−02 | 1.0109E−01 | 1.0224E+00 | 1.2723E+00 | −6.9283E−01 |
| A12= | 8.6279E−03 | 2.7943E−03 | −3.8948E−01 | −4.4744E−01 | 5.7420E−01 |
| A14= | | −1.1162E−02 | 4.1849E−02 | | −1.8443E−01 |

| Surface # | 7 | 8 | 9 | 10 | 11 |
|---|---|---|---|---|---|
| k= | 2.6868E+01 | 9.4431E+00 | 9.2574E−01 | 5.8963E−02 | −8.9999E+01 |
| A4= | −1.7814E−02 | −1.1809E−01 | −1.3420E−01 | −8.4193E−02 | −1.0384E−01 |
| A6= | 1.1639E−01 | −3.3298E−02 | 4.6429E−03 | 9.3786E−02 | 6.9974E−02 |
| A8= | 3.7210E−02 | 4.9156E−02 | 4.3306E−02 | −4.8263E−02 | −2.2543E−02 |
| A10= | −1.4604E−01 | −9.4334E−03 | −3.0865E−02 | 1.3421E−02 | 3.6343E−03 |
| A12= | 1.5013E−01 | −3.9641E−03 | 9.9429E−03 | −2.0970E−03 | −2.6902E−04 |
| A14= | −6.3372E−02 | 1.2648E−03 | −1.5905E−03 | 1.7473E−04 | 5.1791E−06 |
| A16= | | 1.1372E−05 | 1.0180E−04 | −6.0765E−06 | 2.0026E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 7.01 | (R7 + R8)/(R7 − R8) | 0.10 |
| Fno | 2.85 | (R9 + R10)/(R9 − R10) | 0.44 |
| HFOV [deg.] | 22.8 | f/f1 | 2.27 |
| (V2 + V3 + V5)/(V1 + V4) | 0.63 | f1/f3 | −0.02 |
| CT3/CT2 | 1.05 | tan(2 × HFOV) | 1.02 |
| CT4/CT5 | 0.36 | SD/TD | 0.88 |
| f/CT4 | 21.91 | BL/TD | 0.19 |
| T23/T34 | 0.25 | f/TL | 1.17 |
| (R1 + R2)/(R1 − R2) | −1.20 | TL [mm] | 6.00 |
| (R3 + R4)/(R3 − R4) | 1.85 | | |

In the optical photographing lens assembly according to the 9th embodiment, when the axial distance between the first lens element 910 and the second lens element 920 is T12, the axial distance between the second lens element 920 and the third lens element 930 is T23, the axial distance between the third lens element 930 and the fourth lens element 940 is T34, and the axial distance between the fourth lens element 940 and the fifth lens element 950 is T45, the following conditions are satisfied: T12<T23<T34; and T45<T23<T34. Furthermore, the following condition is also satisfied: T45<T12.

10th Embodiment

Figure 19:
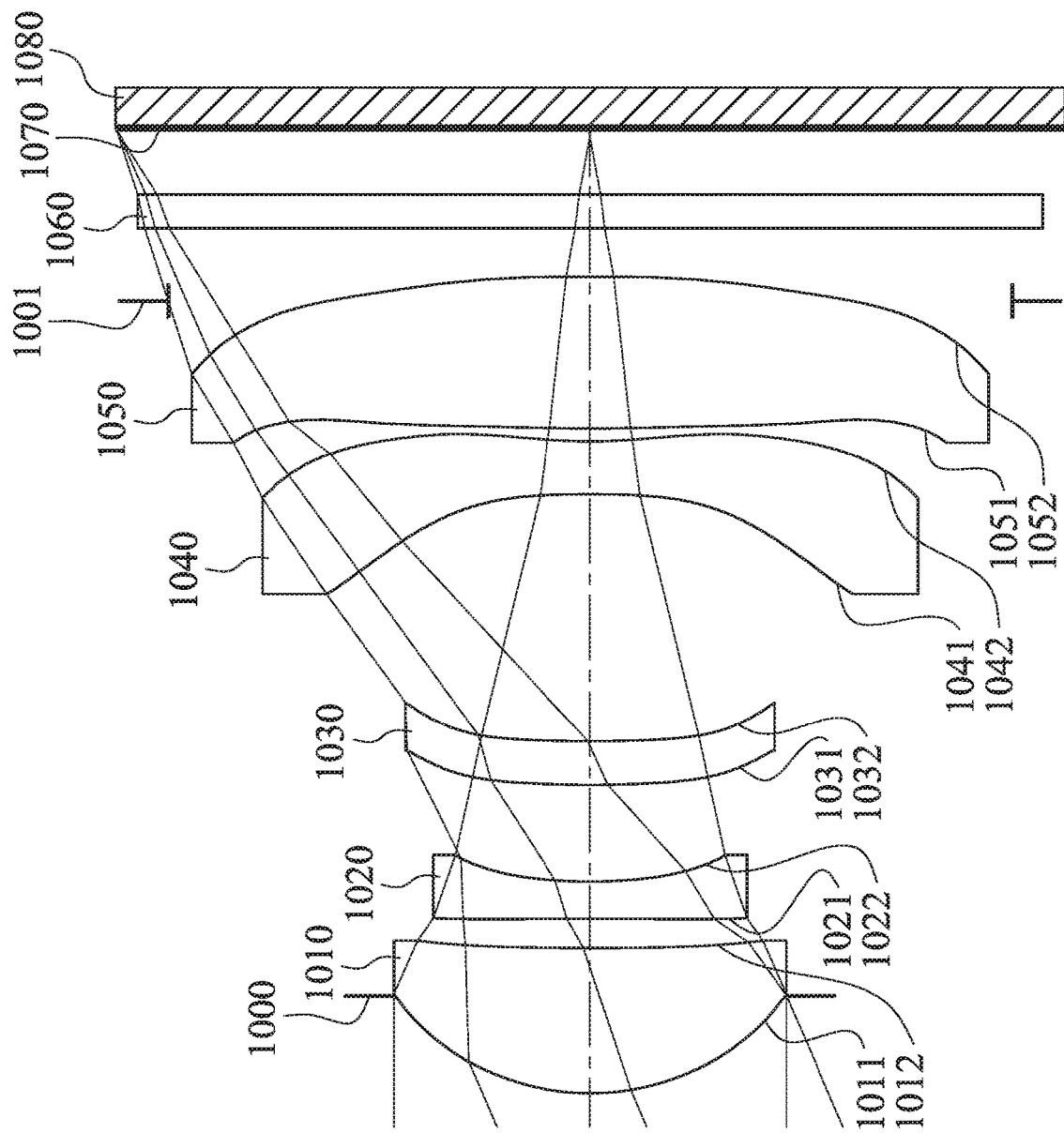
FIG. 19 is a schematic view of an image capturing device according to the 10th embodiment of the present disclosure.
Figure 20:
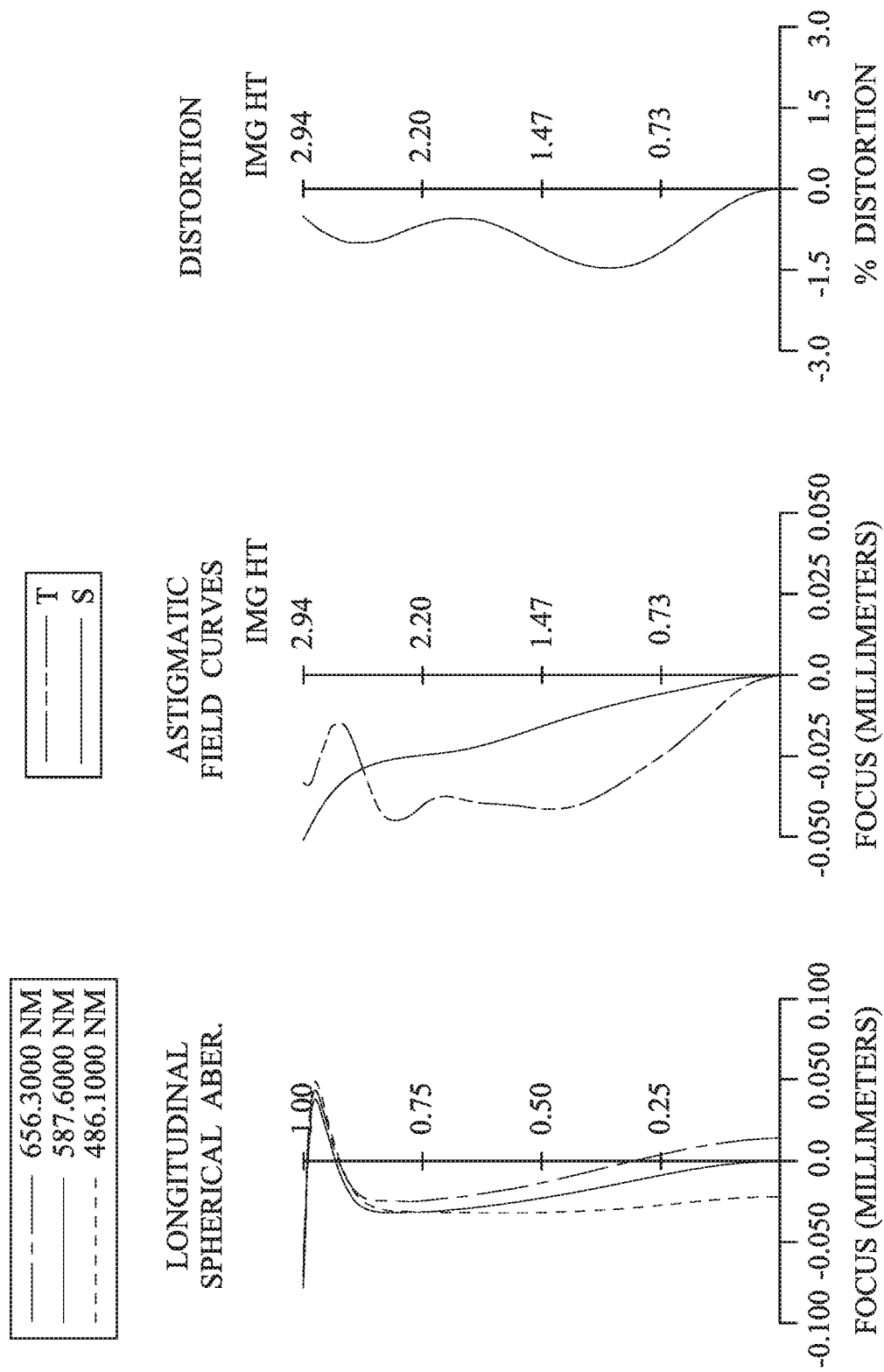
FIG. 20 shows spherical aberration curves, astigmatic field curves and a distortion curve of the image capturing device according to the 10th embodiment.

FIG. 19 is a schematic view of an image capturing device according to the 10th embodiment of the present disclosure. FIG. 20 shows spherical aberration curves, astigmatic field curves and a distortion curve of the image capturing device according to the 10th embodiment. In FIG. 19, the image capturing device includes an optical photographing lens assembly (its reference numeral is omitted) and an image sensor 1080. The optical photographing lens assembly includes, in order from an object side to an image side, an aperture stop 1000, a first lens element 1010, a second lens element 1020, a third lens element 1030, a fourth lens element 1040, a fifth lens element 1050, a stop 1001, an IR-cut filter 1060 and an image surface 1070, wherein the image sensor 1080 is disposed on the image surface 1070 of the optical photographing lens assembly. The optical photographing lens assembly has a total of five lens elements (1010-1050). There is an air space in a paraxial region between every two of the first lens element 1010, the second lens element 1020, the third lens element 1030, the fourth lens element 1040 and the fifth lens element 1050 that are adjacent to each other.

The first lens element 1010 with positive refractive power has an object-side surface 1011 being convex in a paraxial region thereof and an image-side surface 1012 being concave in a paraxial region thereof. The first lens element 1010 is made of plastic material, and has the object-side surface 1011 and the image-side surface 1012 being both aspheric.

The second lens element 1020 with negative refractive power has an object-side surface 1021 being convex in a paraxial region thereof and an image-side surface 1022 being concave in a paraxial region thereof. The second lens element 1020 is made of plastic material, and has the object-side surface 1021 and the image-side surface 1022 being both aspheric.

The third lens element 1030 with positive refractive power has an object-side surface 1031 being convex in a paraxial region thereof and an image-side surface 1032 being concave in a paraxial region thereof. The third lens element 1030 is made of plastic material, and has the object-side surface 1031 and the image-side surface 1032 being both aspheric.

The fourth lens element 1040 with negative refractive power has an object-side surface 1041 being concave in a paraxial region thereof and an image-side surface 1042 being concave in a paraxial region thereof. The fourth lens element 1040 is made of plastic material, and has the object-side surface 1041 and the image-side surface 1042 being both aspheric. Furthermore, the image-side surface 1042 of the fourth lens element 1040 includes at least one convex shape in an off-axial region thereof.

The fifth lens element 1050 with positive refractive power has an object-side surface 1051 being convex in a paraxial region thereof and an image-side surface 1052 being convex in a paraxial region thereof. The fifth lens element 1050 is made of plastic material, and has the object-side surface 1051 and the image-side surface 1052 being both aspheric. Furthermore, the object-side surface 1051 of the fifth tens element 1050 includes at least one concave shape in an off-axial region thereof.

The IR-cut filter 1060 is made of glass material and located between the fifth lens element 1050 and the image surface 1070, and will not affect the focal length of the optical photographing lens assembly.

The detailed optical data of the 10th embodiment are shown in Table 19 and the aspheric surface data are shown in Table 20 below,

TABLE 19

10th Embodiment
f = 6.86 mm, Fno = 2.82, HFOV = 23.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.608 | | | | |
| 2 | Lens 1 | 1.550 | ASP | 0.903 | Plastic | 1.544 | 55.9 | 3.10 |
| 3 | | 14.929 | ASP | 0.183 | | | | |
| 4 | Lens 2 | 82.522 | ASP | 0.230 | Plastic | 1.639 | 23.5 | −4.78 |
| 5 | | 2.945 | ASP | 0.600 | | | | |
| 6 | Lens 3 | 8.038 | ASP | 0.270 | Plastic | 1.639 | 23.5 | 76.61 |
| 7 | | 9.492 | ASP | 1.533 | | | | |
| 8 | Lens 4 | −7.930 | ASP | 0.330 | Plastic | 1.544 | 55.9 | −3.95 |

TABLE 19-continued

10th Embodiment
f = 6.86 mm, Fno = 2.82, HFOV = 23.3 deg.

| Surface # | | Curvature Radius | | Thickness | Material | Index | Abbe # | Focal Length |
|---|---|---|---|---|---|---|---|---|
| 9 | | 2.987 | ASP | 0.081 | | | | |
| 10 | Lens 5 | 8.899 | ASP | 0.940 | Plastic | 1.639 | 23.5 | 12.62 |
| 11 | | −82.648 | ASP | −0.150 | | | | |
| 12 | Stop | Plano | | 0.450 | | | | |
| 13 | IR-cut filter | Plano | | 0.210 | Glass | 1.517 | 64.2 | — |
| 14 | | Plano | | 0.415 | | | | |
| 15 | Image | Plano | | — | | | | |

Reference wavelength is 587.6 nm (d-line).
Effective radius of surface 12 of the stop is 2.616 mm.

TABLE 20

Aspheric Coefficients

| Surface # | 2 | 3 | 4 | 5 | 6 |
|---|---|---|---|---|---|
| k= | −1.0244E−01 | −2.0146E+01 | −9.0000E+01 | −6.8961E−01 | 3.1659E+01 |
| A4= | 6.5087E−03 | −2.8240E−02 | −1.0656E−01 | −4.2064E−02 | −8.4454E−04 |
| A6= | −4.2026E−03 | −9.7357E−03 | 1.9393E−01 | 2.7004E−01 | 6.0102E−02 |
| A8= | 1.4346E−02 | 2.0707E−01 | 1.2249E−01 | −7.5688E−02 | 1.2901E−01 |
| A10= | −1.0901E−02 | −3.3161E−01 | −5.4978E−01 | −1.2818E−01 | −2.3167E−01 |
| A12= | 5.3153E−03 | 2.3561E−01 | 4.9937E−01 | 9.2276E−02 | 1.5188E−01 |
| A14= | | −6.7356E−02 | −1.6503E−01 | | −4.1137E−02 |

| Surface # | 7 | 8 | 9 | 10 | 11 |
|---|---|---|---|---|---|
| k= | 6.1820E+01 | −3.6426E+00 | −5.0041E−01 | 5.8973E−02 | −8.9999E+01 |
| A4= | 1.2491E−02 | −1.5183E−01 | −1.8485E−01 | −9.4065E−02 | −9.8840E−02 |
| A6= | 6.6204E−02 | −2.6433E−02 | 4.2570E−02 | 9.4456E−02 | 7.8507E−02 |
| A8= | 6.8213E−02 | 8.1244E−02 | 3.1215E−02 | −4.8005E−02 | −3.2882E−02 |
| A10= | −1.2032E−01 | −3.5861E−02 | −2.7505E−02 | 1.3889E−02 | 8.0008E−03 |
| A12= | 8.5367E−02 | 3.0168E−03 | 8.8682E−03 | −2.3808E−03 | −1.1654E−03 |
| A14= | −3.0779E−02 | 1.6298E−03 | −1.3744E−03 | 2.2194E−04 | 9.3439E−05 |
| A16= | | −3.1082E−04 | 8.4948E−05 | −8.6768E−06 | −3.1703E−06 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 6.86 | (R7 + R8)/(R7 − R8) | 0.45 |
| Fno | 2.82 | (R9 + R10)/(R9 − R10) | −0.81 |
| HFOV [deg.] | 23.3 | f/f1 | 2.21 |
| (V2 + V3 + V5)/(V1 + V4) | 0.63 | f1/f3 | 0.04 |
| CT3/CT2 | 1.17 | tan(2 × HFOV) | 1.06 |
| CT4/CT5 | 0.35 | SD/TD | 0.88 |
| f/CT4 | 20.78 | BL/TD | 0.18 |
| T23/T34 | 0.39 | f/TL | 1.14 |
| (R1 + R2)/(R1 − R2) | −1.23 | TL [mm] | 5.99 |
| (R3 + R4)/(R3 − R4) | 1.07 | | |

In the optical photographing lens assembly according to the 10th embodiment, when the axial distance between the first lens element 1010 and the second lens element 1020 is T12, the axial distance between the second lens element 1020 and the third lens element 1030 is T23, the axial distance between the third lens element 1030 and the fourth lens element 1040 is T34, and the axial distance between the fourth lens element 1040 and the fifth lens element 1050 is T45, the following conditions are satisfied: T12<T23<T34; and T45<T23<T34. Furthermore, the following condition is also satisfied: T45<T12.

11th Embodiment

Figure 21:
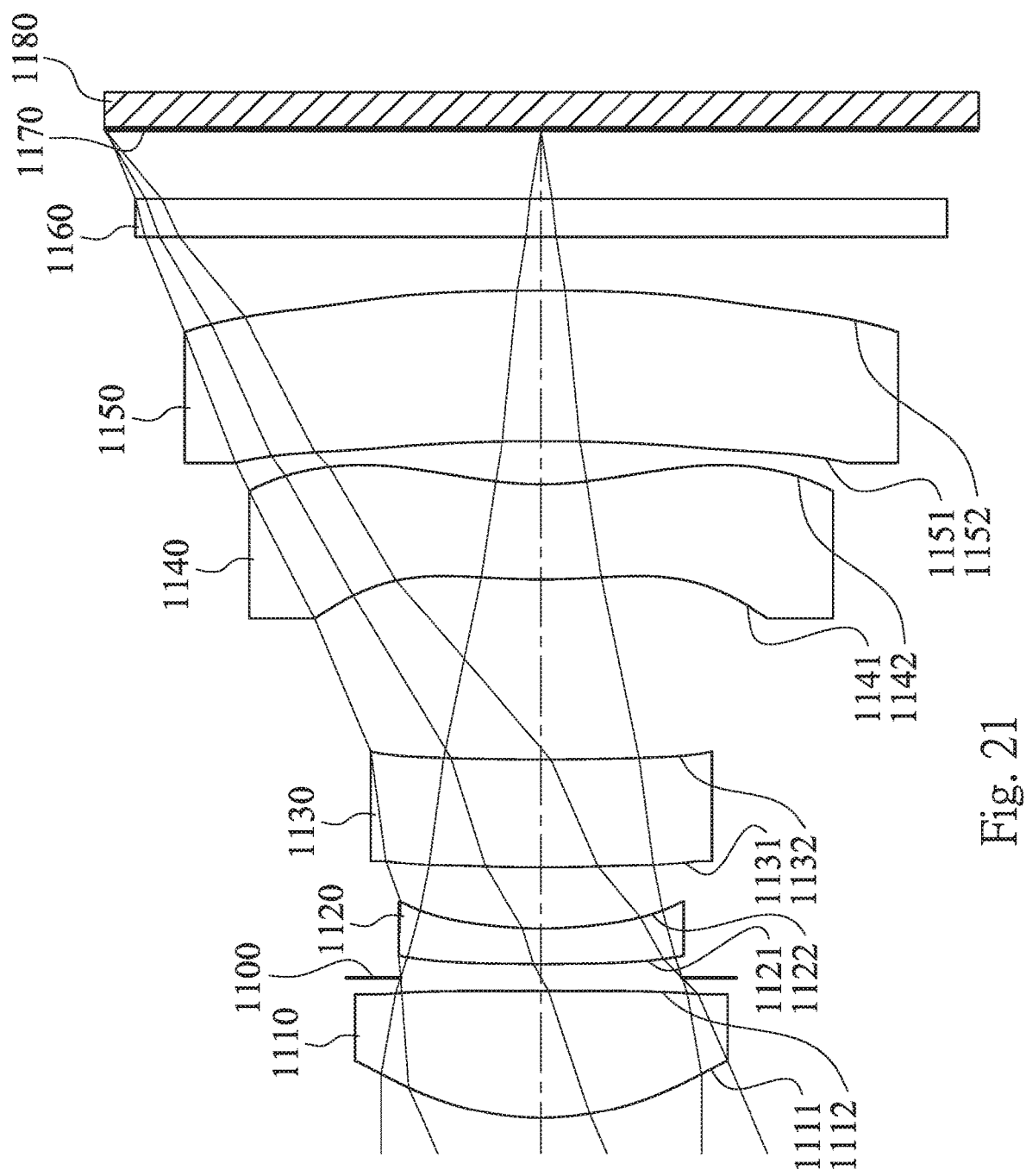
FIG. 21 is a schematic view of an image capturing device according to the 11th embodiment of the present disclosure.
Figure 22:
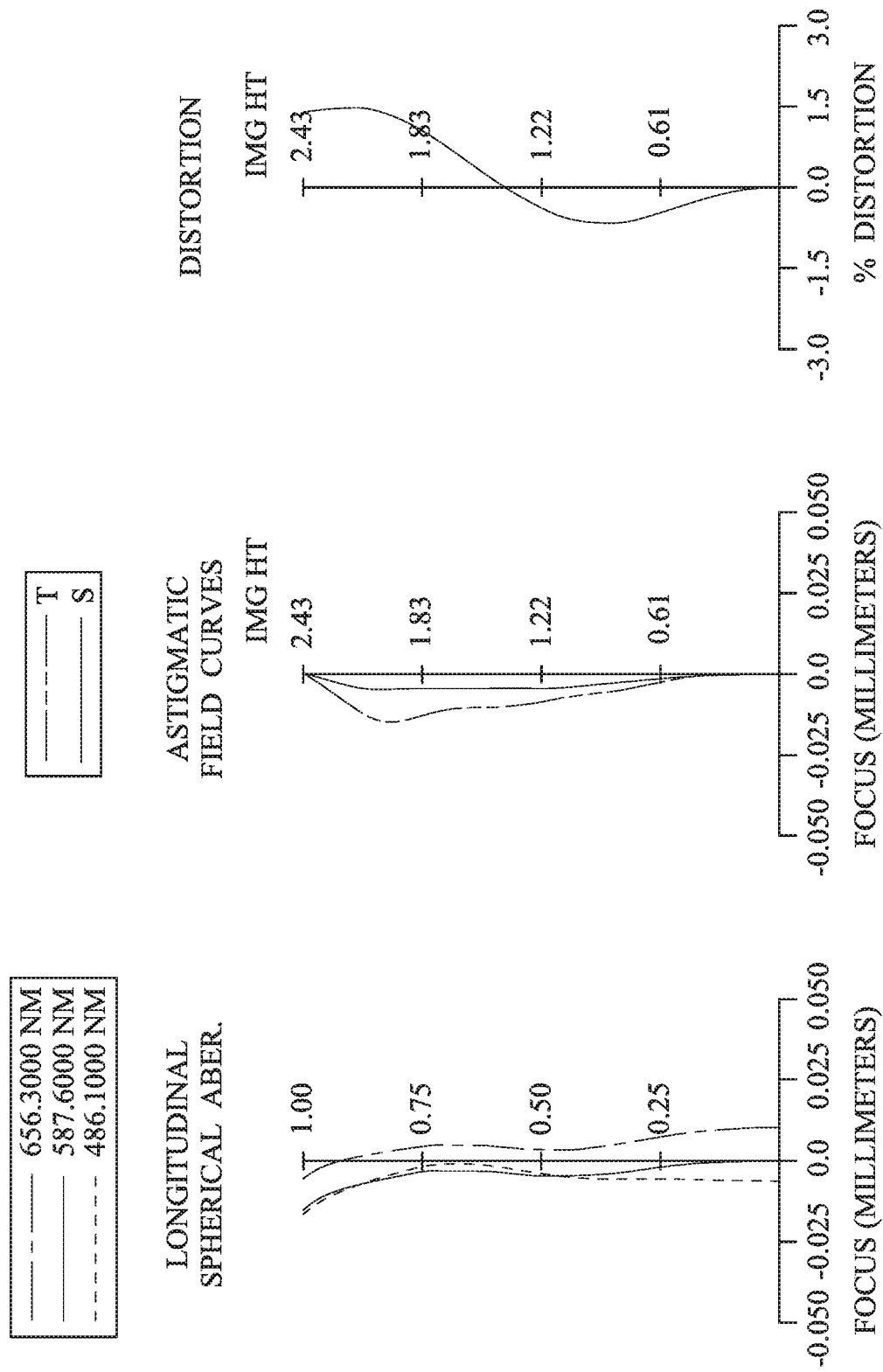
FIG. 22 shows spherical aberration curves, astigmatic field curves and a distortion curve of the image capturing device according to the 11th embodiment.

FIG. 21 is a schematic view of an image capturing device according to the 11th embodiment of the present disclosure. FIG. 22 shows spherical aberration curves, astigmatic field curves and a distortion curve of the image capturing device according to the 11th embodiment. In FIG. 21, the image capturing device includes an optical photographing lens assembly (its reference numeral is omitted) and an image sensor 1180. The optical photographing lens assembly includes, in order from an object side to an image side, a first lens element 1110, an aperture stop 1100, a second lens element 1120, a third lens element 1130, a fourth lens element 1140, a fifth lens element 1150, an IR-cut filter 1160 and an image surface 1170, wherein the image sensor 1180 is disposed on the image surface 1170 of the optical photographing lens assembly. The optical photographing lens assembly has a total of five lens elements (1110-1150). There is an air space in a paraxial region between every two of the first lens element 1110, the second lens element 1120, the third lens element 1130, the fourth lens element 1140 and the fifth lens element 1150 that are adjacent to each other.

The first lens element 1110 with positive refractive power has an object-side surface 1111 being convex in a paraxial region thereof and an image-side surface 1112 being concave in a paraxial region thereof. The first lens element 1110 is made of plastic material, and has the object-side surface 1111 and the image-side surface 1112 being both aspheric.

The second lens element 1120 with negative refractive power has an object-side surface 1121 being convex in a paraxial region thereof and an image-side surface 1122 being concave in a paraxial region thereof. The second lens element 1120 is made of plastic material, and has the object-side surface 1121 and the image-side surface 1122 being both aspheric.

The third lens element 1130 with positive refractive power has an object-side surface 1131 being convex in a paraxial region thereof and an image-side surface 1132 being concave in a paraxial region thereof. The third lens element 1130 is made of plastic material, and has the object-side surface 1131 and the image-side surface 1132 being both aspheric.

The fourth lens element 1140 with negative refractive power has an object-side surface 1141 being convex in a paraxial region thereof and an image-side surface 1142 being concave in a paraxial region thereof. The fourth lens element 1140 is made of plastic material, and has the object-side surface 1141 and the image-side surface 1142 being both aspheric. Furthermore, the image-side surface 1142 of the fourth lens element 1140 includes at least one convex shape in an off-axial region thereof.

The fifth lens element 1150 with negative refractive power has an object-side surface 1151 being concave in a paraxial region thereof and an image-side surface 1152 being convex in a paraxial region thereof. The fifth lens element 1150 is made of plastic material, and has the object-side surface 1151 and the image-side surface 1152 being both aspheric. Furthermore, the object-side surface 1151 of the fifth lens element 1150 includes at least one concave shape in an off-axial region thereof.

The IR-cut filter 1160 is made of glass material and located between the fifth lens element 1150 and the image surface 1170, and will not affect the focal length of the optical photographing lens assembly.

The detailed optical data of the 11th embodiment are shown in Table 21 and the aspheric surface data are shown in Table 22 below.

TABLE 21

11th Embodiment
f = 5.53 mm, Fno = 3.10, HFOV = 23.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.630 | ASP | 0.708 | Plastic | 1.544 | 55.9 | 3.09 |
| 2 | | 45.160 | ASP | 0.073 | | | | |
| 3 | Ape. Stop | Plano | | 0.075 | | | | |
| 4 | Lens 2 | 6.974 | ASP | 0.200 | Plastic | 1.650 | 21.4 | −5.54 |
| 5 | | 2.346 | ASP | 0.339 | | | | |
| 6 | Lens 3 | 7.299 | ASP | 0.602 | Plastic | 1.639 | 23.5 | 32.58 |
| 7 | | 10.878 | ASP | 1.007 | | | | |
| 8 | Lens 4 | 4.137 | ASP | 0.529 | Plastic | 1.535 | 55.7 | −7.91 |
| 9 | | 1.999 | ASP | 0.238 | | | | |
| 10 | Lens 5 | −17.715 | ASP | 0.840 | Plastic | 1.639 | 23.5 | −45.66 |
| 11 | | −45.930 | ASP | 0.300 | | | | |
| 12 | IR-cut filter | Plano | | 0.210 | Glass | 1.517 | 64.2 | — |
| 13 | | Plano | | 0.389 | | | | |
| 14 | Image | Plano | | — | | | | |

Reference wavelength is 587.6 nm (d-line).

TABLE 22

Aspheric Coefficients

| Surface # | 1 | 2 | 4 | 5 | 6 |
|---|---|---|---|---|---|
| k= | −4.2904E−01 | −9.0000E+01 | 4.0245E+01 | −4.4230E−01 | −9.0000E+01 |
| A4= | −1.3068E−03 | −1.0025E−01 | −2.7093E−01 | −2.5761E−01 | −1.0279E−01 |
| A6= | −6.6360E−03 | 2.1408E−01 | 9.2593E−01 | 9.7135E−01 | 8.2084E−02 |
| A8= | −1.2245E−02 | −2.6322E−01 | −1.3061E+00 | −1.3235E+00 | 2.9196E−01 |
| A10= | 8.8627E−03 | 1.0487E−01 | 9.7801E−01 | 1.1637E+00 | −6.3398E−01 |
| A12= | −1.2206E−02 | 4.5007E−03 | −3.6223E−01 | −4.6230E−01 | 6.1330E−01 |
| A14= | | −1.0679E−02 | 4.0832E−02 | | −2.3488E−01 |

| Surface # | 7 | 8 | 9 | 10 | 11 |
|---|---|---|---|---|---|
| k= | −6.7374E+01 | −2.6545E+01 | −3.7654E+00 | −9.0000E+01 | −8.4000E+01 |
| A4= | −6.6854E−02 | −1.5119E−01 | −1.3432E−01 | −7.5912E−02 | −9.4207E−02 |
| A6= | 6.8660E−02 | −5.6017E−02 | 2.2325E−02 | 9.5163E−02 | 6.8410E−02 |
| A8= | 8.0625E−02 | 5.1859E−02 | 4.3509E−02 | −4.9560E−02 | −2.2383E−02 |
| A10= | −1.6149E−01 | −6.5308E−03 | −3.0644E−02 | 1.3138E−02 | 3.5797E−03 |
| A12= | 1.5857E−01 | −1.8934E−03 | 9.9881E−03 | −2.0572E−03 | −2.6916E−04 |
| A14= | −6.1417E−02 | 1.9689E−03 | −1.5956E−03 | 2.0457E−04 | 3.5139E−06 |
| A16= | | −8.3164E−04 | 9.5511E−05 | −1.0121E−05 | 7.0478E−07 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 5.53 | (R7 + R8)/(R7 − R8) | 2.87 |
| Fno | 3.10 | (R9 + R10)/(R9 − R10) | −2.26 |
| HFOV [deg.] | 23.5 | f/f1 | 1.79 |
| (V2 + V3 + V5)/(V1 + V4) | 0.61 | f1/f3 | 0.09 |
| CT3/CT2 | 3.01 | tan(2 × HFOV) | 1.07 |
| CT4/CT5 | 0.63 | SD/TD | 0.83 |
| f/CT4 | 10.45 | BL/TD | 0.19 |
| T23/T34 | 0.34 | f/TL | 1.00 |
| (R1 + R2)/(R1 − R2) | −1.07 | TL [mm] | 5.51 |
| (R3 + R4)/(R3 − R4) | 2.01 | | |

In the optical photographing lens assembly according to the 11th embodiment, when the axial distance between the first lens element 1110 and the second lens element 1120 is T12, the axial distance between the second lens element 1120 and the third lens element 1130 is T23, the axial distance between the third lens element 1130 and the fourth lens element 1140 is T34, and the axial distance between the fourth lens element 1140 and the fifth lens element 1150 is T45, the following conditions are satisfied: T12<T23<T34; and T45<T23<T34.

12th Embodiment

Figure 23:
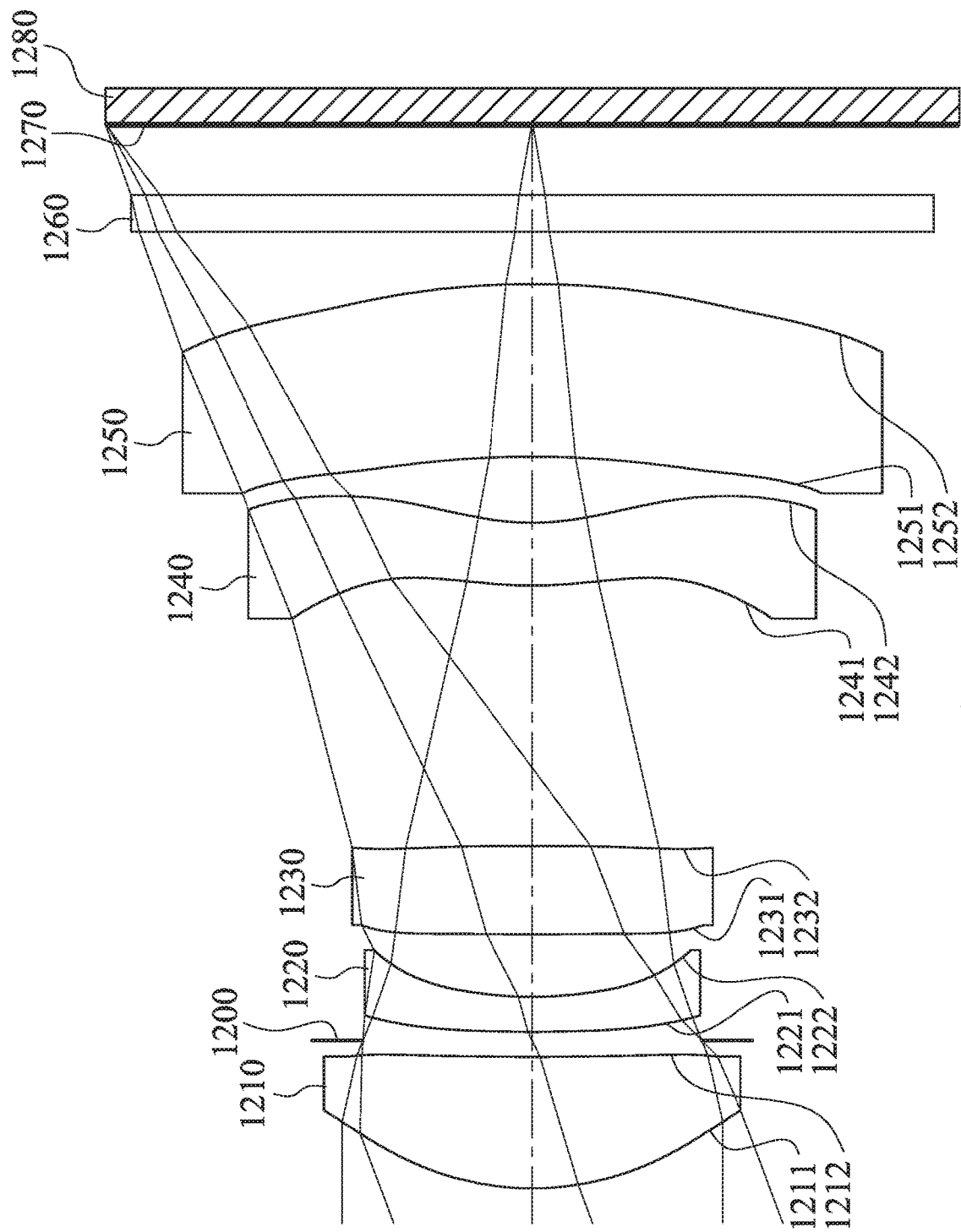
FIG. 23 is a schematic view of an image capturing device according to the 12th embodiment of the present disclosure.
Figure 24:
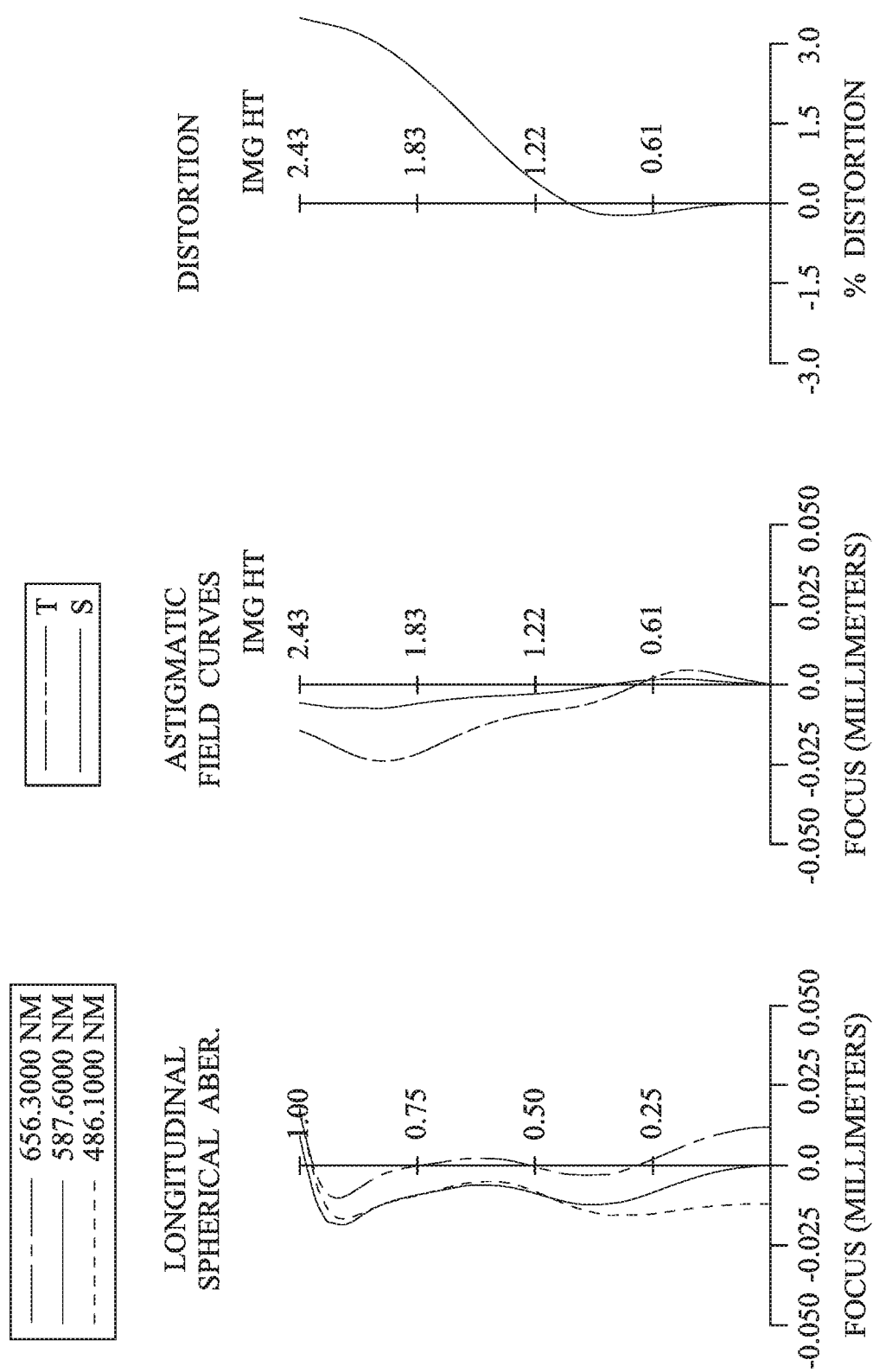
FIG. 24 shows spherical aberration curves, astigmatic field curves and a distortion curve of the image capturing device according to the 12th embodiment.

FIG. 23 is a schematic view of an image capturing device according to the 12th embodiment of the present disclosure. FIG. 24 shows spherical aberration curves, astigmatic field curves and a distortion curve of the image capturing device according to the 12th embodiment. In FIG. 23, the image capturing device includes an optical photographing lens assembly (its reference numeral is omitted) and an image sensor 1280. The optical photographing lens assembly includes, in order from an object side to an image side, a first lens element 1210, an aperture stop 1200, a second lens element 1220, a third lens element 1230, a fourth lens element 1240, a fifth lens element 1250, an IR-cut filter 1260 and an image surface 1270, wherein the image sensor 1280 is disposed on the image surface 1270 of the optical photographing lens assembly. The optical photographing lens assembly has a total of five lens elements (1210-1250). There is an air space in a paraxial region between every two of the first lens element 1210, the second lens element 1220, the third lens element 1230, the fourth lens element 1240 and the fifth lens element 1250 that are adjacent to each other.

The first lens element 1210 with positive refractive power has an object-side surface 1211 being convex in a paraxial region thereof and an image-side surface 1212 being concave in a paraxial region thereof. The first lens element 1210 is made of plastic material, and has the object-side surface 1211 and the image-side surface 1212 being both aspheric.

The second lens element 1220 with negative refractive power has an object-side surface 1221 being convex in a paraxial region thereof and an image-side surface 1222 being concave in a paraxial region thereof. The second lens element 1220 is made of plastic material, and has the object-side surface 1221 and the image-side surface 1222 being both aspheric.

The third lens element 1230 with positive refractive power has an object-side surface 1231 being convex in a paraxial region thereof and an image-side surface 1232 being convex in a paraxial region thereof. The third lens element 1230 is made of plastic material, and has the object-side surface 1231 and the image-side surface 1232 being both aspheric.

The fourth lens element 1240 with negative refractive power has an object-side surface 1241 being convex in a paraxial region thereof and an image-side surface 1242 being concave in a paraxial region thereof. The fourth lens element 1240 is made of plastic material, and has the object-side surface 1241 and the image-side surface 1242 being both aspheric. Furthermore, the image-side surface 1242 of the fourth lens element 1240 includes at least one convex shape in an off-axial region thereof.

The fifth lens element 1250 with positive refractive power has an object-side surface 1251 being concave in a paraxial region thereof and an image-side surface 1252 being convex in a paraxial region thereof. The fifth lens element 1250 is made of plastic material, and has the object-side surface 1251 and the image-side surface 1252 being both aspheric. Furthermore, the object-side surface 1251 of the fifth lens element 1250 includes at least one concave shape in an off-axial region thereof.

The IR-cut filter 1260 is made of glass material and located between the fifth lens element 1250 and the image surface 1270, and will not affect the focal length of the optical photographing lens assembly.

The detailed optical data of the 12th embodiment are shown in Table 23 and the aspheric surface data are shown in Table 24 below.

TABLE 23

12th Embodiment
f = 6.31 mm, Fno = 2.90, HFOV = 20.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.632 | ASP | 0.755 | Plastic | 1.535 | 55.7 | 3.40 |
| 2 | | 13.257 | ASP | 0.093 | | | | |
| 3 | Ape. Stop | Plano | | 0.050 | | | | |
| 4 | Lens 2 | 5.707 | ASP | 0.200 | Plastic | 1.650 | 21.4 | −5.17 |
| 5 | | 2.086 | ASP | 0.357 | | | | |
| 6 | Lens 3 | 14.345 | ASP | 0.510 | Plastic | 1.650 | 21.4 | 15.89 |
| 7 | | −36.287 | ASP | 1.491 | | | | |
| 8 | Lens 4 | 2.398 | ASP | 0.359 | Plastic | 1.535 | 55.7 | −7.81 |
| 9 | | 1.444 | ASP | 0.377 | | | | |

TABLE 23-continued

12th Embodiment
f = 6.31 mm, Fno = 2.90, HFOV = 20.5 deg.

| Surface # | | Curvature Radius | | Thickness | Material | Index | Abbe # | Focal Length |
|---|---|---|---|---|---|---|---|---|
| 10 | Lens 5 | −6.488 | ASP | 0.989 | Plastic | 1.608 | 25.7 | 79.32 |
| 11 | | −6.048 | ASP | 0.300 | | | | |
| 12 | IR-cut filter | Plano | | 0.210 | Glass | 1.517 | 64.2 | — |
| 13 | | Plano | | 0.405 | | | | |
| 14 | Image | Plano | | — | | | | |

Reference wavelength is 587.6 nm (d-line).

TABLE 24

Aspheric Coefficients

| Surface # | 1 | 2 | 4 | 5 | 6 |
|---|---|---|---|---|---|
| k= | −3.1485E−01 | 3.9838E+01 | 2.7503E+01 | 2.0935E−02 | −9.0000E+01 |
| A4= | 2.0084E−03 | −9.6194E−02 | −2.7778E−01 | −2.5094E−01 | −1.1137E−01 |
| A6= | 1.3223E−03 | 2.2610E−01 | 9.1550E−01 | 9.7823E−01 | 8.4502E−02 |
| A8= | −1.0340E−02 | −2.5326E−01 | −1.2984E+00 | −1.3545E+00 | 3.0266E−01 |
| A10= | 9.4208E−03 | 9.1522E−02 | 9.5760E−01 | 1.1972E+00 | −6.2525E−01 |
| A12= | −6.8221E−03 | 1.0514E−02 | −3.6227E−01 | −4.6230E−01 | 6.1337E−01 |
| A14= | | −1.0716E−02 | 4.0832E−02 | | −2.3488E−01 |

| Surface # | 7 | 8 | 9 | 10 | 11 |
|---|---|---|---|---|---|
| k= | 9.0000E+01 | −1.5671E+01 | −5.8371E+00 | −1.8068E+01 | −8.1599E+01 |
| A4= | −6.6429E−02 | −1.4882E−01 | −1.1930E−01 | −6.3783E−02 | −9.5514E−02 |
| A6= | 6.1291E−02 | −4.2466E−02 | 1.8290E−03 | 9.2746E−02 | 6.8340E−02 |
| A8= | 6.6120E−02 | 5.1917E−02 | 4.3888E−02 | −5.0081E−02 | −2.2359E−02 |
| A10= | −1.5674E−01 | −8.8472E−03 | −3.0555E−02 | 1.3103E−02 | 3.5701E−03 |
| A12= | 1.5862E−01 | −2.9685E−03 | 9.9863E−03 | −2.0538E−03 | −2.7202E−04 |
| A14= | −6.1417E−02 | 1.8858E−03 | −1.6044E−03 | 2.0720E−04 | 3.3197E−06 |
| A16= | | −4.9013E−04 | 8.9846E−05 | −1.1354E−05 | 8.2454E−07 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 6.31 | (R7 + R8)/(R7 − R8) | 4.03 |
| Fno | 2.90 | (R9 + R10)/(R9 − R10) | 28.50 |
| HFOV [deg.] | 20.5 | f/f1 | 1.85 |
| (V2 + V3 + V5)/(V1 + V4) | 0.61 | f1/f3 | 0.21 |
| CT3/CT2 | 2.55 | tan(2 × HFOV) | 0.87 |
| CT4/CT5 | 0.36 | SD/TD | 0.84 |
| f/CT4 | 17.57 | BL/TD | 0.18 |
| T23/T34 | 0.24 | f/TL | 1.03 |
| (R1 + R2)/(R1 − R2) | −1.28 | TL [mm] | 6.10 |
| (R3 + R4)/(R3 − R4) | 2.15 | | |

In the optical photographing lens assembly according to the 12th embodiment, when the axial distance between the first lens element 1210 and the second lens element 1220 is T12, the axial distance between the second lens element 1220 and the third lens element 1230 is T23, the axial distance between the third lens element 1230 and the fourth lens element 1240 is T34, the following condition is satisfied: T12<T23<T34.

13th Embodiment

Figure 25:
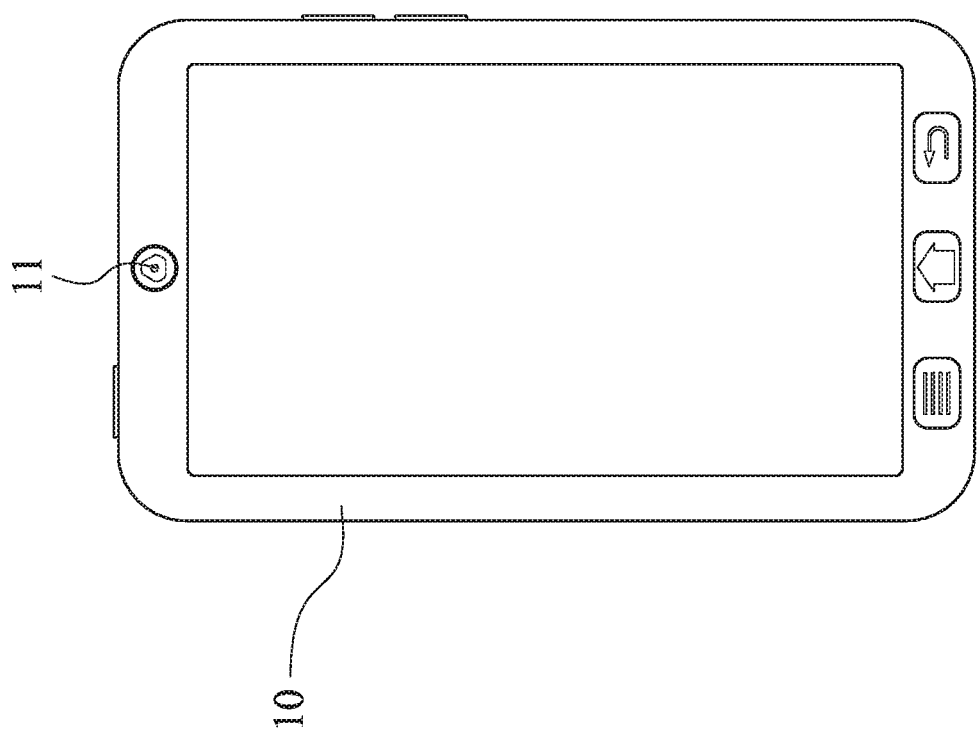
FIG. 25 is a schematic view of an electronic device according to the 13th embodiment of the present disclosure.

FIG. 25 is a schematic view of an electronic device 10 according to the 13th embodiment of the present disclosure. The electronic device 10 of the 13th embodiment is a smart phone, wherein the electronic device 10 includes an image capturing device 11. The image capturing device 11 includes an optical photographing lens assembly (its reference numeral is omitted) according to the present disclosure and an image sensor (its reference numeral is omitted), wherein the image sensor is disposed on an image surface of the optical photographing lens assembly.

14th Embodiment

Figure 26:
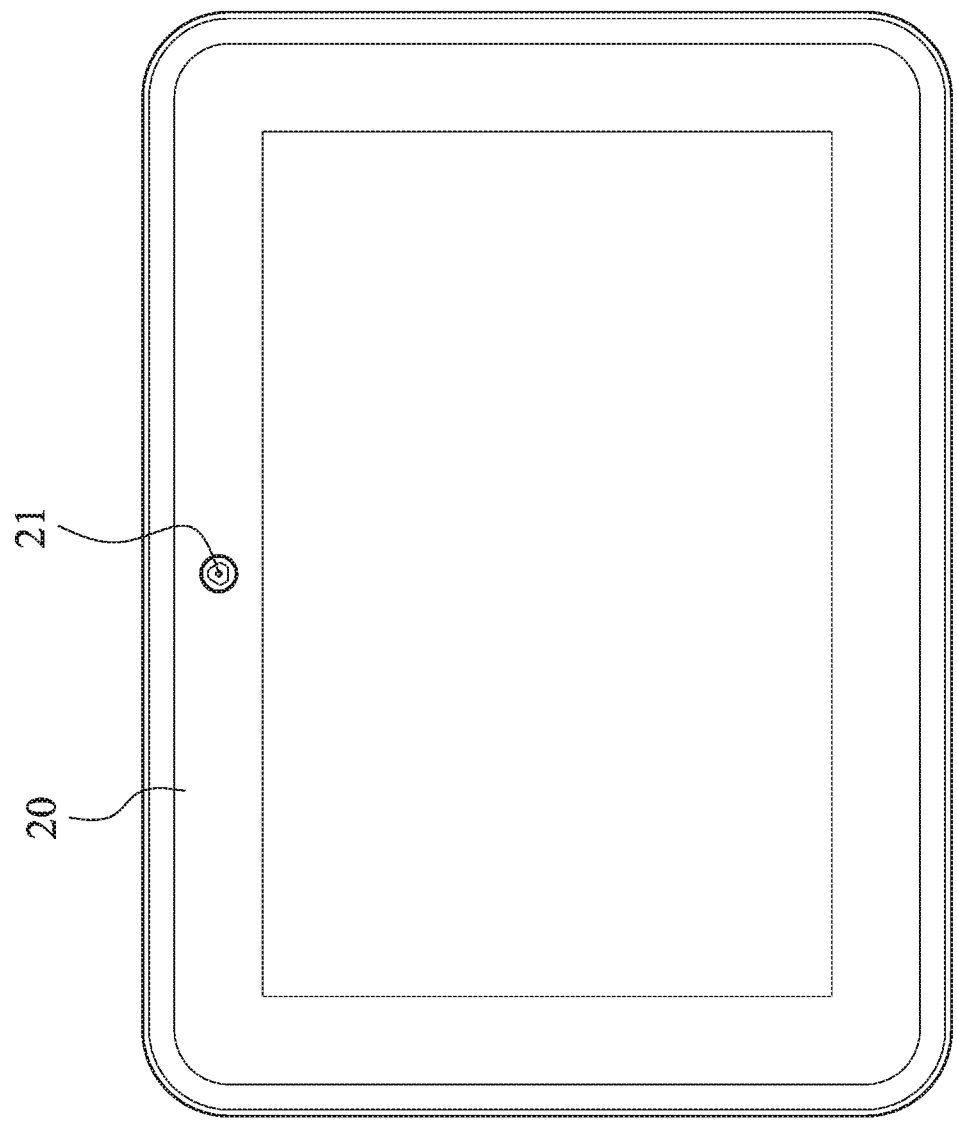
FIG. 26 is a schematic view of an electronic device according to the 14th embodiment of the present disclosure.

FIG. 26 is a schematic view of an electronic device 20 according to the 14th embodiment of the present disclosure. The electronic device 20 of the 14th embodiment is a tablet personal computer, wherein the electronic device 20 includes an image capturing device 21. The image capturing device 21 includes an optical photographing lens assembly (its reference numeral is omitted) according to the present disclosure and an image sensor (its reference numeral is omitted), wherein the image sensor is disposed on an image surface of the optical photographing lens assembly.

15th Embodiment

Figure 27:
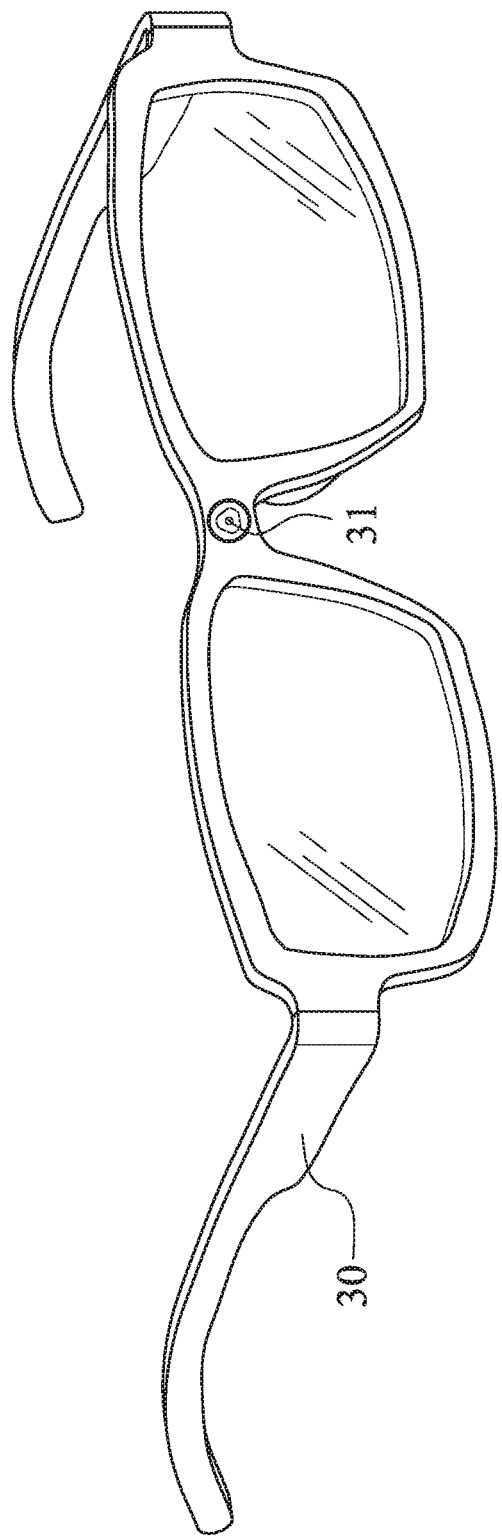
FIG. 27 is a schematic view of an electronic device according to the 15th embodiment of the present disclosure.

FIG. 27 is a schematic view of an electronic device 30 according to the 15th embodiment of the present disclosure. The electronic device 30 of the 15th embodiment is a wearable device, such as a head-mounted display (HMD), wherein the electronic device 30 includes an image capturing device 31. The image capturing device 31 includes an optical photographing lens assembly (its reference numeral is omitted) according to the present disclosure and an image sensor (its reference numeral is omitted), wherein the image sensor is disposed on an image surface of the optical photographing lens assembly.

The foregoing description, for purpose of explanation, has been described with reference to specific embodiments. It is to be noted that TABLES 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens assembly comprising five lens elements, the five lens elements being, in order from an object side to an image side:
    a first lens element, a second lens element, a third lens element, a fourth lens element and a fifth lens element;
    wherein each of the five lens elements has an object-side surface facing towards the object side and an image-side surface facing towards the image side;
    wherein the first lens element has positive refractive power; the object-side surface of the second lens element is convex in a paraxial region thereof; the object-side surface of the third lens element is convex in a paraxial region thereof, and the image-side surface of the third lens element is concave in a paraxial region thereof; the fourth lens element has negative refractive power, and the image-side surface of the fourth lens element is concave in a paraxial region thereof; the fifth lens element has positive refractive power, and the image-side surface of the fifth lens element is convex in a paraxial region thereof; a central thickness of the first lens element is a maximum among central thicknesses of the five lens elements;
    wherein a total number of the lens elements in the optical photographing lens assembly is five a central thickness of the fourth lens element is CT4, a central thickness of the fifth lens element is CT5, a focal length of the first lens element is f1, a focal length of the third lens element is f3, an axial distance between the third lens element and the fourth lens element is T34, an axial distance between the fourth lens element and the fifth lens element is T45, and the following conditions are satisfied:
    $0.45 < CT4/CT5 < 2.0$;
    $f1/f3 < 0.65$; and
    $T45 < T34$.

2. The optical photographing lens assembly of claim 1, wherein the third lens element has negative refractive power.

3. The optical photographing lens assembly of claim 1, wherein the image-side surface of the fourth lens element comprises at least one convex shape in an off-axis region thereof.

4. The optical photographing lens assembly of claim 1, wherein the object-side surface of the fifth lens element comprises at least one concave shape in an off-axis region thereof.

5. The optical photographing lens assembly of claim 1, wherein the central thickness of the fourth lens element is CT4, the central thickness of the fifth lens element is CT5, and the following condition is satisfied:
    $0.45 < CT4/CT5 \leq 0.79$.

6. The optical photographing lens assembly of claim 1, wherein at least one of the object-side surface and the image-side surface of the fifth lens element is aspheric; an axial distance between the second lens element and the third lens element is T23, the axial distance between the third lens element and the fourth lens element is T34, and the following condition is satisfied:
    $T23/T34 \leq 0.23$.

7. The optical photographing lens assembly of claim 1, wherein the focal length of the first lens element is f1, the focal length of the third lens element is f3, and the following condition is satisfied:
    $f1/f3 \leq -0.22$.

8. The optical photographing lens assembly of claim 1, wherein a curvature radius of the object-side surface of the fourth lens element is R7, a curvature radius of the image-side surface of the fourth lens element is R8, and the following condition is satisfied:
    $-1.0 < (R7+R8)/(R7-R8) < 1.0$.

9. The optical photographing lens assembly of claim 1, wherein an axial distance between the first lens element and the second lens element is T12, an axial distance between the second lens element and the third lens element is T23, the axial distance between the third lens element and the fourth lens element is T34, the axial distance between the fourth lens element and the fifth lens element is T45, and the following conditions are satisfied:
    $T12 < T34$;
    $T23 < T34$; and
    $T45 < T34$.

10. The optical photographing lens assembly of claim 1, wherein a curvature radius of the object-side surface of the first lens element is R1, a curvature radius of the image-side surface of the first lens element is R2, a half of a maximal field of view of the optical photographing lens assembly is HFOV, and the following conditions are satisfied:
    $R1 < R2$; and
    $0.20 < \tan(2 \times HFOV) \leq 0.60$.

11. The optical photographing lens assembly of claim 1, wherein at least one of the five lens elements has at least one surface being aspheric; an axial distance between the image-side surface of the fifth lens element and an image surface is BL, an axial distance between the object-side surface of the first lens element and the image-side surface of the fifth lens element is TD, and the following condition is satisfied:
    $BL/TD < 0.50$.

12. The optical photographing lens assembly of claim 1, further comprising:
    an aperture stop, wherein there is an air space in a paraxial region between each of adjacent lens elements of the five lens elements, an axial distance between the aperture stop and the image-side surface of the fifth lens element is SD, an axial distance between the object-side surface of the first lens element and the image-side surface of the fifth lens element is TD, and the following condition is satisfied:
0.60<SD/TD<1.2.

13. An image capturing device, comprising:
the optical photographing lens assembly of claim 1; and
an image sensor, wherein the image sensor is disposed on an image surface of the optical photographing lens assembly.

14. An electronic device, comprising:
the image capturing device of claim 13.

15. An optical photographing lens assembly comprising five lens elements, the five lens elements being, in order from an object side to an image side:
a first lens element, a second lens element, a third lens element, a fourth lens element and a fifth lens element;
wherein each of the five lens elements has an object-side surface facing towards the object side and an image-side surface facing towards the image side;
wherein the first lens element has positive refractive power; the object-side surface of the third lens element is convex in a paraxial region thereof, and the image-side surface of the third lens element is concave in a paraxial region thereof the fourth lens element has negative refractive power, and the image-side surface of the fourth lens element is concave in a paraxial region thereof the fifth lens element has positive refractive power, and the image-side surface of the fifth lens element is convex in a paraxial region thereof; a central thickness of the first lens element is a maximum among central thicknesses of the five lens elements;
wherein a total number of the lens elements in the optical photographing lens assembly is five, a central thickness of the fourth lens element is CT4, a central thickness of the fifth lens element is CT5, a focal length of the optical photographing lens assembly is f, and the following conditions are satisfied:
0.45<CT4/CT5<2.0; and
f/CT4<25.

16. The optical photographing lens assembly of claim 15, wherein the image-side surface of the fourth lens element comprises at least one convex shape in an off-axis region thereof.

17. The optical photographing lens assembly of claim 15, wherein at least one of the five lens elements has at least one surface being aspheric; an axial distance between the image-side surface of the fifth lens element and an image surface is BL, an axial distance between the object-side surface of the first lens element and the image-side surface of the fifth lens element is TD, and the following condition is satisfied:
BL/TD≤0.39.

18. The optical photographing lens assembly of claim 15, wherein the five lens elements are made of plastic material; the optical photographing lens assembly further comprises an aperture stop, there is no lens element located between the aperture stop and the first lens element.

19. The optical photographing lens assembly of claim 15, wherein a curvature radius of the object-side surface of the fifth lens element is R9, a curvature radius of the image-side surface of the fifth lens element is R10, and the following condition is satisfied:
−1.0<(R9+R10)/(R9−R10)<1.0.

20. The optical photographing lens assembly of claim 15, wherein an axial distance between the second lens element and the third lens element is T23, an axial distance between the third lens element and the fourth lens element is T34, and the following condition is satisfied:
T23/T34≤0.41.

21. An optical photographing lens assembly comprising five lens elements, the five lens elements being, in order from an object side to an image side:
a first lens element, a second lens element, a third lens element, a fourth lens element and a fifth lens element;
wherein each of the five lens elements has an object-side surface facing towards the object side and an image-side surface facing towards the image side;
wherein the first lens element has positive refractive power; the object-side surface of the third lens element is convex in a paraxial region thereof, and the image-side surface of the third lens element is concave in a paraxial region thereof; the fourth lens element has negative refractive power, and the image-side surface of the fourth lens element is concave in a paraxial region thereof; the fifth lens element has positive refractive power, and the image-side surface of the fifth lens element is convex in a paraxial region thereof; a central thickness of the first lens element is the maximum among central thicknesses of the five lens elements;
wherein a total number of the lens elements in the optical photographing lens assembly is five, a curvature radius of the object-side surface of the fourth lens element is R7, a curvature radius of the image-side surface of the fourth lens element is R8, a curvature radius of the object-side surface of the fifth lens element is R9, a curvature radius of the image-side surface of the fifth lens element is R10, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following conditions are satisfied:
0<(R7+R8)/(R7−R8)<1.0;
0<(R9+R10)/(R9−R10)<1.0;
T12<T34;
T23<T34; and
T45<T34.

22. The optical photographing lens assembly of claim 21, wherein the object-side surface of the first lens element is convex in a paraxial region thereof; the object-side surface of the second lens element is convex in a paraxial region thereof.

23. The optical photographing lens assembly of claim 21, wherein the image-side surface of the fourth lens element comprises at least one convex shape in an off-axis region thereof.

24. The optical photographing lens assembly of claim 21, wherein the axial distance between the second lens element and the third lens element is T23, the axial distance between the third lens element and the fourth lens element is T34, and the following condition is satisfied:
T23/T34≤0.41.

25. The optical photographing lens assembly of claim 21, wherein a focal length of the first lens element is f1, a focal length of the third lens element is f3, and the following condition is satisfied:
f1/f3≤0.06.

26. The optical photographing lens assembly of claim 21, wherein a half of a maximal field of view of the optical photographing lens assembly is HFOV, and the following condition is satisfied:

$0.20 < \tan(2 \times \text{HFOV}) \leq 0.70$.

* * * * *